United States Patent
Greenwood

(10) Patent No.: US 7,461,077 B1
(45) Date of Patent: Dec. 2, 2008

(54) REPRESENTATION OF DATA RECORDS

(76) Inventor: Nicholas Greenwood, 7 Waverly Gardens, Wolverhampton (GB) WV5 9EB (*) Notice: Subject to any disclaimer, the term of this patent is extended or adjusted under 35 U.S.C. 154(b) by 659 days.

(21) Appl. No.: 10/208,635

(22) Filed: Jul. 29, 2002

Related U.S. Application Data

(60) Provisional application No. 60/309,251, filed on Jul. 31, 2001.

(51) Int. Cl.
G06F 17/30 (2006.01)

(52) U.S. Cl. .......................... 707/102; 707/3; 707/101; 707/104.1

(58) Field of Classification Search ............ None
See application file for complete search history.

(56) References Cited

U.S. PATENT DOCUMENTS

| | | | |
|---|---|---|---|
| 5,495,567 A | 2/1996 | Iizawa et al. | |
| 5,546,526 A | 8/1996 | Li et al. | |
| 5,553,218 A * | 9/1996 | Li et al. | 707/102 |
| 5,615,367 A | 3/1997 | Bennett et al. | |
| 5,657,460 A | 8/1997 | Egan et al. | |
| 5,692,175 A | 11/1997 | Davies et al. | |
| 5,729,730 A | 3/1998 | Wlaschin et al. | |
| 5,745,891 A | 4/1998 | Minakuchi et al. | |
| 5,760,773 A * | 6/1998 | Berman et al. | 715/808 |
| 5,835,683 A | 11/1998 | Corella et al. | |
| 5,848,424 A | 12/1998 | Scheinkman et al. | |
| 5,873,079 A | 2/1999 | Davis, III et al. | |
| 5,884,304 A | 3/1999 | Davis, III et al. | |
| 5,884,306 A | 3/1999 | Bliss et al. | |
| 5,918,225 A | 6/1999 | White et al. | |
| 5,940,818 A | 8/1999 | Malloy et al. | |
| 5,966,704 A | 10/1999 | Furegati et al. | |
| 5,995,984 A | 11/1999 | Lau et al. | |
| 6,009,432 A | 12/1999 | Tarin | |
| 6,014,138 A | 1/2000 | Cain et al. | |
| 6,016,497 A | 1/2000 | Suver | |
| 6,081,801 A | 6/2000 | Cochrane et al. | |
| 6,085,202 A | 7/2000 | Rao et al. | |
| 6,108,651 A | 8/2000 | Guha | |
| 6,768,997 B2 * | 7/2004 | Schirmer et al. | 707/102 |
| 6,772,146 B2 * | 8/2004 | Khemlani et al. | 705/36 R |
| 6,961,731 B2 * | 11/2005 | Holbrook | 707/102 |
| 7,231,596 B2 * | 6/2007 | Koren | 715/210 |
| 2002/0161744 A1 * | 10/2002 | Gluckman | 707/1 |
| 2003/0036964 A1 * | 2/2003 | Boyden et al. | 705/26 |

* cited by examiner

Primary Examiner—Debbie M Le
(74) Attorney, Agent, or Firm—Robert M Hunter

(57) ABSTRACT

A computerized method for representing a data record comprising: querying a data source to obtain data selected from the group consisting of a data element in a record, and metadata concerning the record; presenting in a display a record handle for manipulation of the record; presenting in the display a data item wherein the data item is a list of data items or a reference to another record; and, optionally, presenting on the display the metadata above the data item. In some embodiments, the method includes the step of retrieving one or more heterogeneous records from a plurality of databases for display and manipulation. The invention is also a grid control programmed to implement a disclosed method and is a computer-readable medium having computer-executable instructions for performing a disclosed method. The invention links the grid control of the invention with automatic query generation using hierarchical data schema trees. Both the trees and the grid records represent relational foreign keys as extra reference columns. In the grid control, these reference columns are additional embedded record handles.

42 Claims, 18 Drawing Sheets

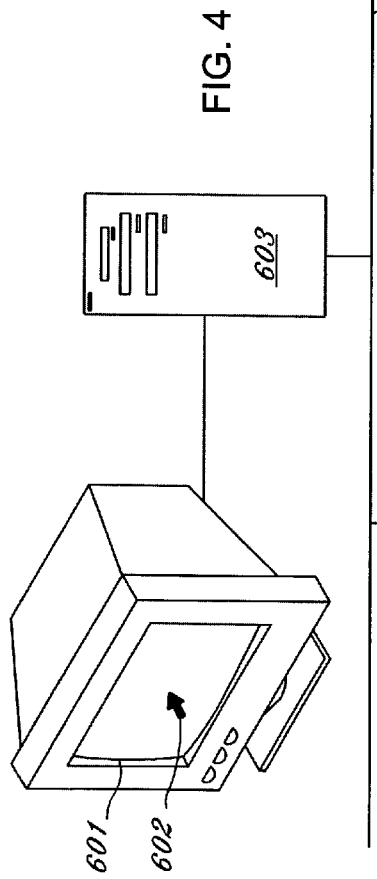
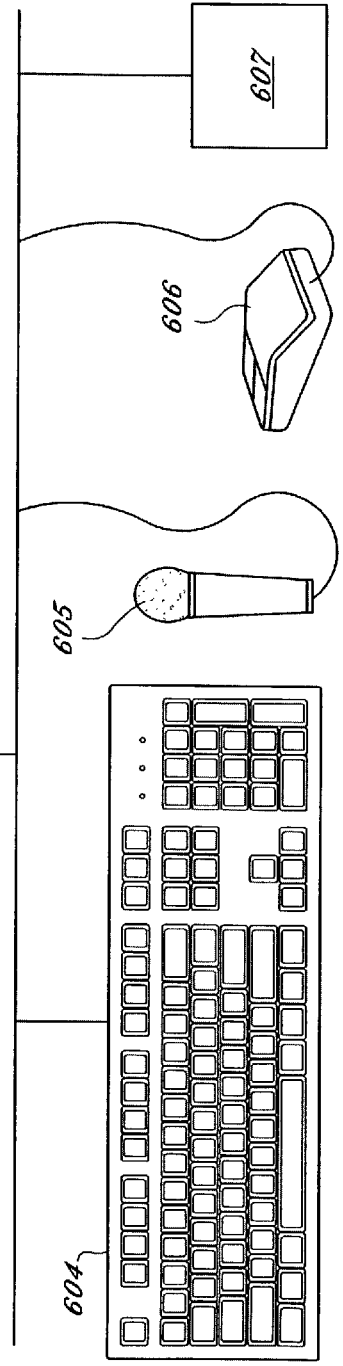
FIG. 5
FIG. 4

REPRESENTATION OF DATA RECORDS

CROSS-REFERENCE TO RELATED APPLICATIONS

This application claims the benefit of U.S. Provisional Application No. 60/309,251, filed Jul. 31, 2001, the disclosure of which application is incorporated by reference as if fully set forth herein.

A portion of the disclosure of this patent document contains material which is subject to copyright protection. The copyright owner has no objection to the facsimile reproduction by anyone of the patent document or the patent disclosure as it appears in the Patent and Trademark Office patent files or records, but otherwise reserves all copyrights whatsoever.

STATEMENT REGARDING FEDERALLY SPONSORED RESEARCH OR DEVELOPMENT

Not Applicable

BACKGROUND OF THE INVENTION

The present invention relates to the processing of information. In particular, the invention relates to the representation of data on the screen of a computer or similar device.

Background art systems typically use three approaches for representation of data residing in a database on the screen of a computer or similar device: grids, forms and reports. In a simple example, if one wanted to query a database about families, one would have to pose the query in some way. For example, one might have a window into which could be typed a Standard Query Language (SQL) query, such as:

Select * from Dad, Kids where Dad.name = 'Nick' and Dad.id = Kids.parent;

Activating this query would bring up a rectangular table containing all combinations of the rows in each table that fit the query where-condition.

The results of such a query would typically be displayed in a grid as shown at 201 in FIG. 1. This grid is an area containing data records of the same type, with column header labels displayed at the top of the grid. FIG. 1 shows background art grid control 201 containing a representation on a display of the result of a join between the two tables, 'Dad' and 'Kids,' and a selection on the name of the parent, as shown in the SQL query presented above. One having ordinary skill in the art would know that a grid control has an outer frame 202. It may be possible to resize and move this frame around the screen. The contents of the grid control are a number of cells of various types arranged into a grid. The contents within the frame are usually scrollable up and down and side to side when the total data contents do not fit entirely within the bounds of the frame, but this aspect is not shown here. In software applications involving access to databases, it is common for the top cells of a grid to contain the names of the columns of the table in the database being queried. This is shown in top cells 203 through 206 which contain the column names qualified with their table name. Below this header row are the data cells, such as data cell 207.

Referring to FIG. 1, the result of the query on two relational tables 'Dad' and 'Kids' is shown. The 'Dad' table has two columns: 'name' which contains the text of a father's name, and 'id' which is the primary key for the record and has no other function. The 'Kids' table has two columns: 'name' which contains the text of a child's name and 'parent' which acts as a foreign key to relate a particular child to his or her parent. Thus, the 'Dad' table is a master table, and the 'Kids' table is a detail table. The two are related by a primary key/foreign key pair. The data shown in FIG. 1 are used herein to illustrate many points about relational data. One having ordinary skill in the art would understand that the query result contains data from two 'Dad' records whose primary keys are 1 and 2. These two records are joined with the 'Kids' records whose 'parent' fields refer to one of the two 'Dad' records.

It is common in background art database software applications for the header row to be operative to activate manipulation of the data displayed below it. For example, pointing at a cell in the header with cursor 208 may enable one to manipulate the data by dragging and dropping with the mouse. Furthermore, it is often the case that columns can be resized or moved. In the case illustrated in FIG. 1, the column 'Kids.name' has been selected and the mouse has been right-clicked. This has the effect of displaying on the screen a menu of action options that are possible for the selected cell.

It is also common in the background art for data cells within grid controls to present menus of action options. Those having ordinary skill in the art will know that, depending on the cell that has been chosen, the action options vary. For example, in the case of data cell 207, it makes no sense to sort the contents of a single cell. However, for selected cell 205, the cell is a column header that represents the whole column. Menu of options 209 is specific to that column. In this case, sorting is a sensible option. If the user selects a 'Sort' option, all of the rows will be sorted so that the contents of each row is unchanged but the rows are sorted in the order specified for the selected column. In background art database interfaces, it is usual for the column header cells to have more options available to them than other kinds of cells. No background art reference discloses an invention that permits the selection of a data cell to offer the action of joining the cell to further unfetched (unretrieved) data within the database.

In background art user interfaces, often there is also a cell that does not contain data to the left of each row of data. A cell like this, such as cell 210, may also have options available to it when selected, such as hiding the row, or increasing its depth to show several lines of text. No background art reference discloses an invention that increases the functionality of this cell to the left of the record 210 or allows it to occur in other parts of the grid.

In recent years, editing of elements of data presented in grids has been supported in background art grid controls. In this case, the changed data are either saved as a group or various means are used to co-ordinate changing of the value on the screen with updating the underlying data in the database.

In the example given above, the five entries for a parent of name 'Nick' represent two parents. It will also be noticed that the 'Dad.id' column 204 and 'Kids.parent' column 206 hold essentially a form of meta-data. These meta-data join the real data together. The Dad.id does not tell the user anything about the Dad. Both of these problems, repeated data and meta-data are features of relational databases. All database systems use meta-data, but the relational system treats it as if it were real-world data.

For parts of software applications that typically manipulate one record in a master table and several in detail/child tables of the current record, it is common in the background art to use a forms approach, but recently, background art hierarchical grid controls have been developed. These allow a master-detail relationship to be displayed in a grid control. Examples are MSHFlexGrid from Microsoft Corp, Redmond, Wash., and UltraWinGrid from Infragistics Inc of Cranbury, N.J. Referring again to FIG. 2, background art hierarchical grid 211 is displayed. Grid 211 is displaying the same data as grid 201. The values in cells 213 and 214 replace the first three rows of 'Dad.name' column 204 and 'Dad.id' column 204, in background art grid 201. These two values constitute a master record, which is related to three detail records 216, 217 and 218. The detail records only appear if first-detailed records expansion node 212 for the master record is expanded. In the case of the second master record, second detailed records expansion node 219 is contracted (indicated by a '+' sign), so there are no tree lines 215, and the detail records are not displayed. Nodes 212 and 219 can be expanded or contracted independently, and when contracted the master rows move closer to occupy the vacated space. Existing art hierarchical grids are typically linked to hierarchical datasets, such as those provided by ADO from Microsoft. For datasets in which a master record has two different detail record sets, existing art hierarchical grids are not capable of expanding and contracting different detail record sets for the same master record independently. However, existing art hierarchical grids solve the problem of repetition of data from the master table.

Forms have an important role to play in limiting users' access to subsets of the total data in the database, and to guide users through data input processes. In the relational database model, forms are usually used to present data that does not fall nicely into a tabular output. The fact that the same parent has more than one child is represented by having different areas of the form containing single items and lists. However, it would be advantageous to be able to replace some forms applications with a grid control of the present invention accessing a relational database via a standard interface of the present invention. As the grid control and relational database interface are generalized for any relational database schema, no programming effort would be required.

The present invention can handle many different data models, but this disclosure concentrates on object and relational data models. In the object model, a data record is called an object, and is identified by a unique object identifier (OID). This is like having an extra column in the equivalent relational record, but the OID is meta-data that cannot be modified by the user, and is usually not displayed. The object is usually of a type or class, which replaces the table of the relational model. In this disclosure, objects are referred to as being of a certain type. Types have a name and a list of attributes. The attributes are roughly equivalent to columns. The attributes have attribute types such as number, character string, binary large object (BLOB), in the same way as columns have data types.

The value of the attribute within a given object is called a data element throughout this section of the disclosure, although elsewhere the value is sometimes also called an attribute. Attributes can be multi-valued, which means the value of the attribute in a given object can be an array or list of data elements, whereas in the relational model the value must be single-valued. In a list, the order is not important, whereas in an array the position of the element in the list is important. The OID value of one object can be stored in a data element of another object, so the second object can refer to the first object. This is described in U.S. Pat. No. 5,615,367 and is a common practice in background art databases.

Some background art databases require, that for a given reference attribute, the data element must always point at an object of the same type. Less strict systems do not impose this limitation. The model used in this disclosure is the latter, but does not rule out the former.

FIG. 3 shows some of the object data that is be used in examples throughout this document. It shows three objects of type 'family', first 'family' object 501, second 'family' object 502 and third 'family' object 503, and one of type 'car', 'car' object 518. In the data model for object data throughout this disclosure, it is assumed that an object is retrieved by supplying an object identifier (OID). For objects 501, 502 and 503, the OID's are shown at 504, 505 and 506 respectively. Objects of type 'family' have four attributes: 'Dad', 'Kids', 'Cars' and 'Homes'. Considering first 'family' object 501, 'Dad' attribute 507 is single-valued and has the value 'Nick' shown at 508. 'Kids' attribute 511 is multi-valued and contains the values 'Fabio' at first data element 512, 'Patrick' at second data element 513, and 'Lucia' at third data element 514. One ordinarily skilled in the art will see that if one disregards 'Cars' attribute 515, and 'Homes' attribute 516, the two objects 501 and 502 represent the same data as that extracted from a relational database and displayed in the grid of FIG. 2. The OID's 504 and 505 are the equivalent of the primary keys of the 'Dad' table. The ability to store multi-valued attributes means that two tables can be replaced by one object type, and the foreign key column 'Kids.parent' column 206 is not needed in the object data model.

'Cars' attribute 515, and 'Homes' attribute 516 are multi-valued attributes. They store references to other objects. The value stored at (reference) value 517 in the 'Cars' attribute is the OID of an object of type 'Car'. This referenced object is shown at 'car' object 518. Although the value for object 501 has only one element, the 'Cars' attribute is multi-valued as will be seen later. 'Homes' attribute 516 is also multi-valued, and for first 'family' object 501 has two elements with values 5 and 6, which are the OID's of two objects not shown here.

In the object data model presented here, OID's are similar to primary keys in the relational model, and references are similar to foreign keys. The relational system does not support multi-valued fields.

The object data shown in this disclosure is ideally suited to the visual elements used in the present invention. The unit for grouping data on the screen is called a record in this disclosure. The object data used in the disclosure can be represented with one record per object. Although the attributes in these objects may be multi-valued, the elements are always atomic. This means that they are things like numbers, strings of text or single blocks of binary data that have no internal structure (as far as the database is concerned). There are object and semi-structured data models (as well as object-relational databases), which allow elements in single-valued or multi-valued attributes to consist of a series of sub-attributes. In some cases an attribute can itself contain a type. In these cases a single record on-screen is not capable of representing a single object or record of the underlying data model. The present invention maintains a common visual interface in these cases by treating this kind of data as containing lists of references, even though these references are to data within the object, rather than outside it. This will be covered in more depth later.

The background art of the present invention is characterized by U.S. Pat. Nos. 5,495,567; 5,546,526; 5,615,367; 5,657,460; 5,692,175; 5,729,730; 5,745,891; 5,835,683; 5,848,424; 5,873,079; 5,884,304; 5,884,306; 5,918,225; 5,940,818; 5,966,704; 5,995,984; 6,009,432; 6,014,138; 6,016,497; 6,081,801; 6,085,202; 6,108,651; the disclosures of which are incorporated by reference as if fully set forth herein.

Iizawa et al. in U.S. Pat. No. 5,495,567 disclose an automatic interface layout generator for database systems. This invention is limited in that it focuses on automatic layout generation.

Li et al. in U.S. Pat. No. 5,546,526 disclose a system for reconfiguration of a database by interactive manipulation of icons. This invention is limited in that it teaches re-grouping of columns in databases.

Bennett et al. in U.S. Pat. No. 5,615,367 disclose a system for automatic linking of tables for improved relational database modeling. This invention is limited in that it addresses only forms and not grids.

Egan et al. in U.S. Pat. No. 5,657,460 disclose a system for storing and displaying data. This invention is limited in that requires display of a visual representation of the object whose data are being displayed.

Davies et al. in U.S. Pat. No. 5,692,175 disclose a system for accessing and analyzing data. The invention is limited in that it applies only to large-scale entities such as databases, filters and report generators and does not concern individual data records.

Wlaschin et al. in U.S. Pat. No. 5,729,730 disclose an information storage and retrieval system. The invention is limited in that it does not teach visual representation of data.

Minakuchi et al. in U.S. Pat. No. 5,745,891 disclose a data search apparatus. The invention is limited in that it concerns highlighting portions of data that are to be displayed at certain locations on a display screen.

Corella et al. in U.S. Pat. No. 5,835,683 disclose a system and method for authoring an expert system. The invention is limited in that it calls for all displayed data to be contained within a single interaction cell that is not visible at runtime.

Scheinkman et al. in U.S. Pat. No. 5,848,424 disclose a data navigator interface with navigation as a function of draggable elements and drop targets. This invention is limited in that it requires dragging and dropping actions on the part of the user.

Davis, III et al. in U.S. Pat. No. 5,873,079 disclose a filtered index apparatus and method. This invention is limited in that does not teach visual display of data.

Davis, III et al. in U.S. Pat. No. 5,884,304 disclose an alternative key index query apparatus. This invention is limited in that does not teach visual display of data.

Bliss et al. in U.S. Pat. No. 5,884,306 disclose a system and method for directly manipulating fields for grouping items on a display. This invention is limited in that it teaches only the grouping of existing data in categories.

White et al. in U.S. Pat. No. 5,918,225 disclose a SQL-based database system with an improved indexing methodology. This invention is limited in that it teaches storing data vertically instead of horizontally.

Malloy et al. in U.S. Pat. No. 5,940,818 disclose attribute-based access for multi-dimensional databases. This invention is limited in that it concerns n-dimensional data.

Furegati et al. in U.S. Pat. No. 5,966,704 disclose storage systems based on the concept of storage plane organization. This invention is limited in that it teaches organizing data in storage roughly in order of data entry.

Lau et al. in U.S. Pat. No. 5,995,984 disclose an apparatus and method for zoom-in entry of a element in a table. This invention is limited in that it teaches switching between a forms-based representation and a grid-based representation of data on a display.

Tarin in U.S. Pat. No. 6,009,432 discloses a value-instance-connectivity database. This invention is limited in that it concerns only database storage techniques.

Cain et al. in U.S. Pat. No. 6,014,138 disclose a visual programming development system. This invention is limited in that it teaches the storage of OID's in columns.

Suver in U.S. Pat. No. 6,016,497 discloses a method and system for storing and accessing embedded information in object-relational databases. This invention is limited in that it teaches only access and storage of data.

Cochrane et al. in U.S. Pat. No. 6,081,801 disclose shared nothing parallel execution of procedural constructs in SQL. This invention is limited in that it applies only to a parallel-processing environment.

Rao et al. in U.S. Pat. No. 6,085,202 disclose a method and system for producing a table image having focus and context regions. This invention is limited in that it concerns n-dimensional data.

Guha in U.S. Pat. No. 6,108,651 discloses heuristic co-identification of objects across heterogeneous information sources. This invention is limited in that teaches joining tables in different databases using metadata.

In summary, no single reference or combination of references teaches the novel aspects of the present invention. There still exists a need for improved functionality in an devices and methods for representing and managing data.

BRIEF SUMMARY OF THE INVENTION

The purpose of the invention is to provide an apparatus and method for representing and managing data. The present invention concerns the visual representation of a data record on any screen or display. It also concerns the constituent graphical elements of the data record, icons representing a join between data records, use of a grid control for handling the organization of these records and icons, and ways of programming the records, graphical elements and grids for effective data access and modification. In preferred embodiments, the present invention provides means for representing data records (e.g., grids) that involve use of a record handle, drop-down lists and icons to represent joins. The present invention also deals with new ways of using hierarchical data trees to represent data schemas and to generate data queries.

Preferred embodiments of the present invention enable data to be displayed that does not conform to the standard tabular format of a given number of rows each having the same number of columns. The record handle allows management of updating the database with changes that have been made to the on-screen representation of data. It also allows a user to remove the data that are not required from the screen. The embedded record handle that represents a reference within an existing on-screen record allows the user to fetch the record that the reference refers to. This enables data navigation from a grid control environment. The further ability to create a join, represented by a join icon on any data element(s) on the screen allows very flexible navigation, because the data to be joined with are decided at run-time. Because heterogeneous data are allowed, the data that are navigated to can be brought back and displayed on the same window as the starting point of the navigation. This has advantages over web-style navigation, wherein the user has to leave one piece of data to go to another. In existing art database applications, navigating from one piece of data to another is usually performed using forms programming. In contrast to forms programming used with background art databases, the invention allows a uniform interface to databases. In further contrast to background art forms programming, a software application can be designed without knowing the schema of the database(s) to which the database(s) are to be interfaced. Moreover, common master-detail relationships in relational databases can be displayed in a way that is easy to understand without any programming effort. In contrast to background art forms programming, list-items can be edited in position rather than at the top of a combination list. By providing a combination of mixed data classes and a granularity of one record for saving data, the user can access all the data he/she is interested in from the same window. In contrast to background art grid programming data from, different types of database can coexist in the same grid. In contrast to forms programming, the user can decide the flow of navigation at run-time with great flexibility.

Preferred embodiments of the present invention extend the concept of a grid control to non-tabular data including references and multi-valued attributes. Traditionally, references and multi-valued attributes were handled in a forms environment. Preferred embodiments of the present invention simplify the representation of relational data, object-relational data or object data, or semi-structured data by using only four extra visual elements: the record handle, list handle, join icon and the drop-down list. The present invention also allows the display of heterogeneous data—data of different types and with different numbers of fields can be mixed in the same display. Using a simple display format, complications in the data model are not reflected in the on-screen representation. This provides the visual representation a general applicability. With preferred embodiments of the present invention, visual representation of data that is the result of inheritance does not differ from representation of other kinds of data. Thus, the visual representation does not have to be as complicated as the underlying data.

The invention also deals with the use of hierarchical trees to represent data schemas. A data schema is the information describing what kinds of records, tables and objects the database currently stores. In the simple example of the relational system, one part of the schema would detail the names of the tables and the names and types of fields within a given table. Where references are implemented between records in one table and another via primary-key/foreign-key pairs, or where an equivalent linking of references in object databases between an attribute in one type of object and objects of a specific type exists, descriptions of these references would also form part of the data schema. Typically in a relational system, the data in the schema about foreign keys are displayed separately from the data about the columns or fields within a table. In the current invention, the foreign keys are represented as expansible extra columns. By displaying the foreign keys in the same part of a hierarchical data schema tree as the columns, the user is helped to generate queries on the data, particularly those involving joins.

In preferred embodiments, the screen or display of the present invention is associated with a computer, a Wireless Applications Protocol (WAP) telephone, an interactive digital television (IDTV) or any other device with a screen and a means for the user to interact with the data contents of that screen or display. The grid control of the present invention may form part of an Internet browser, or a plug-in to an Internet browser, or the records and/or join icons can be displayed in such a browser without use of the grid control.

Preferred embodiments of the present invention further include software packages containing a grid control and records and join icons of the present invention. These software packages comprise database software applications which illustrate how the preferred embodiments of the grid control and records of the present invention improve usability compared with existing art software packages.

In a preferred embodiment of the present invention, the unit of data granularity on the screen is the record. Preferably, each record has a visual element called a 'record handle', which is used to move between the various stages of data retrieval, editing, saving, closing and removing records from the screen. The 'record handle' is an extra field which stands for (represents) the whole record. In object databases, it stores the OID of the object that the record is representing. For other data models, it can store other means of locating the data in the database, such as a primary key. It tracks the state of the record from newly keyed-in to saved, to modified, to closed or deleted.

In a preferred embodiment, the invention is a computerized method for representing data on a display, the method comprising: querying a data source to obtain data comprising a first data record; presenting the first data record on the display as a data field; and presenting on the display a record handle for manipulation of the first data record; wherein the data field is selected from the group consisting of a single data element, a list of data elements, and a reference to a second data record; wherein the record handle is a visual element that represents the first data record and that is operative to track and control the state of the first data record.

In a computer system having a memory and a graphical user interface including a display and an input device for use by a user, a preferred embodiment of the invention is a method of displaying and manipulating data in a first data record stored in a database residing in said memory, the method comprising: retrieving said first data record from said database, said first data record having at least one data element; displaying a record handle having a state on the display wherein said state is selected from the group consisting of (1) a save state that is displayed after the at least one data element has been entered or changed by the user and in which state said record handle is operative to save to the database all the data elements in the displayed first data record, (2) a close state that is displayed after the at least one data element has been saved by the user and in which state said record handle is operative to remove all the data elements in the first data record from the display, and (3) a get state that is displayed after the data element is removed from the display and in which state said record handle is operative to refresh all the data elements in the first data record on the display; and displaying the first data record on the display as one or more data fields; wherein said record handle is a visual element that represents the first data record and that is operative to track and control said state.

In another preferred embodiment, the invention is a computer-readable medium having computer-executable instructions for performing a method, the method comprising: displaying a data field at a first location on a screen, said data field containing a data element of a first data record; and displaying a record handle at a second location on the screen, said second location being horizontally in-line with said first location and said record handle being operative by a user to save the data element to a memory after it has been changed by the user; wherein said record handle is a visual element that represents the first data record and that is operative to track and control the state of the first data record.

In a further preferred embodiment, the invention is an apparatus for representing data on a display, the apparatus comprising: means for querying a data source to obtain data comprising a first data record; means for presenting the first data record on the display as a data field; and means for presenting on the display a record handle for manipulation by a user of the first data record, said record handle being operative to track the state of said first data record and being capable of performing actions on said first data record; wherein the data field is selected from the group consisting of a single data element, a list of data elements, and a reference to a second data record; wherein said record handle is a visual element that represents the first data record and that is operative to track and control the state of the first data record.

In preferred embodiments, the record handle can be selected by a user in several ways. Depending on the embodiment, record handle selection may be by speech activation, keyboard input or use of the mouse. In a preferred embodiment, selection is by clicking the mouse in one of three ways: single click on the left button—known as single-click, double-click on the left button—known as double-click, and single click on the right button—known as right-click. For brevity, these selections are referred to in this disclosure as single-clicking, double-clicking or right-clicking, although, as explained above, other input devices may be used. Preferably, the current default action of the record handle is selected by a single-click, and, in preferred embodiments, the name of this action is displayed as text on the handle. Preferably, a right-click on the handle reveals a pop-up menu with a list of the names of other possible actions of which the record handle is capable. These actions can also be supplied by software application programmers. An action can modify the default action and action list, thus enabling the record handle to go through a series of states adapted to the data it is being used to manage.

In preferred embodiments, the other graphical elements of the present invention are also capable of default actions and action lists. A record on the screen consists of a record handle (whose display item is a single-valued reference), followed by a series of data fields. The types of data fields include: single-valued reference field, reference list, single-valued text field and multi-valued text field.

In addition, in a preferred embodiment, a row on the screen may also contain the representation of a join. The data fields, reference fields and the join are collectively described as display items. The graphical elements representing these fields and joins include: record handle, list handle, single-valued text cell, multi-valued text cell and join icon. The present invention also allows for the creation of new data field types and associated graphical element types. In a preferred embodiment the join is only displayed for joins not being related to primary key/foreign key relationships.

In preferred embodiments, the data fields of the present invention are represented by graphical elements. A normal text or numeric data field, for example, is represented by a single text cell similar to one on a background art spreadsheet or database. Text can be edited within the cell. Upon editing, the change in the contents of the cell is noted by the cell, and the cell informs its record handle. Usually, the record handle sets its default action to 'Save' at this point, because the data on the screen is different from that in the database. If the record handle's 'Save' action is now selected, the procedure supplied for that action for that particular record handle is performed. The procedure saves the data to the database that the record is stored in, in a way suited to that database.

In a preferred embodiment, fields in the record can be multi-valued. A multi-valued text field contains a multi-valued version of the normal text or numeric data field described above. This field is represented by a list of cells starting at the current row and displaying subsequent cells below the first one. These cells are called multi-valued text cells, although individually they only contain one value. These cells can be edited in the same way as the single-valued text cells in contrast with existing art combination list boxes which select from a list but edit in a list box at the top of it, but the list is capable of being contracted to occupy the space of a single cell on the top row by double-clicking any of the elements. In a preferred embodiment, double-clicking on a contracted list re-expands the list to display all elements in it. The lists can either overlay data records below them or push them down. Thus, the multi-valued text cell is similar to a single-valued one except for its action following a double-click.

In a preferred embodiment, fields in the record can be references, that is, the fields can refer to other data records. Reference fields are displayed as record handles. When a record containing a reference is displayed on the screen, the record handle representing the reference field may refer to data that is not yet on the screen. In this case, the default action of the reference's record handle is 'Get'. The 'Get' action retrieves the referenced data from the database and expands it inline on the screen starting at the reference's record handle. Subsequent fields in the existing record that contained the reference are displaced to the right to accommodate the new data.

In a preferred embodiment, the record handle controls the behavior of the data record, not the display row. If there are joined records or records of expanded references, the actions of the record handle do not normally extend to these. For example, a 'Save' action on a record handle does not normally save changes to data within another record in the same row that was fetched as an expanded reference.

In another preferred embodiment, fields in the record can be lists of references. In the expanded form of the list, the display consists of a vertical list of record handles. In the unexpanded form, a graphical element called a list handle is displayed. The default action of this element is to expand the list, hence causing the list handle to disappear.

In a preferred embodiment, records of the present invention may be displayed within a grid control. This grid control is a scrollable area capable of controlling the display of records and headers within it.

In a preferred embodiment, a data row has an optional header. If a header is required, the grid control is capable of displaying a header above the data records and joins within the row.

In contrast with background art database GUI's, the grid control of the present invention is designed to display heterogeneous data—data of differing types with different number and types of fields—in the same area. This support of heterogeneous data increases user productivity, and extends the types of query the user can run on data. Preferably, the grid control has sufficient intelligence to manage the display of a single header row over a series of data records that are of the same type or whose fields match, but to insert a new header when the data being displayed on the next row changes.

If the action of a record handle modifies the layout of fields on the screen, such as expanding a reference in-line, the grid control has sufficient intelligence to adapt the header to the changed data below it, inserting labels into the header and potentially inserting new header rows between records that previously were of the same format but now differ. In other cases, the header rows may removed as either the row above changes to become like the row below or vice versa. In cases where the data differs between rows of records that are the result of expanding references in a reference list, in a preferred implementation header sub-rows are introduced with act as headers for these records.

In a preferred embodiment, the grid control controls the display of the data fields and joins. For example, if a record on one row is removed from the screen by selecting its 'Close' action, the subsequent records are moved upwards to take up the space.

Preferred embodiments of the present invention bring listing and navigating capabilities of the forms environment to the grid, but without the extensive programming required for forms. They also bring a common visual representation for relational and non-relational databases.

A preferred embodiment of the present invention can be used with both relational and non-relational databases. In the relational database case, it provides easier navigation between records in relational database tables related by primary key/foreign key links. In 'native' format, it allows interfaces to object databases including those which represent the entity-relation model without breaking them down using relational normalization. It achieves this by providing visual analogs to references and to multi-valued elements of objects. Thus, the data model used is even more flexible than the entity-relation model.

In a preferred embodiment, data input and retrieval can take place in a mixed record-type format. Thus, a user does not need to change windows to input two different types of record. Similarly, data retrieval is sufficiently flexible to select data that is of different types. These types may be linked by similar data somewhere in their data fields.

Records within the same grid may even be from completely different kinds of datasource. In a preferred embodiment of the present invention, a relational record could coexist with an XML record. The 'Save' action on the record handles of these two records would call radically different callback procedures. The former might send a command via ODBC to a data-source, while the latter may send the modified data to an internet web servlet. Thus, the invention has the advantage of using a consistent visual interface, rather than requiring a consistent underlying data model. Existing art grids usually link to a standardized data source.

In a preferred embodiment of the present invention, a selection of data from a single table in a relational database is displayed as rows of records. Each row starts with the record handle, followed by the contents of the columns in the table displayed in single-valued text cells. A selection of data from a relational database using an SQL query containing a join can be displayed in the same way, but in this case the programming of the interface between the grid control becomes more complicated. It may not be possible to modify data in these records and save them, as the data record on the screen spans two tables in the database. The display produced by a normal join that uses a primary key/foreign key pair, often called a natural join, usually contains repetition of data that comes from a single field in the database. To improve the display and action, the user may use the object display mode of the present invention. In this mode, fields belonging to the table on the right are given a second record handle. The handles store the primary key information required to save the records to the relational database. If the SQL query did not contain this primary key, the preferred embodiment of the grid control/RDBMS interface of the present invention adds the required columns to the query before sending it. These extra columns are not displayed, but the primary key information is stored. The object display format displays a join query between a master and detail table in such a way that the same record in the master table only occurs once (unless sorting requirements of the query disallows this). Preferably the present invention displays foreign keys as references, that is as record handles appended to the data in a relational record. If the join is a natural one, the record handle representing the relevant foreign key is expanded inline with the data from the related table. Foreign keys in a detail table are displayed as single references in the detail table itself. Foreign keys in a detail table map to lists of references in the master table. In the latter case, the foreign key is represented by a vertical list of reference handles. The records from the detail table that match the current master table are displayed one below the other. It is noted that this format is appropriate for many common reports. Whereas one of the goals of the relational method of organizing data was to reduce data duplication in storage, it increased duplication in query output. The object display format reduces this duplication. Once in the object display format, the data can be modified and written back to the database. These gains in formatting and elimination are also present in existing art hierarchical grids.

Because, in a preferred embodiment, the grid control of the present invention is designed to display heterogeneous data, it can be used with non-standard extensions of the SQL language that allow queries to be run on relational databases that return heterogeneous data. The non-standard queries can be processed by the preferred embodiment of the grid control/RDBMS interface of the current invention to break them down into more than one standard SQL query. Post-processing of the results returned allows operations such as sorts to be performed on fields in the combined data from all of the queries, leading to heterogeneous data sorted according to common criteria.

In a further embodiment of an interface between the grid control of the present invention and a relational database, metadata which groups relational tables by means of primary and foreign keys into larger entities is stored in the interface between the RDBMS and the grid. The primary and foreign key columns from the relational tables used to create the attributes of the larger entity are hidden where appropriate. The larger entities may be displayed as single records on the screen. Foreign keys not involved internally in the combined entity may be represented as reference attributes as shown above. In this way, the grid control can be used to display entities in the format that they were designed in before they were normalized to conform to the relational model.

In a further embodiment, an interface of the present invention between the grid control of the present invention and an object database is provided that causes the programming of the interface to become trivial for objects that are retrieved and saved using an OID.

In a preferred embodiment, one copy of the grid control is incorporated into the main Data Processing window of a preferred embodiment of the present invention. There are two other windows in this preferred embodiment, the New Type window which allows selection of different or new types of data, and the Data Retrieval window, which is used to select new data in graphical ways as well as using queries in standard or extended versions of SQL. The Data Retrieval window contains another grid control, in which sets of selected data can be refined or augmented before returning to the Data Processing window. The Data Retrieval and New Type windows have tree hierarchies of data types and their attributes organized in novel ways.

A preferred embodiment of the present invention uses a graphical element called a join icon to represent relational and other joins between data. In the case of natural joins in a relational database, this icon is preferably redundant, as the join already centers on the pivotal role of the record handle that acts as a field in the master table record and also as the record handle for the detail record. In a preferred embodiment, a join icon can be created to be associated with existing data in the grid. Graphical elements representing data can be selected singly or in groups. If the action 'Join' is then selected, the selected data forms the left-hand side of a join. Each resulting data element has a join icon displayed alongside it and the Data Retrieval window is then used to complete the right-hand side of the join by selecting data attributes to join with the selected items.

In a preferred embodiment, the grid control is designed to receive logical display items which represent parts of the record to be displayed. By separating these display items themselves from the graphical elements that represent them, and by allowing actions to be added to the display items at run-time, new display item types, such as for multi-media data, can be created simply in preferred embodiments of the invention. New actions and new versions of existing actions can be defined to interface the graphical elements representing the record to different types of underlying data.

Preferred embodiments of the present invention uses database queries that rely on extensions of the Standard Query Language (SQL). Some of the extensions are already in use, as a review of U.S. Pat. Nos. 5,884,304 and 6,016,497 reveals. The extensions are explained as they occur. Note, however, that whereas the SQL language is designed for relational databases, the extensions are useful in both relational and non-relational contexts.

Recent attempts have been made to develop replacements or extensions of the SQL language which incorporate such features. For example, Davis, III et al. describes some extensions in U.S. Pat. No. 5,884,304 that were developed by the Department of Computer Science at Stanford University, CA. Note, however, that the data model of the Lorel language is more complicated than that used in preferred embodiments of the present invention.

In preferred embodiments, the enhanced replacement to cell to the left of the record 210 is called a 'record handle', preferably, but not necessarily, lying to the left of data records. The handle may exist anywhere within the data grid, thus allowing an object style of data access. The object style of access does not require an object-based underlying database. The present invention also brings advantages to data access to relational database systems. Its uses are not limited to use with these types of database, as it supports either rigid or very loose underlying data structures. A requirement of preferred embodiment of the invention is as follows: if there is a requirement to modify the data on-screen and save it back to the database, sufficient data must be maintained in the grid or the record itself to allow the data to be saved.

A preferred embodiment of the invention is a computerized method for representing data on a display, the method comprising: querying a data source (e.g., a database or an XML document) to obtain data comprising a first data record; presenting the first data record on the display as a data field; and presenting on the display a record handle for manipulation of the first data record; wherein the data field is a list of data elements or a reference to a second data record. Preferably, the data obtained during the querying step further comprises metadata concerning the first data record and the method further comprises: presenting on the display the metadata as a label in a header above the data field. Preferably, the vertical list of data elements is presented in a format such as a single data element in the list, a list handle that is operative to present all the data elements in the list, all of the data elements in the list, or a new field that is operative to allow the user to add a data element to the list. Preferably, the reference to the second data record is presented in one or more of the following formats: a get handle that is operative to display a second data element in the second data record on the same line upon which the get handle is displayed wherein the displayed record handle is not operative to save data to the second record, or a second record handle and the data element in the second data record. In preferred embodiments, the metadata that is obtained comprises a first data record type and a first data element name.

In a computer system having a memory and a graphical user interface including a display and an input device for use by a user, a preferred embodiment of the invention is a method of displaying and manipulating data in a first data record stored in a database residing in said memory, the method comprising: retrieving said first data record from said database, said first data record having at least one data element; displaying a record handle having a state on the display wherein said state comprises a save state that is displayed after the at least one data element has been entered or changed by the user and in which state said record handle is operative to save to the database all the data elements in the displayed first data record, a close state that is displayed after the at least one data element has been saved by the user and in which state said record handle is operative to remove all the data elements in the first data record from the display, or a get state that is displayed after the data element is removed from the display and in which state said record handle is operative to refresh all the data elements in the first data record on the display; and displaying the first data record on the display as one or more data fields. In preferred embodiments, the method further comprises: displaying on the display a header comprising one or more names wherein said one or more names is a type name for the type of the first data record, and a data element name for the at least one data element. In another preferred embodiment, the first data record comprises more than one data element and displaying the first data record on the display comprises displaying a display item comprising of a single-valued data field, a multi-valued data field, or a reference to another data record. Preferably, the method further comprises: retrieving one or more heterogeneous records from a plurality of databases for display and manipulation. In preferred embodiments, the at least one data element comprises character data or binary data. Preferably, method further comprises: displaying on the display a retractable multi-valued data field as a list handle that is operative to display on the display each individual data element comprising the multi-valued data item in a drop down list. Preferably, the method further comprises: displaying on the display a reference data field of the first data record that refers to a second data record as a second record handle having a get state that is operative to display on the display the second data elements of the second data record on the same line upon which the record handle having a get state is displayed wherein the record handle of the first data record is not operative to save to the database the second data elements of the second data record; and displaying a third record handle on the display having a new state that is operative to create or link another referenced data record to the first data record. Preferably, the method further comprises: entering a query statement into a user interface element before the retrieving step is executed. Preferably, the query statement is a join statement that is operative to cause a second data record to be displayed on the same line as the first data record, said first displayed data record and said second displayed data record being separated by a symbol and being related in the manner specified in the join statement.

A preferred embodiment of the invention is a grid control programmed to implement a method disclosed herein, the contents of said grid control being accessible by scrolling. Preferably, the grid control is implemented as a Windows component.

In a preferred embodiment, the invention is a computer-readable medium having computer-executable instructions for performing a method, the method comprising: retrieving a data record from a database, said record having a plurality of data elements; displaying a record handle on a display wherein said record handle is a save handle that is displayed after one the data element has been input or edited by a user and that is operative when selected by a user to save all the data elements in the data record to the database, a close handle that is displayed after the data elements have been saved by the user and that is operative when selected by the user to remove all the data elements from the display, and a get handle that is displayed after the data elements are removed from the display and that is operative when selected by the user to refresh all the data elements on the display; and displaying the data elements on the display wherein each one of said data elements is a null data element, a character or numerical data element, a list or array of data elements, or a reference to another data record. Preferably, the method further comprises: at the option of the user, displaying on the display a header line comprising one or more names wherein said one or more names is a type name for the type of the data record, or a field name for the data field.

In a computer system having a memory and a graphical user interface including a display and an input device for use by a user, a preferred embodiment of the invention is an apparatus for displaying and manipulating data in a first data record stored in a database residing in said memory, the apparatus comprising: means for retrieving said first data record from said database, said first data record having at least one data element; means for displaying a record handle having a state on the display wherein said state is a save state that is displayed after the at least one data element has been entered or changed by the user and in which state said record handle is operative to save to the database all the data elements in the displayed first data record, a close state that is displayed after the at least one data element has been saved by the user and in which state said record handle is operative to remove all the data elements in the first data record from the display, or a get state that is displayed after the data element is removed from the display and in which state said record handle is operative to refresh all the data elements in the first data record on the display; and means for displaying the first data record on the display as one or more data fields. Preferably, the apparatus further comprises: means for displaying on the display a header comprising one or more names wherein said one or more names is a type name for the type of the first data record, and a data element name for the at least one data element. Preferably, the first data record comprises more than one data element and the means for displaying the first data record on the display comprises means for displaying a display item comprising a single-valued data field, a multi-valued data field, or a reference to another data record. Preferably, the apparatus further comprises: means for retrieving one or more heterogeneous records from a plurality of databases for display and manipulation. Preferably, the apparatus of claim 19 wherein the at least one data element comprises character data or binary data. Preferably, the apparatus further comprises: means for displaying on the display a retractable multi-valued data field as a list handle that is operative to display on the display each individual data element comprising the multi-valued data item in a drop down list. Preferably, the apparatus also further comprises: means for displaying on the display a reference data field of the first data record that refers to a second data record as a record handle having a get state that is operative to display on the display the second data elements of the second data record on the same line upon which the record handle having a get state is displayed wherein the record handle of the first data record is not operative to save to the database the second data elements of the second data record. Preferably, the apparatus further comprises: means for entering a query statement into a user interface element before the retrieving step is executed. Preferably, the query statement is a join statement that is operative to cause a second data record to be displayed on the same line as the first data record, said first displayed data record and said second displayed data record being separated by a symbol and being related in the manner specified in the join statement. In a preferred embodiment, the invention is a grid control comprising an apparatus disclosed herein.

In a preferred embodiment, the invention is a computerized method for querying by a user of a non-relational database, said database comprising a data record that comprises a multi-valued attribute and a single-valued attribute, said method comprising: said user submitting a select command to the database, said select command instructing the database to retrieve information concerning said multi-valued attribute and said single-valued attribute; and said database returning a name for said multi-valued attribute, each value of said multi-valued attribute, a name for said single-valued attribute and the single value of said single-valued attribute; wherein said returned data is displayed by means of a grid control disclosed herein.

In a preferred embodiment, the invention is a computerized method for querying by a user of a non-relational database, said database comprising a plurality of data records, at least some of which data records comprising a multi-valued attribute, said method comprising: said user submitting a select command to a database, said select command instructing the database to conditionally retrieve information concerning said plurality of data records, wherein the condition is selected from the group consisting of an any condition that is operative to select any data record wherein at least one of the values of the multi-valued attribute of the selected record is equal to, less than or greater than a given value, and an all condition that is operative to select any data record wherein all of the values of the multi-valued attribute of the selected data record are equal to, less than or greater than a given value; and said database returning information concerning each data record that meets the selected condition; wherein said returned information is displayed by means of a grid control disclosed herein. Preferably, the computerized method further comprises: in the case of the any condition, displaying either the values of all multi-valued attributes in the selected data records or, if the keyword selected is present in the query, only the values of the multi-valued attributes that comply with the condition.

In another preferred embodiment, the invention is a computer-readable medium having computer-executable instructions for performing a method, the method comprising: displaying a data field at a first location on a screen, said data field containing a data element; and displaying a record handle at a second location on the screen, said second location being horizontally in-line with said first location and said record handle being operative by a user to save the data element to a memory after it has been changed by the user. Preferably, the method further comprises: displaying the default action of the record handle on the record handle. Preferably, the method further comprises: upon activation of a menu associated with the record handle by a user, revealing record handle actions available to the user. Preferably, the method further comprises: displaying a multi-valued data field on the screen, said multi-valued data field comprising attributes, said attributes being displayable as a vertical list with each member of the list being displayed in an editable cell and said attributes being contractable into a single graphical element. Preferably, the method further comprises: displaying a header on the screen above the data field, said header comprising a label that describes data field on the screen below it.

In a computer system having a graphical user interface for use by a user, the graphical user interface including a display and a selection device, a preferred embodiment of the invention is a method of providing and selecting from a menu on the display, the method comprising: displaying a first data field consisting of at least one data element on the display; in response to selection of the first data field by the user, retrieving a set of menu entries for the menu, each of the menu entries representing an action to be performed by the computer system on the contents of the first data first; displaying the set of menu entries on the display; in response to selection of a menu entry by the user, receiving a menu entry selection signal indicative of the selection device pointing at a selected menu; and in response to the signal, performing the action on the contents of the first data cell. Preferably, the action is a join action and the method further comprises: presenting on the display a window that contains means for selecting a second data field with which the first data field is to be joined; and in response to selection of the second data field, presenting the joined data on the display.

In yet another preferred embodiments, the invention is a grid control programmed to implement a method disclosed herein, said grid control further comprising: a scrollable area capable of automatically controlling the display of data records and headers within it. Preferably, the grid control is operative to implement the process of moving lower records upward to take up intervening space when a upper data record is closed and moving lower records downward when a list in an upper record is expanded. Preferably, the grid control is programmed to implement the method of displaying data of different types, from different sources, and of different data models, having different numbers of fields, and different width fields all at the same time. Preferably, the grid control is programmed to implement the method of displaying multi-valued reference attributes as lists of record handles. Preferably, the grid control is programmed so that the record handle is capable of implementing a remove action which makes the data field refer to nothing.

In a further preferred embodiment, the invention is an apparatus for representing data on a display, the apparatus comprising: means for querying a data source to obtain data comprising a first data record; means for presenting the first data record on the display as a data field; and means for presenting on the display a record handle for manipulation by a user of the first data record; wherein the data field is a list of data elements, or a reference to a second data record. Preferably, the apparatus further comprises: means for displaying all of the elements in a hierarchical view of a data schema of the data source at the top level of a tree view, even if some of the elements also occur somewhere else in the hierarchy. Preferably, the apparatus further comprises: means for displaying the representations of attributes below the representations of attribute types as well as below the representations of record types on a tree view, by providing that the branches of a tree view extend outward from their sources at different angles to represent different dimensions in the hierarchy. Preferably, the apparatus further comprises: means for displaying a foreign key from a relational database having a data schema as an expansible tree element, thereby allowing for navigation of the data schema via the foreign key. Preferably, the apparatus further comprises: means for navigating through the data schema to represent a join via links across the foreign key which are capable of automatic query generation, or automatic generation of a part of an SQL or other query that uses the foreign keys in its joins. Preferably, the apparatus further comprises: means for presenting the first data record on the display as a first plurality of data fields; wherein at least one of the first plurality of data fields is a list of data elements, or a reference to a second data record. Preferably, the at least one data field is a reference to a second data record that has been expanded horizontally inline within the first record, displacing at least some of the data fields of the first record to the right on the display. Preferably, the apparatus further comprises: means for displaying a plurality of representations of foreign keys relating a first table to a second table in a relational database in a plurality of second data fields in a column in a grid displaying data from the first table, each of the plurality of second data fields comprising a display item selected from the group consisting of a record handle and a list handle, and each of said display items being operative to fetch data from the second table when the display item is selected by the user. Preferably, the apparatus further comprises: means for displaying a foreign key from a relational database having a data schema as an expansible element of a tree, thereby allowing for navigation of the data schema via the foreign key.

In another embodiment, the invention is a computer-readable medium having computer-executable instructions for performing a method, the method comprising: retrieving a data record from a database, said record having a plurality of data fields; displaying a record handle on a display wherein said record handle changes visually to become a save handle that is displayed after one of the data fields has been input or edited by a user and that is operative when selected by a user to save all the data fields in the data record to the database, a close handle that is displayed after the data fields have been saved by the user and that is operative when selected by the user to remove all the data fields from the display, and a get handle that is displayed after the data fields are removed from the display and that is operative when selected by the user to refresh all the data fields on the display; and displaying the data fields on the display wherein each one of said data fields is selected from the group consisting of a null data element, a character or numerical data element, a list or array of data elements, and a reference to another data record; wherein said record handle is a visual element that represents said data record and that is operative to track and control the state of said data record. Preferably, the method further comprises: at the option of the user, displaying on the display a header line comprising one or more names wherein said one or more names is a type name for the type of the data record, or a field name for the data field.

In yet another preferred embodiment, the invention is a computer-readable medium having computer-executable instructions for performing a method, the method comprising: displaying a data field at a first location on a screen, said data field containing a data element of a first data record in a data source; and displaying a record handle at a second location on the screen, said second location being horizontally in-line with said first location and said record handle being operative by a user to save the data element to a memory after it has been changed by the user; wherein the record handle is a visual element that represents the first data record and that is operative to control and continuously track the state of the first data record on the screen and in the data source; and wherein the record handle is operative to indicate to a user a current default action that will be activated when the user clicks on the record handle. Preferably, the computer-readable medium has further computer-executable instructions for performing the method, the method further comprising: displaying the default action of the record handle on the record handle. Preferably, the computer-readable medium has further computer-executable instructions for performing the method, the method further comprising: upon activation of a menu associated with the record handle by a user, revealing record handle actions available to the user. Preferably, the computer-readable medium has further computer-executable instructions for performing the method, the method further comprising: displaying a multi-valued data field on the screen, said multi-valued data field comprising attributes, said attributes being displayable as a vertical list with each member of the list being displayed in an editable cell and said attributes being contractable into a single graphical element. Preferably, the computer-readable medium has further computer-executable instructions for performing the method, the method further comprising: displaying a header on the screen above the data field, said header comprising a label that describes data field on the screen below it.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the inventive concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings:

FIG. 4 shows the basic hardware and software environment of a preferred embodiment of the present invention.

FIG. 5 shows a simple record of a preferred embodiment of the present invention.

Figures 1, 2:
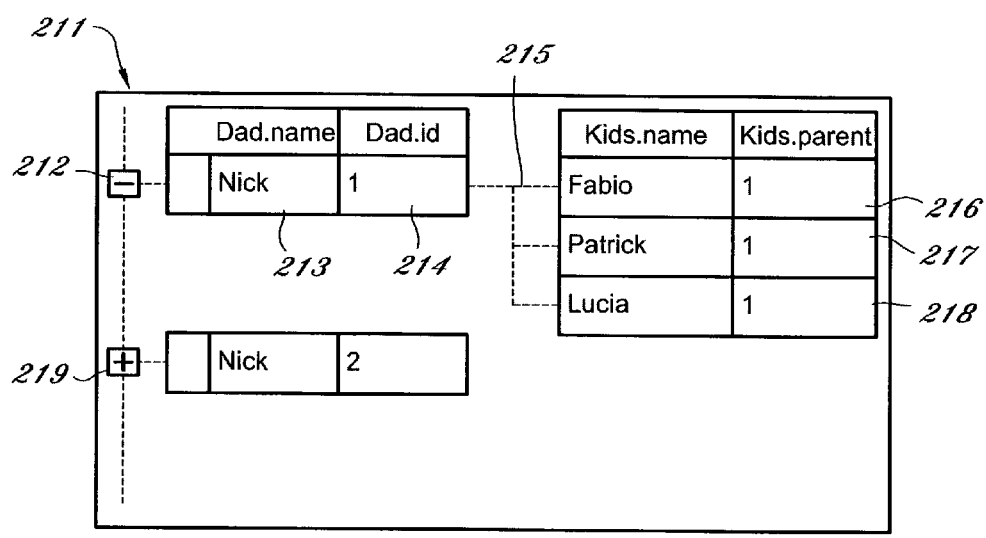
FIG. 1 shows a background art grid control.
FIG. 2 shows a background art hierarchical grid control.
Figure 3:
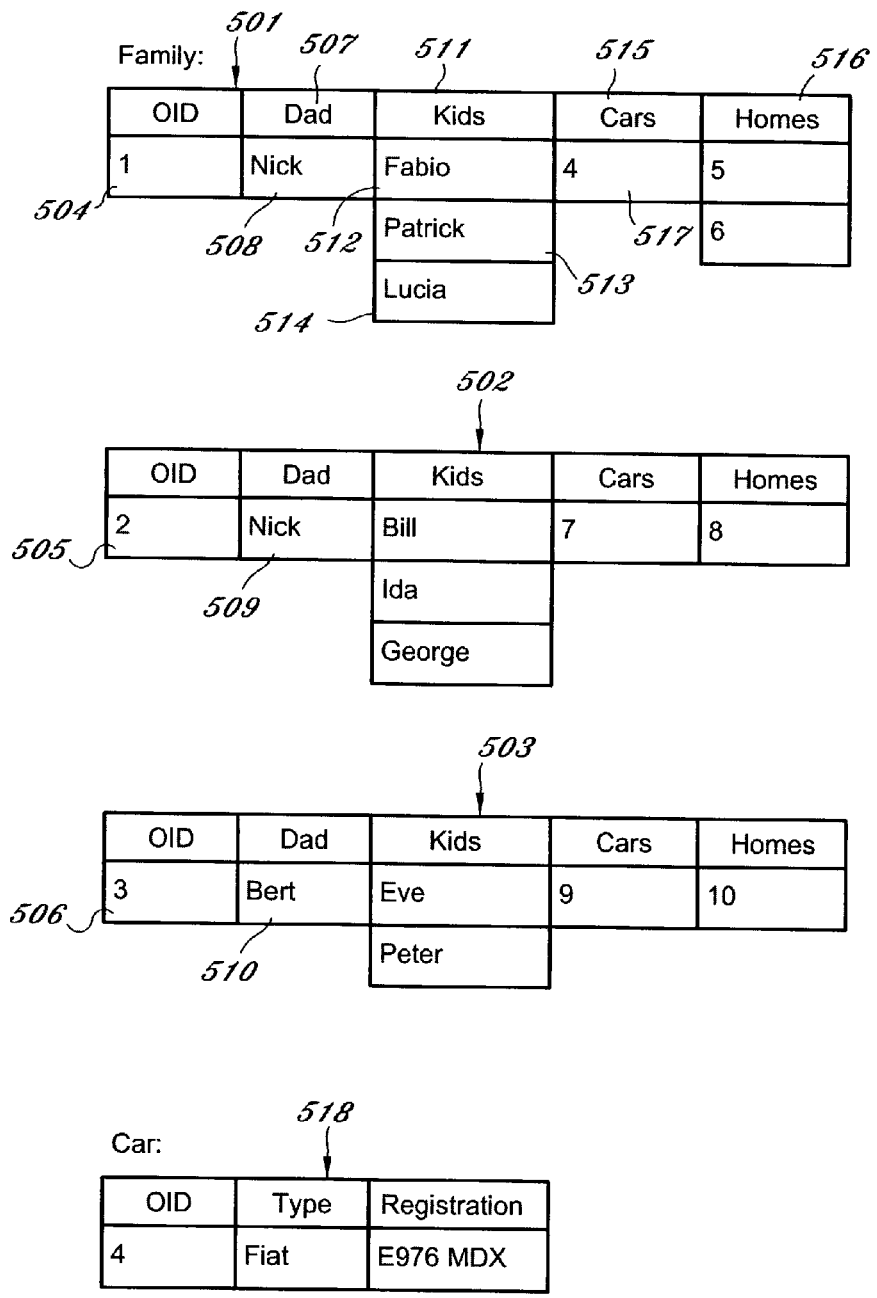
FIG. 3 shows multi-valued attributes and references in the background art object data model.

The following reference numerals are used to indicate the parts and environment of the invention on the drawings:

201 background art grid control
202 outer frame
203 cell
204 'Dad.id' column
205 selected cell
206 'Kids.Parent' column
207 data cell
209 menu of options
210 cell to the left of the record
211 background art hierarchical grid
212 first detail records expansion node
213 first master record value
214 second master record value
215 tree lines
216 first detail record
217 second detail record
218 third detail record
219 second detail records expansion node
501 first 'family' object
502 second 'family' object
503 third 'family' object
504 first OID
505 second OID
506 third OID
507 'Dad' attribute
508 first value
509 second value
510 third value
511 'Kid' attribute, multi-valued attribute
512 first data element
513 second data element
514 third data element
515 'Cars' attribute
516 'Homes' attribute
517 (reference) value
518 'car' object
601 screen or display
602 cursor
603 processing units
604 keyboard or keypad, input device
605 microphone, input device
606 computer mouse, mouse, input device
607 generic input device, input device
701 optional header row
702 data record 703 header cell
704-709 cells
710 left-handle cell, record handle, handle
711-716 data fields
802 Data Processing window, main Data Processing window
803 grid control, data grid
804 query entry window, query window
805 'Run Query' button
806 'New Type' button
807 'New Object' button
808 'Get Data' button
809 first header
810 first data record
811 second header
812 second data record
813-814 record handles
901-902 handles
1001 record header
1002 record header
1003-1005 data records
1006 'Electricity Bill' header
1007 'Electricity Bill' record
1008-1011 data fields
1012 cell
1013 record handle
1014 pop-up menu
1015 "Save" action
1016 'New' action
1017 'Get' action
1306 divider
1307 record types button
1308-1309 attribute types buttons
1310 scroll arrow
1311 'Cars' column
1312 'Gas Bill' record
1313 'Family' record
1314 header row
1315 handle
1316 display item
1317-1319 names of children, data elements, cells
1320 empty cell
1321 first reference, first reference data element, 'Cars' reference, handle
1322 second reference, 'New' record handle, field
1323 list handle, 'Homes' field, data fields for 'Home'
1402, 1403 header labels
1404, 1405 data fields
1406 'Homes' label
1501 query window
1502 first record handle
1503, 1504 fields
1504 'Customer' field
1505 join icon
1506 second record handle
1507 'Name' field
1508 'Age' field
1509 third record handle
1510 'Name' field
1511 'Age' field
1512-1514 'Electricity Bill' fields
1801 New Type window
1802 scrolling region
1803 'Gas Bill' type button
1804 'Family' type button
1805 text type button
1806 ref type button
1807 reflist type button
1808, 1809 pair of arrows
1810 New Type window grid
1811 hierarchical data schema tree, data schema tree
1812, 1813 scrollbars
1814, 1815 diagonally-hatched folder shapes
1814 'Family' type
1816, 1817 nodes
1816 attribute node
1818-1826 black folder shapes
1820 'Number' attribute type
1821 'Float' attribute type
1822 'Integer' attribute type
1825 'Text' attribute type
1826 'Text20' attribute type
1827 (minus sign within) box, node
1828 plus sign within box, plus sign
1829 top left cell, 'Family2' cell
1830 'Attribute type' cell
1831 'Multi-valued?' cell
1832 grid scrollbar
1837-1839 remaining cells
1840 check box
1841 'Cancel' button
1842 'OK' button
1901 Data Retrieval window
1902 query window
1903 command button region
1904 scrollable region, keyword region
1905, 1906 arrows
1907 type and attribute type data schema tree, data schema tree
1908 data grid
1909-1912 attributes
1910 'kids' attribute
1913 'cars' node
1914 'homes' node
1915 'Keep' button
1916 'Drop' button
1917 'More fields' button
1918 'Cancel' button
1919 'Return' button
1920 'Select' button
1921 returned record
1922 data element
1923 'Cars' attribute
1924, 1925 data elements
2001 'datetime' attribute type
2002 'date' attribute type
2003 'timestamp' attribute type
2004 'Birthday attribute' (in 'People' type)
2005 'Time attribute' (in 'Call' type)
2006 first record
2007 second record
2009 'Time'
2010 'Birthday'
2011 'More Fields' button
2012 'Cancel' button
2013 'Return' button
2101 grid, grid control
2102-2104 rows
2105 type, grid control type
2106 type names
2107, 2108 type attributes
2109-2111 header labels
2112 first data record
2113, 2115, 2117, 2121, 2123, 2125 display items 2118, 2119 data elements
2113, 2121 record handles
2120 second data record
2126, 2127 data elements
2128 dashed line
2201 object database/grid interface, interface
2202 type, object's type
2203 type name
2204, 2205, 2206, 2207 attributes
2208 object
2209 object identifier (OID)
2210 series of elements
2211, 2212 data fields, groups of elements
2210-2212 elements
2213, 2214 elements
2215, 2216 elements
2217 display item
2301 relational database/grid interface, grid interface, interface
2302 table
2303 table name
2304-2307 table columns
2308 row
2309-2312 data fields
2311 item
2312 item
2313 data record
2314 item, display item, handle
2315 data element
2316-2319 items
2320-2323 data elements
2324 type
2325 type name
2326-2329 attributes
2401 database/grid interface, interface
2402 first table
2403 first table name
2404, 2405 columns
2404 'Dad.name' column
2405 'Dad.id' column
2406 second table
2407 second table name
2408 'Kids.name' column
2409 'Kids.Parent' column
2410 first row
2411-2414 fields, data fields
2415 second row
2416-2419 fields, data fields
2420 type
2421 type name
2422 'Dad' attribute
2423 'Kids' attribute
2424 data record
2425 first display item
2426 data element
3001 relational database management system, RDBMS
3002 software application, interface
3003 grid control
3004 allocation procedure
3005 connection procedure
3006 pre-parsing procedure
3007 query transmission procedure
3008 data transmission procedure
3009 type and record allocation procedure
3010 row passing procedure
3011 display procedure
3012 handle update procedure
3013 pointer passing procedure
3014 update query creation procedure
3015 database update procedure
3101 query parsing step
3102 decision step
3103 query splitting step
3104 obtain standard query step
3105 obtain table step
3106 unique field determination step
3107 primary key addition step
3108 other table determination step
3109 table determination step
3110 process other queries step
3111 merge results step
3401 'New' handle, new record handle
3402-3404 fields, cells
3405 label sub-row
3406 'registration' label
3501 node
3502 'Kids' table
3503 first 'id' column
3504 first 'name' column
3505 'parent' column
3506 'Dad' element, 'parent' foreign key, second representation of 'Dad' table
3507 'hobbies' element, 'hobbies' foreign key
3508 'Dad' element node
3509 second 'id' column
3510 second 'name' column, Dad.name column
3512 'hobbies' element node
3513 'Dad' table
3601 first master record
3602 second master record
3603-3605 first detail records
3606-3608 second detail records
3609 first record handle
3610 'id' data field
3611 'name' data field
3612 second record handle
3613 third record handle, second detail record handle
3614 fourth record handle
3615 'id' data field
3616 first 'name' data field
3617 'parent' data field
3618 'Dad' foreign key field, fifth record handle
3619 'Kids' foreign key field, first list handle
3620 second 'name' data field

DETAILED DESCRIPTION OF THE INVENTION

Preferred embodiments of the invention include a grid-based graphical interface to database systems of various types, including relational systems and modern object and object-relational systems. The underlying data model is sufficiently generic to not require extensive type-information about data if this is not required.

In preferred embodiments, the grid control of the present invention includes a handle element for each data record that precedes the data elements and controls the life-cycle of the data on the screen. Further, the handle does not relate to the row but to a record which may contain multi-valued attributes, therefore involving more than one row. The handle is logically connected to the data required to fetch and save data. Thus, as there may be more than one record in a row, there may be more than one handle on a row. If one of the data elements of a record itself identifies another record, that data element is represented as a further handle embedded in first record. Using this handle, the second record can be selected and expanded in-line within the existing first record, displacing subsequent fields in this record.

Preferably, the grid control of the present invention is capable of displaying data of different types interspersed with each other. Optional header rows above data rows identify the different types of data. The ability to display heterogeneous data enables the grid control to be used in applications which select and display relational data in unusual ways using extensions of the SQL query language, and using the navigation possibilities inherent in the graphical elements on the grid. Applications incorporating the grid can also be used to select and display data from object databases, where the relationship between the visual representation and the underlying data will normally be closer.

In preferred embodiments, default actions and other options of the record handle, join icon and other graphical elements on the grid enable easy navigation of data. The display of data allows formats common in reports produced from databases. Actions of the record handle, and other graphical elements can be modified at run-time, to implement the life-cycle of the handle and allow flexible interfacing to different data sources.

The present invention has applications in the object database and object-relational sphere, where the storage of OID's (object identifiers that identify other records) as elements within a data record make the interface of the present invention advantageous. It is good for some forms of semi-structured data, such some kinds of XML. It is also useful as an interface for relational database systems. In particular, foreign keys may be added as record handles or lists of record handles to the fields in a relation record. This enables the user to navigate to related records in other relational tables. Using the present invention with relational databases allows standard SQL queries involving joins to be represented in a more meaningful way. The invention also extends this representation of foreign keys as extra columns to hierarchical data schema trees, with important advantages for automatic generation of queries.

Preferred embodiments of the present invention have further value in the object database sphere, as the grid of the present invention is capable of displaying data items that are lists or arrays of data elements. These multi-valued attributes are displayed as a vertical list, which drops down from the record, and which can be retracted to only occupy a single row of the display. In preferred embodiments, the retractable drop-down lists represent multi-valued fields in a data-record and are editable inline.

In this disclosure, the following terms have the indicated definitions:

(Software) application programmer—one who puts components such as the grid control of the present invention together into a software package that is ready for use by the end user.

Action—either the current default behavior of a graphical element, or an option of the graphical element that can be selected from its pop-up menu. Actions are distinguished from methods, which are the software methods with which the graphical element is programmed. A method is capable of choosing the required action, and performing it on the data.

API (application programming interface)—in situations in which computer programs are broken down into components, the API defines the interface of a given component to the other components.

Attribute type—describes what a given attribute is like. It may be numeric, text of a given length etc. It may be a reference (OID) or list of references. It may be single-valued or multi-valued.

Attribute—a data component within a data type. A type consists of a type name and a series of attributes.

Button—a graphical element of windowing operating systems that looks and acts like a physical button. When it is selected, an action associated with the button is performed.

Callback programming—a system for programming graphical user interfaces (GUI's) in which graphical elements are defined during development and for each graphical element a method is defined for each event that one is interested in. For example, the system may not react in a double-click on a scroll region, but a double click on a button element on the screen would have meaning. Thus, a double-click method for the button element is defined. The program then waits until an event happens. The callback routine for the combination of event and graphical element is then called.

Cell—a single cell within a display item. Thus, a multi-valued field may contain several cells, preferably arranged one below the other.

Compile time—the time at which a computer program is built. Some of the characteristics of a program are determined at compile time, whereas others are decided later at run time.

Data element—the value of an attribute within an object or the value of a field within a relational table. The value is preferably in the format used by the records and grid control of the present invention. For a multi-valued attribute, there may be several data elements within the attribute.

Data field—a display item containing a data element or list of data elements. In the present invention, a data field may contain more than one element, if the field is multi-valued.

Data record—the unit of data granularity with which records are fetched from the database and written back to it. In preferred embodiments, when a record is saved, all of the data elements within display items belonging to the data record are saved.

Display item—an item that is to be displayed on the screen, in the format in which it is passed to the grid. The grid allocates one or more graphical elements that can be displayed on the screen, and associates them with the display item, and displays them on the screen.

Foreign key—field in a relational table that refers to a primary key in another table.

Forms applications—database software applications or parts of applications that lay data out in a format similar to a paper office form, with data in fields spread around the form and interspersed with text and choice buttons.

Granularity—the level of detail at which data can be written to a database. For example, if the data from a relational join between two tables are modified it cannot be written out as a single record. Instead, a write is potentially performed to a record in each table. The unit of granularity is the record (although one can technically modify individual fields within the record). In preferred embodiments of the present invention, the unit of granularity on the screen is the data record, controlled by the record handle.

Graphical element (sometimes called a widget)—an element that can be displayed on the screen; a visual component of an on-screen display that is treated by the windowing operating system as an object in its own right. In a windowing operating system, it is of a type that the operating system is capable of displaying. Thus, an edit box is a graphical element, but a single character written in it is not. Graphical elements include windows, edit boxes, icons, buttons, and menus. Graphical elements are associated with display items.

Grid, grid control—an area in a GUI that contains display items arranged into a grid pattern. Preferably, a grid control controls items in the grid. For example, if a row is removed, following rows are moved up. The grid control, also called the grid, of the present invention is not necessarily a component in its own right—it may be implemented using existing components.

GUI (graphical user interface)—a part of a computer program that defines how data are represented on the screen, and how the user interacts with display via input from a device such as a keyboard or a mouse.

Header label—an individual label in a header identifying a given column.

Header—the row above the row(s) containing display items displaying data records in a database output that labels the columns of the data records.

Hot-key combination—a combination of keys used to select an option in a GUI. For example pressing the 'Ctrl' and 'F' keys at the same time on a keyboard is often used to Find something on the screen. Thus, 'Ctrl' and 'F' is the hot-key combination for Find. In addition, there might be a Find button or menu option available.

Join—a way of joining two groups of data by comparing fields in the two groups. Usually, the comparison used is the fields being equal.

Join icon—an icon representing a join on the screen.

List handle—the on-screen representation of a list, particularly a list of record handles in a multi-valued reference field. It can be selected to list the elements within the list.

Master-detail relationship—in a relational database, this is the relationship between a table (the master) whose primary key is referred to by a foreign key in a second table (the detail table). One record in the master table is referenced by one or more records in the detail table.

Meta-data—data about data; data that is not real-world data but is related to the representation of that data in a database. Examples are OID's and, in some cases, relational database keys.

Method—a method is defined at compilation time, and is related to events happening on a given graphical element. To vary the behavior of a graphical element, a method calls an action. This action can be modified during the run-time of the program.

Multi-valued attribute—an attribute that can contain more than one element in the same object, such as a list or an array, preferably in an object database.

Non-standard SQL—extending the standard SQL syntax with new keywords (for example, 'any' and 'all') and with new concepts such as selecting on attribute type. For brevity these queries are referred to as non-standard SQL queries, despite the fact that the 'S' in SQL stands for 'Standard'. The use of SQL syntax does not imply that the underlying database is relational.

Object—a unit of data within an object database. An object has data elements. The data elements may conform to the attributes of the object-type if the object has a type.

Object-based—any type of database that contains objects rather than relations or relational tables.

ODBC—a standard interface for connecting to relational database systems.

ODBMS (object database management system)—any database management system that stores data in a format where an object (record) can be retrieved using an object identifier (OID). Sometimes the object type or class is also required to identify the object.

OID (object identifier)—in object databases, an identifier (usually a number), that is either unique or unique within the object's type. This identifier is used to identify an object, and when stored as an element in another object is a reference from the latter object to the former object.

Parse—the action of breaking down a string of characters into a given format to which it is supposed to conform. A parser decides whether a string conforms, and if so performs certain procedures. A database query parser is the part of a database which receives queries and interprets them in such a way that the database can return or update data. Pop-up menu-a menu that appears connected to a graphical element when that element is selected in a certain way.

Reference—a data element in one data record that is used to refer to another data record.

Referenced—the use of 'referenced' as an adjective or verb is shorthand for saying '(being) referred to'.

RDBMS (relational database management system)—the kind of database system described in *An Introduction to Database Systems Vol.* 1 by C. J. Date, Fifth Edition, Addison-Wesley (1990) and elsewhere, which stores data in tables consisting of identical rows of fields.

Record handle—the on-screen representation of the collective aspects of a relation record or data object. It can be used to perform operations such as saving, closing or fetching the record.

Run-time—at the time a program is in use by a user. Some of the behavior of a program is only decided at run-time, either at the start of the program (initialization) or during the session.

Schema—information in a database about what types of data or tables are contained in it. The individual columns within the table or the attributes within a data type are detailed in the schema, as are relationships between types or tables.

Selection (of a graphical element)—the action of choosing a visual item or option on the screen, either by using a hot-key combination on a keyboard, by clicking a pointing device such as a mouse, by speech activation or by other user input. This is not to be confused with selection on a database. There is often more than one means of selection of an option. For example, a hot-key combination can duplicate the action of a button on the screen.

Select (on a database)—the basic command in SQL used to get data out of a database.

Software application, software package—a completed software program that a user can use. It can be made of components, such as the grid control of the present invention. Components are not applications, as they do not function on their own.

SQL—Standard Query Language. See Date above.

Type—the type of an object, preferably in an object database. The word 'class' in not used interchangeably because the present invention does not specify full object-orientation (inheritance, encapsulation and methods).

Where-clause—that part of an SQL query starting with 'where' that identifies a record or records. The where-clause is only useful for the present invention if it uniquely identifies a record, or can be modified to do so.

Window—in background art computer programs, an area of the screen delimited by a rectangle within which further graphical elements can be displayed. Often different programs run within different windows on the same screens, or different parts of the same program are put into different windows.

Referring to FIG. 4, the basic hardware and software environment of a preferred embodiment of the present invention is illustrated. Practice of the present invention requires a screen or display 601 on which records (described later) are displayed. The screen may be a computer screen, WAP telephone screen, IDTV screen or other display device. On screen 601 is shown a cursor 602, which may be used to identify selected graphical elements on screen 601. An alternative to the use of cursor 602 is highlighting of the graphical element.

The present invention relies on one or more processing units 603 that perform output to the screen and receives input from the user. The processing may be split between separate devices that are connected using communications devices. At the bottom of FIG. 4 are preferred input devices that the user can use to communicate with the program running in processing units 603. Possible devices are keyboard or keypad 604, microphone 605 for voice-activated input, computer mouse 606, and a generic input device 607, representing any other form of user input. In general, processing units 603 coordinate the identification of graphical elements on the screen using highlighting or the cursor 602 with input from input devices 604-607. For example, with mouse 606 and cursor 602, the movement of mouse 606 is coordinated by the software in processing units 603 with the movement of cursor 602 on screen 601.

Preferred embodiments of the present invention operate on an IBM-compatible personal computer (IBM-PC)—a standard defined by IBM (International Business Machines Corporation) of Armonk, N.Y. These embodiments use the Microsoft Windows 98 operating system from Microsoft Corporation of Redmond, Wash. They are developed using C++ Builder Edition from Borland Software Corporation, Scotts Valley, Calif. For information about how to program the C++ language, the reader is referred to the online Help for C++ Builder, and also The C++ Programming Language, by Bjarne Stroustrup, Addison-Wesley, 1987. For information about how to program Windows 98, the reader is referred to Charles Petzold's *Programming Windows Fifth Edition*, Microsoft Press, 1999.

The preferred embodiments could also be developed on other operating systems such versions of Unix such as Digital Unix or Solaris from Sun Microsystems, using windowing systems such as 'X,' Motif, etc. The records of the present invention and the grid of the present invention could further be developed on devices such as interactive digital television (IDTV) devices that do not have windowing operating systems such as Windows 98. The more advanced the development tools and windowing operating system become, the easier the functionality described herein is to develop. Similarly, the use of the C++ language or C++ Builder in the preferred embodiments does not preclude the use of Java or other programming languages. In particular, although preferred embodiments disclosed herein are standalone software programs, it is envisaged that the same behavior of windows, records, grids and databases would be useful as part of a plug-in program that can be added to an Internet browser. The behavior could also be incorporated as standard in Internet browsers of the future.

Referring to FIG. 5, a simple record of a preferred embodiment of the present invention is illustrated. A record consists of an optional header row 701 and a data record 702. Header row 701 comprises header cell 703 on the left of header row 701, containing the name of the record type. Depending on the embodiment, these header labels can be customized with aliases. The rest of the cells 704-709 in header row 701 are field header labels for the fields in the data record. Preferably, the GUI allows the user to distinguish between header labels and data. In this case, the header labels have been shown having a dashed frame around their cell, whereas the data has a continuous line around it. Data record 702 contains data fields 711-716. These data fields display the data for the respective columns in the record indicated by the header. Left-handle cell 710 is the record handle, or handle for the record. The functionality of this record handle is enhanced in comparison with equivalent fields in background art database interfaces. The enhancements allow it to perform actions on the records. In this case, the default action on selecting handle 710 is to save the record to the database.

Record handle 710 is illustrated in FIG. 5 as having diagonal hatching, which in this monochrome drawing represents a blue rectangle with lettering in a contrasting color. However, record handle 710 does not have to be a blue rectangle, as it can be any visual element. In FIG. 5, the data on the screen have been changed or created afresh on the screen. Selecting handle 710 saves the data to the database. Preferably, at that point, the default action of handle 710 turns to 'Close', selection of which removes the data from the screen. However, as soon as the on-screen version of the data has been modified, the state of the handle changes back to 'Save,' meaning that the data on the screen differ from that in the database. Modification of data within the record alerts the record handle. There is no actual requirement to write the words disclosed herein on the handle 710. The handle is a visual element that forms the link between the on-screen data and the database. In a preferred embodiment, the record can be of a certain type or of no type. It does not have to conform to any of the existing database types such as those storable in background art relational databases or object-relational databases.

In a simple case, a record appears in a word-processing document like the one used to prepare this disclosure. If the user edits one of the data fields 711-716 within the record in the document and uses the 'Save' action of handle 710, the changed data are written to the database. However, this embodiment of the present invention requires more functionality within the record than is required for embodiments where the records are contained within a grid control of the present invention.

The GUI of a preferred embodiment of the invention consists of three windows: a 'Data Processing' window which is the main window of the software application, a 'New Type' window and a 'Data Retrieval' window. The last two windows are used to define record types or classes to be used on the main window, and to get data onto the main window, respectively.

Figure 6:
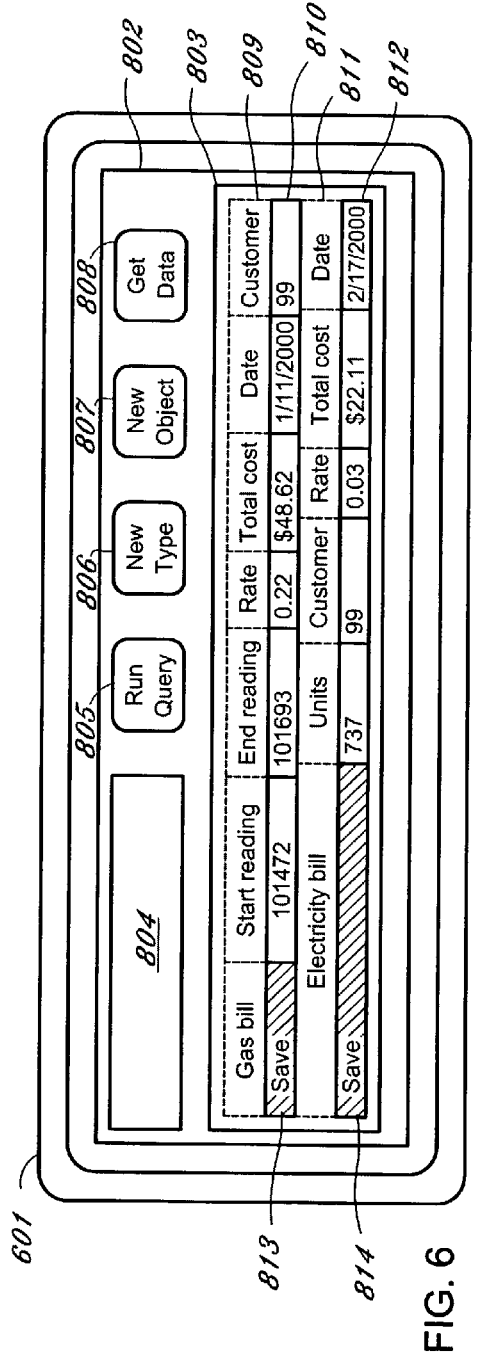
FIG. 6 shows heterogeneous data in a grid control of a preferred embodiment of the present invention.

Referring to FIG. 6, Data Processing window 802 of a preferred embodiment of the present invention is illustrated. The purpose of Data Processing window 802 is to enable a user to display data and relationships between data in an easily understandable format. Window 802 may also be used for preparing reports. The format of window 802 makes it easier to input, modify and delete data than is possible with background art GUIs.

In a preferred embodiment, screen 601 in FIG. 6 displays Data Processing window 802, which contains query entry window 804, series of buttons 805-808, and grid control 803 of the present invention. It will be noted that grid control 803 is not filled with a lattice of cells, as is often the case with background art grids. Where there is no data element, such as below record 812, there are no cell dividers. Furthermore, cells on different rows can have different widths. The grid area is scrollable in the vertical and horizontal directions, but in FIG. 6, the scroll bars are not present because the data do not extend beyond the visible part of grid control 803. Scroll bars appear when the data exceed the bounds of grid control 803 in their respective directions.

FIG. 6 shows records of the present invention as also shown in FIG. 5, in this case displayed within grid control 803 of the present invention incorporated in Data Processing window 802. Data records 810 and 812 and their headers 809 and 811 are displayed in grid control 803. Inspection of FIG. 8 reveals that the data are heterogeneous. That is, grid control 803 is capable of displaying data of different record types.

Grid control 803 helps to control the organization of the records within its bounds and marks the bounds within which the records are displayed. Grid control 803 is capable of scrolling up and down and side to side, if needed to show more data. When several records are to be displayed, it is convenient to display them into a grid control of the present invention.

In a preferred embodiment, the user of Data Processing window 802 can add new data rather than getting data from a database. In a preferred embodiment, the user begins this process by selecting 'New Type' button 806. For example, in a relational system, selection of 'New Type' button 806 displays a list of tables within the relational database to which the program is connected. Regardless of how the new type is specified, the software application program creates a new empty record of the required type in a format understood by the grid and passes it to grid control 803 for display. Grid control 803 supplies a new header row if necessary based on information linked to the new record supplied. Thus, the 'New Type' button creates a new record on the screen for efficiency, so that the user does not need to select 'New Object' button 807 the first time.

In a preferred embodiment, the user can select 'New Object' button 807 to add further objects of the current type. In the preferred embodiment of grid control 803, the application program supplies the display items for a new empty record of the current type, and the grid displays it in the correct place. The record looks like that in FIG. 5, but with the data in fields 711-716 set to null. The user can now key in new data.

Referring to FIG. 6, it has been mentioned that the displayed data are heterogeneous. The user has added two different types to grid control 803. The user has also keyed data into the data fields. Record handles 813 and 814 reflect the fact that there are data on the screen that are different from that in the database or that are not present in the database at all. This is accomplished by setting the default action set to 'Save'. Modifying or keying data into the data fields alerts the record handle, which is preferably programmed to change to 'Save'. If the user selects a record handle, such as record handle 813, the data is saved to the database and the handle changes its default behavior to 'Close'. Selection of the 'Close' action removes the record from the screen.

Second data record 810 displayed on FIG. 6 is of a completely different type from the first one, as supported by the data model of the GUI. There is no requirement to retrieve or generate data grouped by a relational table or shared datatype class. Preferably, data records are stored one record at a time (although the GUI also allows one to select groups of records for saving). Thus, a preferred embodiment of the present invention supports a combination of mixed data classes and a granularity of one record for saving data. The user can access all the data he/she is interested in accessing from the same window.

Figure 7:
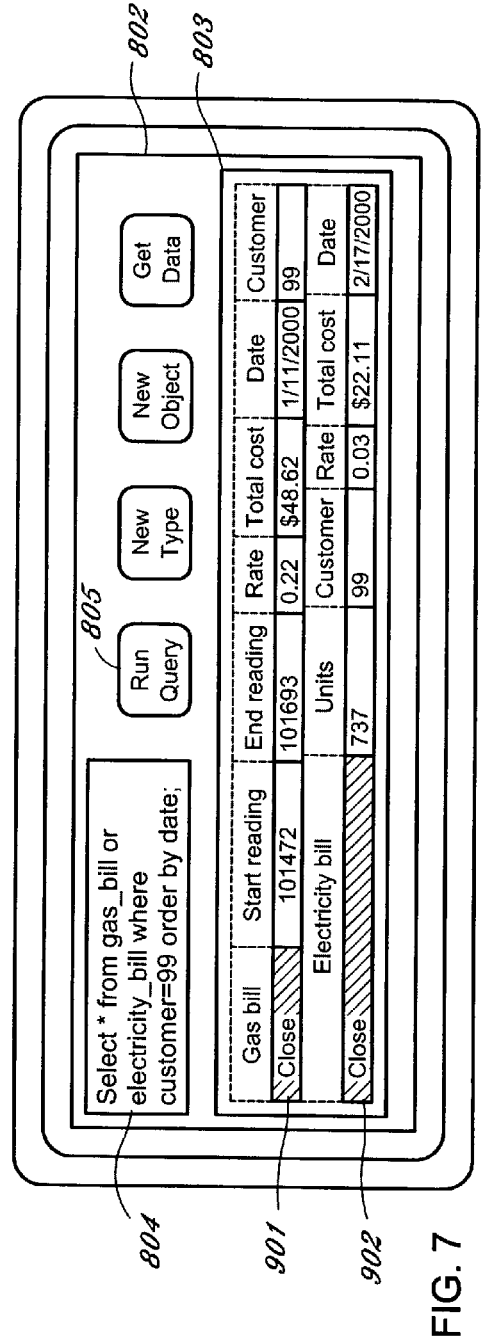
FIG. 7 shows the selection of heterogeneous data from the database for display on the grid control of a preferred embodiment of the present invention.

Referring to FIG. 7, Data Processing window 802 of the same software application as is illustrated in FIG. 6 is shown. In this instance, an employee of a combined (natural gas and electricity) utilities company runs a query which spans two tables in one or more legacy relational database systems. The data are fetched into grid control 803 by the user typing in a query in non-standard SQL into query window 804. Run Query button 805 is then selected to run the query and fetch the data onto the screen. It is noted that, when the user has just fetched the data, the default action for handles 901 and 902 is 'Close'. This is because there is no point in saving data that is the same on the screen as it is in the database.

In this instance, the user enters a query that uses a query language similar in syntax to SQL, but a query language that enables one to search more than one table (or object-type, if the database is object-based) at the same time. The query language also allows one to sort by similar types of data in columns in different tables. As mentioned above, background art database languages allow one to do similar things, and the syntax used here is merely indicative. The keyword 'or' in the query in query window 804 is used to indicate that the two rows from the tables are not to be joined together. If the 'or' were replaced by a comma in standard SQL, the query would produce a PRODUCT of the two tables, with every combination of each row within each table being displayed. Instead, this is a UNION, which is the appending of one table after the other. The ability of the grid to display heterogeneous data encourages the development of queries that return heterogeneous data.

The query in query window 804 is parsed and processed as two or more SQL queries in a relational system. One having ordinary skill in the art will see that even if the database in use was not an object database but, instead, was a relational database, the query could be parsed into two standard SQL queries. In fact, it is possible in standard SQL to use a UNION operator to join the results of two queries into one, but the resultant data must have the same number and types of columns. This has rendered the use of UNION's rare. The procedure for returning heterogeneous data used by the present invention is described later.

Figure 8:
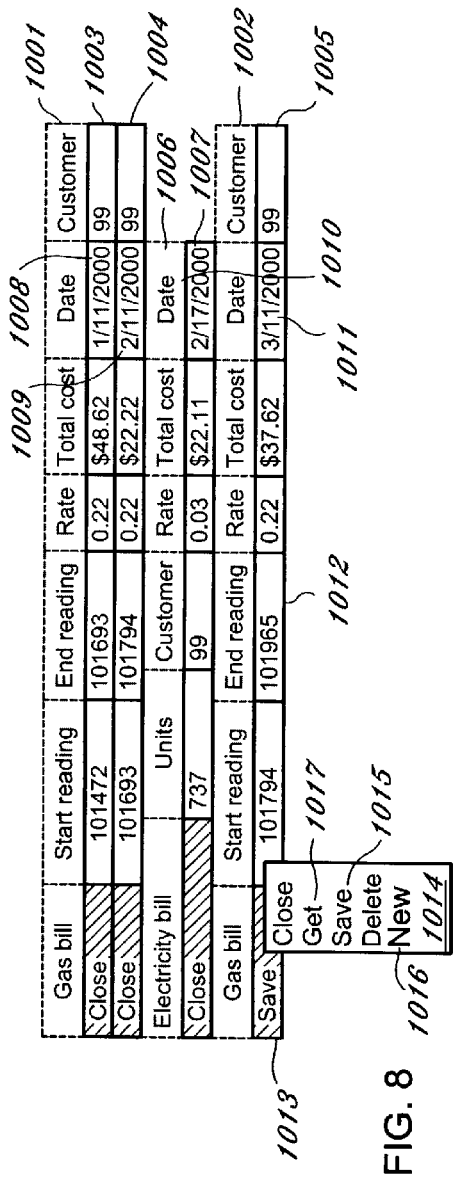
FIG. 8 shows heterogeneous data similar to that in FIG. 7 in more detail, showing data that has been modified on the screen.

FIG. 8 shows heterogeneous data similar to that shown in FIG. 7 in more detail, showing data that has been modified on the screen. It does not show the frame of grid control 803. It is noted that headers for records of type 'gas bill' occur twice on the screen, at record header 1001 and record header 1002, above data records of that type, indicated as record 1003, record 1004 and record 1005. In the middle is electricity bill header 1006, above electricity bill record 1007. It is seen that a new header has been displayed when the record type changes. In a preferred embodiment, the labeling function is performed automatically by the grid control. A similar identification role could be played by changing the color of the record if the user was working with very few types. It is also apparent from review of FIG. 8 that date fields 1008-1011 are sorted in chronological order.

Selections and data display can be heterogeneous in preferred embodiments of the present invention. The advantage of this approach is that without any application programming the user can see both kinds of record at the same time, in the same window. Typically, this would not be the case for a background art database software application.

With a preferred embodiment of the present invention, the user can see all of the relevant records in the same query. The user can modify individual records and save them (or select several handles and save all at one time). The heterogeneous nature of the data means that a worker who is performing several tasks at once, for example in a telephone call center, can put a new type of record in the same grid control for each type of work being carried out. If the date/time field is automatically generated for these records, a journal of a day's work is automatically generated without software application programming effort.

In FIG. 8, one cannot determine how the data have come to appear on the screen. It could have been the result of a data query, or of the user inputting new data and then saving it. However, the state of the record handle, for records 1003, 1004, and 1007 is 'Close'. This means that the data have already been saved to the database, and a 'Close' would take the record off the screen, along with its header if the latter only served one row of data. Any subsequent records will move up to fill the gap. The ability to remove uninteresting records from the screen, bringing records that the user is interested in closer together is an advantage of preferred embodiments of the present invention.

In contrast to the other three record handles, the state of the handle for record 1005 is 'Save'. This means either that the information is new and requires saving, or that it has been fetched and modified. In the latter case, the on-screen version of the data is different to that in the database, and can be saved. It is normal for the default action of the record handle to be 'Save' when the data within the display item are new or modified. As an example, a customer phones in to say that his end reading is 101965 in record 1005, rather than the estimated value that the utilities company has been using. The employee of the utility company then modifies the record. Changing the data in cell 1012 alerts record handle 1013, which typically changes its default action to 'Save'. Note that this action is only the default action for the record handle. Other options are available by right-clicking the 'Save' button.

The default action of the record handle is typically selected using a single left-click on a mouse. An alternative selection such as right-clicking on the mouse reveals the pop-up menu 1014. The menu appears near the selected record handle or other cell. The menu shows the current default action of the handle 'Save' action 1015, as well as alternative actions. Those actions that are not currently available are preferably shown as grayed out (shown here in a larger font). In this example, 'New' action 1016 might not relevant as a record already exists, but 'Get' action 1017 might be valid, as the user may have messed up the fields and want to refresh them.

Figure 9:
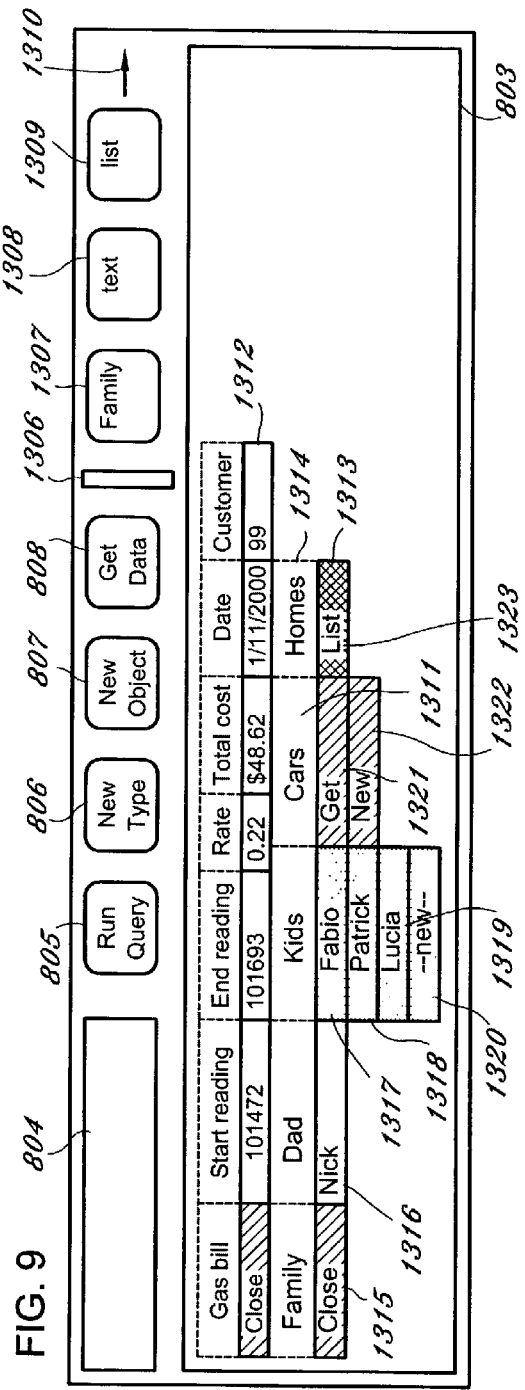
FIG. 9 shows the Data Processing window of a preferred embodiment of the present invention, showing the display of multi-valued attributes.

The current discussion has been in terms of using the interface to access a relational database, whereas, a preferred way to use the interface is in conjunction with an object-based database. FIG. 9 shows a second Data Processing window of a preferred embodiment of the present invention, in this case illustrating the display of multi-valued attributes. It should be noted however that the embodiment in FIG. 9 is merely an enhancement of that illustrated in FIG. 6 and each would be valid for processing relational or object data. In a variation of the Data Processing window of the preferred embodiment shown in FIGS. 6 and 7, the window of FIG. 9 contains the familiar query window 804, 'Run Query' button 805, 'New Type' button 806, 'New Object' button 807, and 'Get Data' button 808.

As described in the explanation of FIG. 6, 'New Type' button 806 is used to specify a new type. This action also supplies the first new record of that type. 'New Object' button 807 supplies subsequent records. In either case, a new row is displayed for the user to fill with data.

If the user wants get to existing data from the database onto the window, 'Get Data' button 808 is used. Data are fetched onto the screen and displayed in the same way as data that has been input by the user. 'Get Data' button 808 activates the Data Retrieval window of the preferred embodiment, to allow browsing of data rather than use of a query. The buttons along the top that are familiar ones from FIGS. 6 and 7, are divided by divider 1306 from a series of buttons that relate to record types 1307 and attribute types 1308 and 1309 that may be useful in building up new records or display items. These record type buttons and attribute type buttons are created dynamically based on the most commonly used record types and attribute types. Scroll arrow 1310 allows the user to scroll to other buttons. Data grid 803 contains two records: 'Gas Bill' record 1312, which contains only simple single-valued text fields, and 'Family' record 1313, which contains multi-valued attributes and references. Header row 1314 to the 'Family' record is as in previous figures. On the data row, record handle 1315 is present as normal. Display item 1316 is a simple text field showing that the Dad's name is 'Nick'. The next column displays the values of a multi-valued attribute. This means that the display item can contain more than one element, in this case containing the names of the children, 1317-1319. If the user uses the downward cursor key to key downwards from element 1319, an empty cell 1320 is added to the list, allowing the entry of more data.

In the case of the first record, 'Gas bill' record 1312, all of the data-input fields are white. This is a convention adopted here to show that the fields are atomic fields that can be modified with ordinary data entry, but different colors could be used to indicate different cell types. The definition of the record-type, 'Gas bill', may have specified a variety of conditions on the data. For example, two of the fields appear to be numeric fields and the other two, currency fields. The present invention does not specify or limit these types or the rules that apply to them. However, one could envisage a 'file' type of field referring to a file in the operating system, with the suffix on the file-name referring to the default software application to be run when selecting this item. Similarly, there could be a 'binary large object type' (BLOB), which is a large amount of binary data in a database field. These are extensions in the behavior of the graphical elements, which are discussed later.

To return to the white data-fields in 'Gas bill' record 1312, these fields refer to simple single-valued fields. The graphical element is a single editable cell that can be edited in a normal way like a cell in a spreadsheet or normal database grid control. In FIG. 9, data elements 1317-1320 (which are preferably cream-yellow in color) are in fact a single field in the record. This type of field stores a list or array of values: a so-called multi-valued attribute. The use of multi-valued attributes and references give the records of preferred embodiments of the present invention much of their power. In FIG. 9, they are filled with a dotted pattern. In a preferred representation, this represents a non-white color such as cream, to distinguish them from the single-valued attributes. In preferred embodiments of the present invention, the color does not have to be cream, and it is not essential to use a different color for multi-valued attributes.

Preferably, the multi-valued fields on a record have the ability to expand downwards to show all of the data elements in the list, or to contract to take up a single line. Within a given record, some multi-valued fields may be expanded while others are contracted. If the list is long, it is scrollable. In a preferred embodiment of the present invention, for simple editable fields, a single-click preferably selects that field for editing, whereas a double click preferably changes the state of the list from expanded to contracted or vice versa. In contrast with most background art systems, the fields in the list are preferably editable inline, rather than using the combination list-box arrangement, which often requires selection from a drop-down list and then editing it in an edit box situated at the top row of the list. If the user expands a list that is not in the lowest row in the grid control, either subsequent rows are preferably pushed down or the list overlays other records. In a preferred embodiment of the present invention, these two choices are set as an option in real-time. In the case of overlaying, a preferred embodiment uses shadowing or highlighting of the cells to remove the confusion that it may cause.

The ability to display lists is an important aspect of preferred embodiments of the invention. It provides a natural way to group and display data. The relational model makes this difficult. When reports based on the on-screen information are printed out, the pushing down option is likely to be more useful, as it reflects how reports are prepared from tabular data. Thus, in many cases, preferred embodiments of the present invention avoid the use of an additional report layer of software over and above a traditional tabular grid control display.

Another important feature of preferred embodiments of the data model of the present invention is support of references. Fields are allowed to be references to other data objects. In general, a reference means 'enough information to uniquely identify a data record being referred to.' The reference simply is a means of getting the data for the new record, or saving it when modified.

Referring again to FIG. 9, the next column, 'Cars' column 1311, contains a multi-valued attribute field whose elements are references to other records. The data model does not assume that references from elements of the same attribute of a type are all to objects of the same type. It appears that these two objects might both be 'Cars', but that is not a requirement unless it has been specified by the user or programmer in a rule. Preferably, any such rule is defined in the software application, not handled in the grid. First reference 1321 is a reference to an existing 'Car' record, whereas second reference 1322 is a space for the creation or linking of a new record to 'Family' record 1313.

In preferred embodiments of the present invention, first reference data element 1321 is blue in color, like the record handle. In FIG. 9, as in previous figures, this is represented in monochrome by diagonal hatching. This data element is itself a handle of the same kind as that at the start of the record, handle 1315. For the purpose of the display, 'Cars' reference 1321 is a data element of the 'Family' record, but it is at the same time a data handle for a 'Cars' record. In the example shown, the family already has one car. It exists already, because the state of the object handle is 'Get'. Assuming that FIG. 9 shows access of an object database, this means the object handle contains a valid OID, which for object databases is all that is needed to get that object from the database. This means that one related 'Cars' object is in the database. Selecting the default action, 'Get', of record handle 1321 gets the object from the database and expands it inline.

In FIG. 9, the Homes column also contains a multi-valued attribute field, but, in this variation of the preferred embodiment, the list has been retracted into a single graphical element, called list handle 1323 in the present invention. In FIG. 9, list handle 1323 is shown with a fill pattern that differs from the fill pattern of the record handle and the multi-valued text cell. This different fill pattern represents a different color, such as green. The default action of selection of a list handle is to list the elements in the item. The list handle is acting as a sort of lid on a list of references. The list handle is not to be confused with a record handle, and if the word 'handle' is used on its own, a record handle is to be assumed. In the case of a list of elements that are not references, it is preferable to be able to see the first element of a list when the list has been retracted. However, in the case of references, particularly when the object data model is used, showing the reference would not be of much use. This is because the data in the reference is an object identifier (OID), which tells nothing about the data within the object. To get data from the objects being referenced, a second data fetch is required.

In preferred embodiments, there is little difference between a reference/handle that is a field within a data record and the one that defines the data record. The former merely has an extra action possibility, 'remove', which removes the reference to the data but does not delete the data to which it refers.

Figure 10:
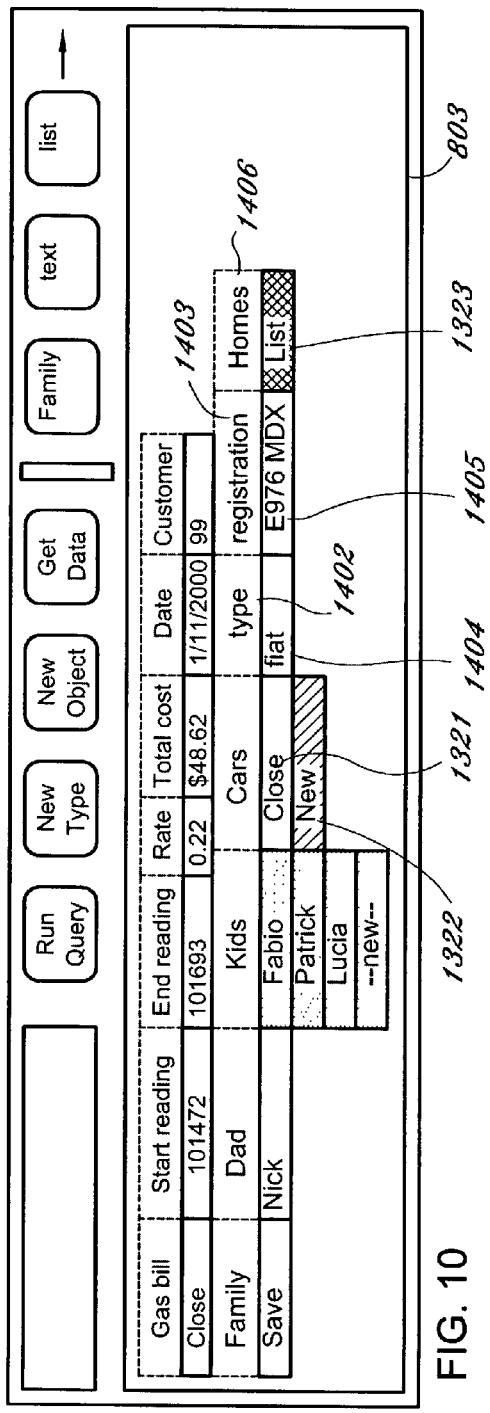
FIG. 10 shows the Data Processing window of FIG. 9, showing the expansion of references in-line.

FIG. 10 shows the Data Processing window of FIG. 9, illustrating the expansion of references in-line. It illustrates how expanding the 'Cars' record preferably pushes 'Homes' field 1323 sideways. FIG. 10 also shows the same preferred embodiment as that shown in FIG. 9. The difference is that the 'Get' action of handle 1321 appearing in FIG. 9 has been selected, getting the data from the referenced record and expanding it in line inside the 'Family' record. Thus by the stage shown in FIG. 10, handle 1321 from FIG. 9 has changed its default action to 'Close'.

The data fields within the Cars record have been labeled with header labels 1402 and 1403. The data for the referenced record is shown in data fields 1404 and 1405. Header label 1406 and data fields 1323 for Homes have been pushed to the right to accommodate the new data. The repositioning of the data cells and header labels is preferably performed automatically by the grid control, which calculates new positions based on the insertion of the new data. The header rows are generated by the grid, and new header rows and new labels within existing header rows are introduced when records are changed in such a way that the header no longer reflects the all of the data below it.

The ability to get from a reference to the thing being referenced is an important feature of preferred embodiments of the present invention. This is how people think about references within records. One sees a simple record, but knows that nested within a reference in that record are more data. In the world of background art Internet browsers, the default action for a reference is to go to the referenced data, leaving the data that referred to it behind. In the context of the present invention, the default action is to expand the data inline. The user wants to be able to see all related data in the same place on the screen. Moreover, if the user is not interested in 'Homes', he wants to be able to hide that information.

Preferably, the default unit of data granularity is the record as defined by the handle. This means that when data are modified on the screen and the 'Save' action of the handle is invoked, all of the data within the record are saved. However, this does not preferably extend to data within records referenced by reference fields within the record being saved, even if they have been fetched onto the screen. The data that are saved are all of the fields from the record, including the reference. The reference is simply the means of identifying the other record, not the contents of the referenced record. In terms of the example in FIG. 10, if the 'Family' record were identified by a record identifier of 0001234 and the Fiat car was identified by 00005678, saving record 00001234 would save Dad 'Nick', Kids 'Fabio, Patrick, Lucia' and Car 00005678. It would not save 'Fiat' and 'E976 MDX'.

However, writing out only the data of the record whose handle is selected is only the default behavior. For example, a software application program that uses grid control 803 of the present invention to interface to a relational database might be programmed to save a record in a master table and its related records in a detail table. The relationship between grid control 803 and the application program is discussed later.

In preferred embodiments of the invention, it is not necessary to fetch the whole referenced object. Using the right mouse button and selecting 'Get some fields,' the user is presented with the means of selecting which fields to fetch. An item fetched in this state can be filled out at a later date with 'Get all fields' in the same way, or by selecting more fields.

Referring again to FIG. 10, at the bottom of the Car list 'New' record handle 1322 is displayed, which allows the user to add a new object. For empty single-valued reference fields, a 'New' record handle is also provided. Selecting the action 'New' on this record handle allows a user to specify a new data type, by going to the 'New Type' window described below. On return, the fields of the new object are expanded inline on the grid and values may be entered into the data elements.

If the type of the new record is always the same for a given attribute, the 'New' action of the reference record handle may be programmed to return a new record of that record type immediately. However, as mentioned earlier, the data model used allows references in a reference list to be of different types, and in the example 'Cars' is an attribute that allows this. Therefore, before supplying an empty new record the application goes to the New Type window, which will be described shortly, to select the type required. The 'Homes' reference list always refers to objects of type 'Home', so the 'New' action for those reference record handles inserts a record of this type without going to the New Type window. The variations in the result of the 'New' action are because the actions, and the methods called by the actions are not supplied by the grid itself, but rather by the application program that incorporates it.

Instead of selecting 'New', the user may right-click on the object handle and select 'Get' from a menu of choices. 'Get' allows the user to select an existing object by going to the Data Retrieval window. On return, references to the selected data are put in the reference or reference list. In the case of a reference list, the selection may be of more than one object.

Removing a reference is preferably a non-default option on a reference record handle. In the case of a single-valued reference, removing a reference results that the field's handle reverts to state 'New'. This is effectively a null field. The referenced data are not deleted. For multi-valued references, the reference is removed from the list.

Figure 11:
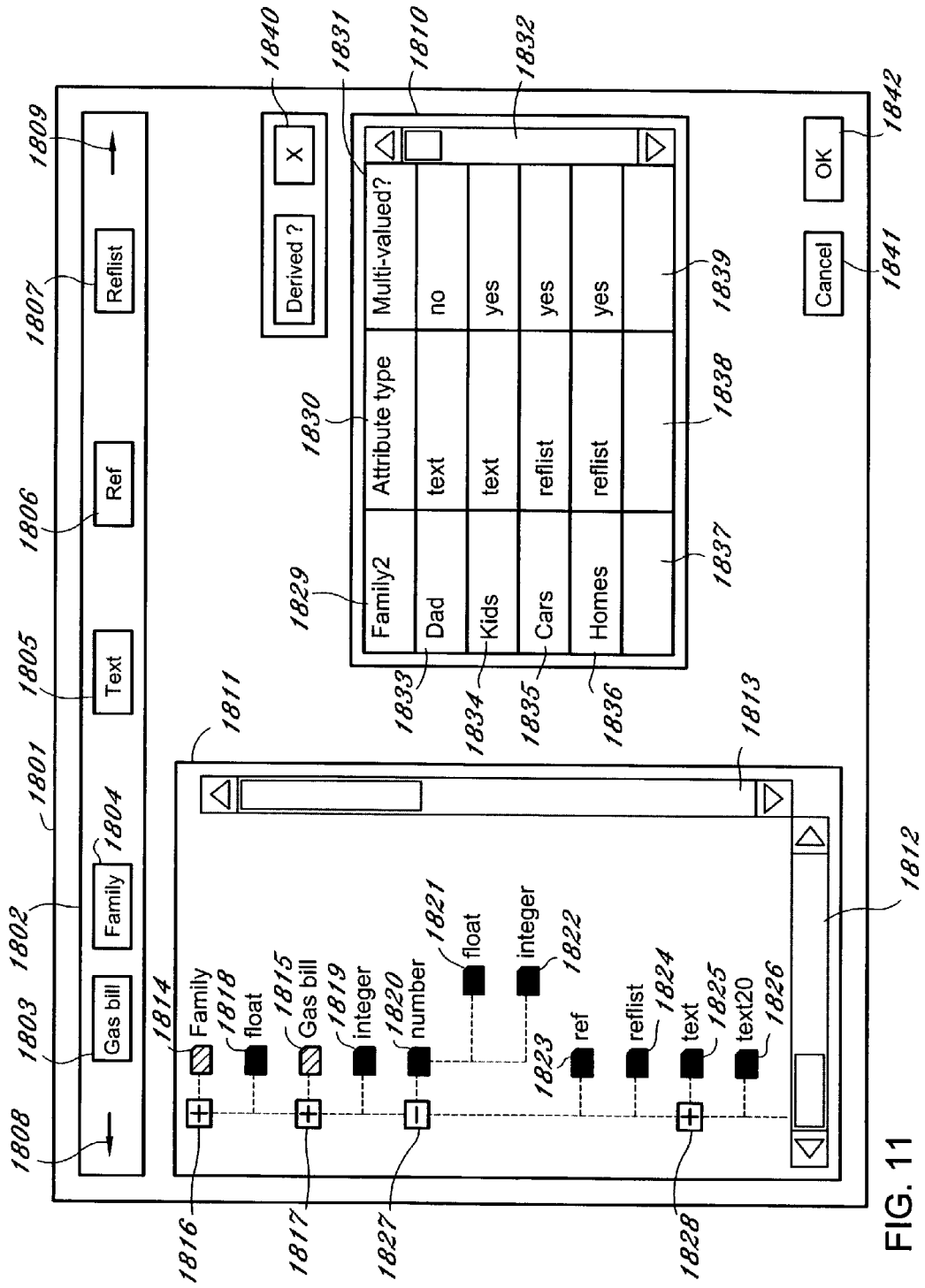
FIG. 11 shows the New Type window of a preferred embodiment of the present invention.

Referring to FIG. 11, New Type window 1801 of a preferred embodiment of the present invention is illustrated. New Type window 1801 is used to specify a data type for use in Main Data Processing window 802, illustrated in FIGS. 6 and 7. The type may be new in the sense that it is different, or new in the sense that it is to be newly defined in this visit to New Type window 1801.

New Type window 1801 may be called from 'New Type' button 806 or in cases outlined above on selection of the 'New' action of a record handle. On return from New Type window 1801, a type has been selected and a new empty record has been displayed on the grid. In New Type window 1801, scrolling region 1802 contains buttons for commonly-used and recently-used types: 'Gas Bill' type button 1803, 'Family' type button 1804, text type button 1805, ref (for a reference type) type button 1806, and reflist (for a reference list) type button 1807. Scrolling region 1802 is controlled by pair of arrows 1808 and 1809, which allow one to scroll through these options.

Buttons 1803-1807 enable the user to select a given existing data type, or attribute type quickly. On selection of a type, New Type window grid 1810 is filled in with information about the selected type. On selection of an attribute type, information about that attribute type is filled into the next available row of the grid. One having ordinary skill in the art will see that scrolling region 1802 and its buttons can be replaced with a menu bar and a drop-down menu. A scrolling region of dynamically allocated buttons and a drop-down menu are commonly used in background art software applications.

A comprehensive list of types and attribute types is found in type hierarchical data schema tree 1811 of New Type window 1801. Note that data schema tree 1811 does not display a strict hierarchy in mathematical terms, because the same item can occur at more than one place. This area is scrollable using panel scrollbars 1812 and 1813. The right-hand wall of the panel can be moved thus allowing the panel displaying data schema tree 1811 to be re-sized to use more of New Type window 1801 for browsing. The data schema tree is a tree view similar to the directory browser in Windows Explorer from Microsoft. A selection of tree views and directory browsers is available in Borland C++ Builder.

There are two types of folders in this diagram, hatched and black, representing different colors in a preferred embodiment. The diagonally-hatched folder shapes 1814 and 1815 represent existing types. The types have nodes 1816 and 1817 to their left, enabling expansion and collapsing of their attributes. This is discussed further with reference to FIG. 14 later in this disclosure.

Figure 13:
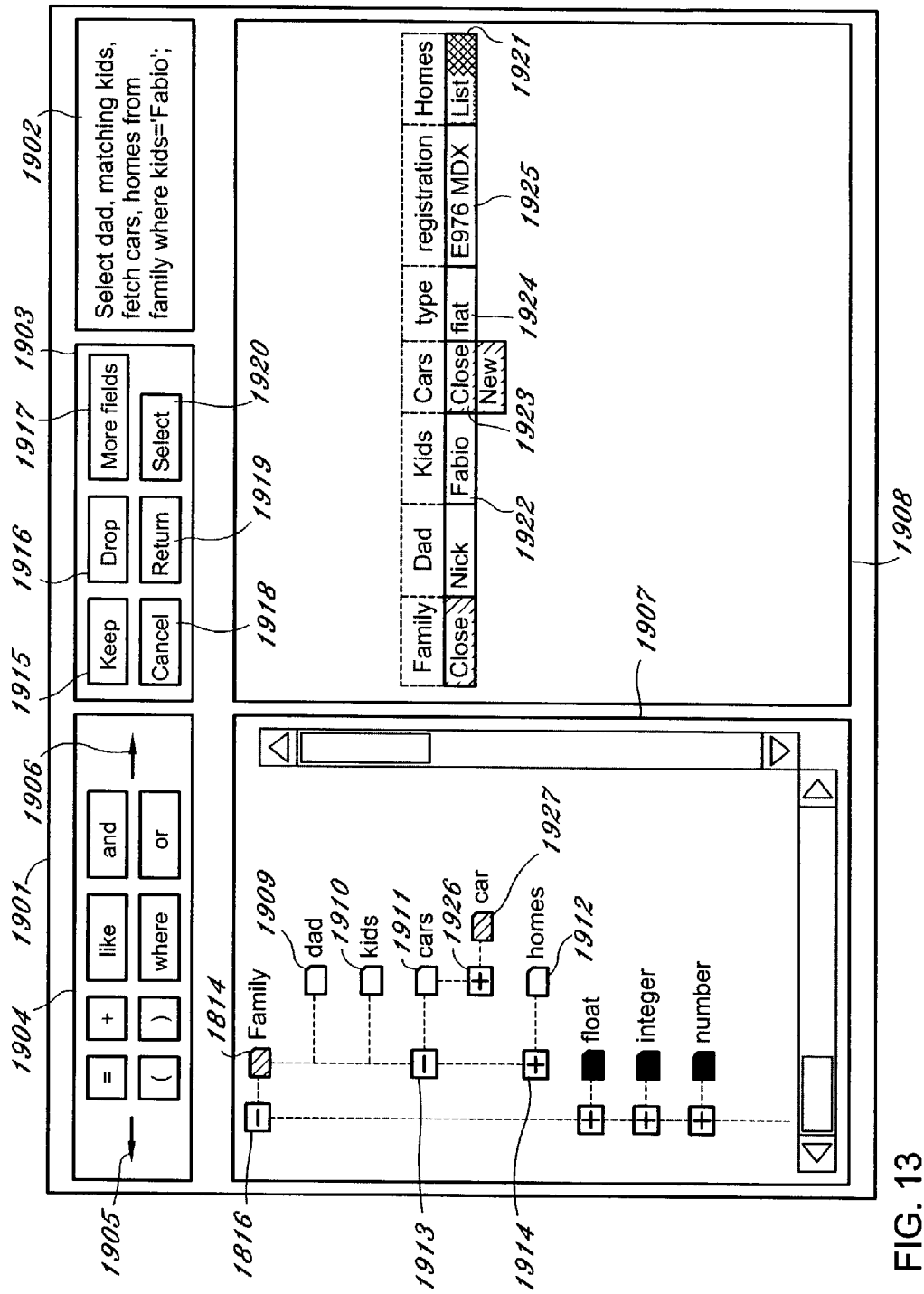
FIG. 13 shows the Data Retrieval window of a preferred embodiment of the present invention.

Black folder shapes 1818-1826 represent attribute types. 'Number' attribute type 1820 has two derived attribute types: 'integer' attribute type 1822 and 'float' attribute type 1821. The minus sign within node 1827 connected to 'number' attribute type 1820 shows that the level of the hierarchy below 'number' attribute type 1820 is expanded. Clicking this minus sign collapses the hierarchy below 'number' attribute type 1820 and replaces the minus with a plus sign. This is the situation at 'text' attribute type, where plus sign 1828 shows that 'text' attribute type 1825 has a hierarchy of derived attribute types that is not shown. In this case, the attribute type below 'text' attribute type 1825 is 'text20' attribute type 1826. In a departure from background art hierarchy displays, the display illustrated in FIG. 13 shows all of the elements of the hierarchy at the top level. Thus, 'text20', which is hidden below the collapsed hierarchy of 'text' attribute type 1825, is also shown at the top level of the hierarchy at 'text20' attribute type 1826. Similarly, the attribute type 'integer' occurs twice—once at the top-level of the hierarchy at 'integer' attribute type 1819, and once as a derived attribute type of 'number' at derived 'integer' attribute type 1822. This methodology is preferably applied to derivation of both types and attribute types, and enables the user to locate a type or attribute type either alphabetically or hierarchically. It is also useful for generation of queries, as will be shown later.

In that the data tree is to show the derivation of both types and attributes, alternatives designs are envisioned. With background art tree controls, there is only one dimension of hierarchy. Each node can only be opened in one way. For types we want to show two kinds of hierarchy, the attributes within a type, and the types derived from a type. One embodiment involving the use of background art tree controls mixes the two types of element at the same level in the hierarchy. Thus, for a type element, its attributes are shown first, followed by any derived types. Another embodiment involves adding another expansible node to the right of the element, which could be used as the start of one of the hierarchies, so that each element can be the start of two hierarchies. In this disclosure, applicant notes this possibility, but uses background art trees where each element can only have one sub-tree.

This disclosure only shows basic means of selecting types, and methods relating to claims. It assumes that normal methods of selecting commonly used types and attributes, such as menus or scroll-regions of recently used types in existing art systems are possible in alternative embodiments. When considering hierarchical data trees, one needs to distinguish between selecting an element and expanding a node. Selecting the folder shape or the text of its name selects that element in the tree. Selecting a square node containing a plus, '+' or minus '−' expands or contracts the node and preferably does not select the element. With respect to selection of a type, a single click on a type preferably puts the type and attribute information into New Type window grid 1810, for possible further modification. In the case of a double-click on a type, the type is preferably returned directly to the main window, closing New Type window 1801.

Referring again to FIG. 11, top left cell or 'Family2' cell 1829 in New Type window grid 1810 displays the name of the type, which is preferably editable. The remaining cells on the top row, 'Attribute type' cell 1830 and 'Multi-valued?' cell 1831, contain header labels for the information about the attribute types in the rows that follow. In this simple example of a preferred embodiment of the present invention, the only information about the attribute types are their names, which are displayed in the column below 'Attribute type' cell 1830 and whether they are multi-valued or not, which are displayed in the column below 'Multi-valued?' cell 1831. All of the rows except the first one are preferably scrollable using grid scrollbar 1832. The remaining cells in the left-hand column, remaining cells 1833-1837, display the attribute names. The row consisting of cells 1837-1839 gives the user the opportunity to add attributes to the type. This requires a change of type name, at top left cell 1829. In FIG. 11, the user has changed the name from Family to Family2. At this point, providing the new type has retained all of the attributes of the old type and has only added extra attributes, it can be considered a derived type. Check box 1840 is enabled when derived types are being processed. This allows the user to specify whether the new type is to be considered as being derived from the old type. If so, the new type appears below that type in type hierarchy panel 1811.

If 'Cancel' button 1841 is selected, the type selection process is aborted and the software application returns to the main Data Processing window. If 'OK' button 1842 is selected, the software application returns a definition of the selected new or existing type to main Data Processing window 802.

Figure 12:
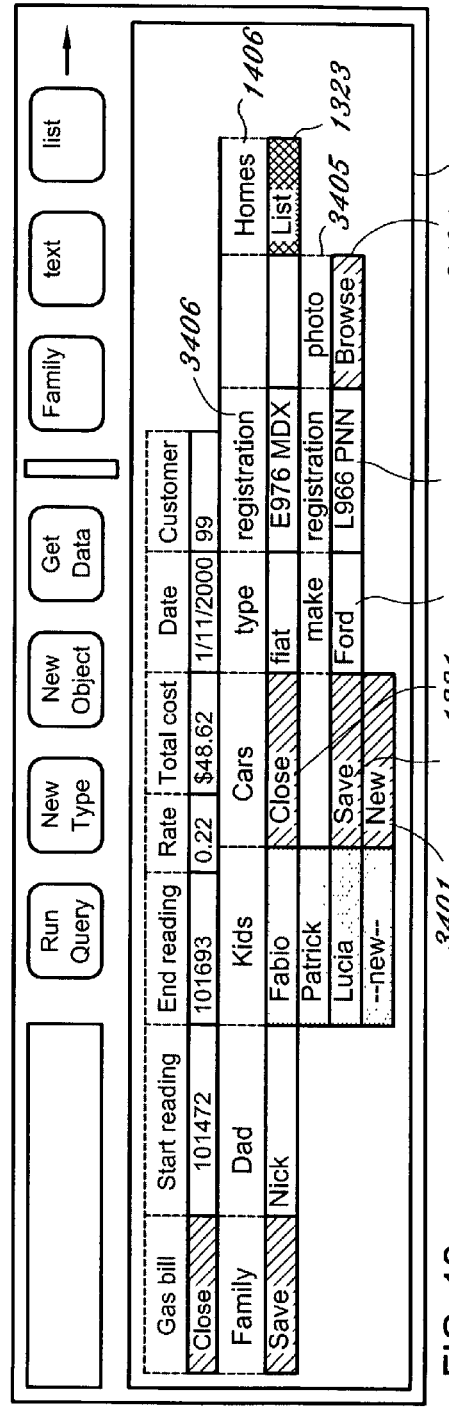
FIG. 12 shows the Data Processing window of FIGS. 9 and 10 showing lists of heterogeneous records.

Referring to FIG. 12, the state of the Data Processing window after the return from the New Type window of FIG. 11 is illustrated. In the description of FIG. 11, it was pointed out that the user was going to return with a type called 'Family2' derived from type 'Family'. FIG. 12 shows the case in which the user chooses a type 'Car2' instead. This type is similar to 'Car', but has an extra attribute called 'photo'. In FIG. 12, the user has returned to the Data Processing window and a new record has been inserted consisting of the fields 3402, 3403, and 3404. This new record belongs to record handle 1322, which has moved down with respect to its position in FIG. 12. The user has filled in the 'make' of car ('Ford') and car registration number into fields 3402 and 3403. Because the label required for field 3402 is not the existing one, 'type', the grid has inserted new label sub-row 3405 to correctly label the new inserted record. If the label for cell 3402 had been 'type', the grid would have used the existing header, inserting a label 'photo', alongside 'registration' label 3406. Record handle 1322, whose 'New' action was selected to cause the transition from FIG. 10 to FIG. 11 has moved down to accommodate the new label row. Also, in this preferred embodiment, the record handle has not been re-labeled, as it is considered as being an attribute of the 'Family' record that contains it, and hence its label is 'Cars'. Note that the 'New' action of the record handle 1322 in FIG. 10 has added another 'New' handle 3401 below it to replace it. Note also that 'Homes' label 1406 and its field 1323 have been moved further to the right leaving a gap in the label row for the 'Family' record. This preferred embodiment considers that the 'Cars' attribute extends downwards as far as the new record handle 3401, and rightwards as far as the 'photo' column, which contains label sub-row 3405 and cell 3404. Thus, in accordance with a preferred embodiment of the present invention, the correct place for the 'Homes' column is where it is shown. Other preferred embodiments may use extra grid-lines and other visual elements to help alleviate any perceived lack of cohesion in the display of data.

Considering data field 3404, in the 'Photo' column, this is an example of a programmer-defined extension to the visual interface of the present invention. In its current state, the invention specifies five display items, reference (single-valued), reference list, single-valued text field, multi-valued text field, and join which can be generated in the application program and passed to the grid to display. The grid supplies a sixth display item—the label. The label is generated by the grid according to information supplied by the application program.

The display items have graphical elements that represent them on-screen. For example a single reference is displayed on the screen using a record handle. In FIG. 12, the application programmer has derived a new class 'Photo' from the base class 'DisplayItem' defined within the grid. The DisplayItem class is not displayable by the operating system. Instead classes derived from 'DisplayItem' maintain pointers to a parallel set of classes that are displayable by the operating system. For example, a 'Join' class derived from 'DisplayItem' is represented on the screen by a 'TjoinIcon' graphical object, which is derived from a Borland BitBtn class. The Join class maintains a pointer to the TjoinIcon object. This means that application programmers can extend the visual interface by deriving a new class such as 'Photo' from 'DisplayItem'. They may then independently define the visual representation of their display item class. They then have to define functions to create the graphical element and add its actions. In functions defined for the new display item, the graphical element can be passed to the grid to be placed and sized by the grid's internal programming.

The proposed 'Photo' display item is designed to hold the file-system address of a file which contains a photo of the car. Initially, the 'Browse' action displays a dialog enabling the user to select a graphics file. Once selected, the default action changes to 'Display'. This opens a viewer in a separate window to display the photo. This is simple example of the extensibility of the graphical interface.

Referring to FIG. 13, Data Retrieval window 1901 of a preferred embodiment of the present invention is illustrated. Data Retrieval window 1901 contains query window 1902; command button region 1903; scrollable region 1904, which is governed by two arrows, 1905 and 1906, and contains keywords used in the creation of queries; type and attribute type data schema tree 1907; and data grid 1908. The data schema tree is similar to that presented in FIG. 11. It is apparent that attribute node 1816, from FIG. 11, for 'Family' type 1814 has been expanded to show the attributes of this type, which are attributes 1909-1912. The attributes are those in previous examples such as those in FIG. 9. It is possible to expand the types in New Type window 1801, shown in FIG. 11, but this feature is not shown on that figure.

Types and attribute types can be selected by browsing hierarchical tree display 1907. The user can also enter or modify a query in query window 1902, either by typing the query in, selecting keywords from keyword region 1904, selecting types and attributes from hierarchical tree display 1907, or a combination of these approaches. It is a common practice in background art graphical interfaces for databases for a window to be provided having some of the features of Data Retrieval window 1901, often called a query builder window, to allow the user to build up a query from a variety of sources.

Once the query has been completed to the satisfaction of the user, selecting 'Select' button 1920 retrieves the data into data grid 1908 which is a preferred embodiment of the data grid of the present invention. Note that the data are added to any existing data in data grid 1908. The user is able to refine the choice of selected data. Selecting a few of the data records in data grid 1908, and then selecting 'Keep' button 1915, causes only those data that were selected to be retained. Similarly, selecting a few data records and then selecting 'Drop' button 1916 removes those records from data grid 1908. Selecting a record, or group of records of the same type, and then selecting 'More Fields' button 1917 allows the user to retrieve more of the fields of the records(s) that were not part of the original query. Selecting 'Cancel' button 1918 cancels the entire operation and returns the user to the main Data Processing window. Selecting 'Return' button 1919 returns the user to the main data processing window, adding the records that had been fetched into data grid 1908 into data grid 803 of main Data Processing window 802 shown in FIGS. 6 and 7.

The preferred embodiments shown in FIGS. 6 and 13 uses two data grids. The present invention does not preclude the use of a single window with a single data grid. However, use of two grids, one for fetching raw data and then refining the choice by closing many of the records before returning the selected data to main grid, has many advantages.

In alternative embodiments, expanding node 1816, for the family type, reveals the attributes of this type. The attributes 'dad', 'kids', 'cars' and 'homes' appear in FIG. 9. It will be noticed that the two reference attributes, 'cars' and 'homes', have nodes 1913 and node 1914 respectively. In a preferred implementation of the present invention, expanding these nodes reveals the type or types of object to which the reference is allowed to refer. In FIG. 12, it was shown that the 'cars' attribute can refer to more than one type of object. In FIG. 13, it is assumed that it can only refer to objects of type 'car' or of types derived from type 'car'. This is a further restriction with respect to the discussion of FIG. 12.

In studying the query in query window 1902 in FIG. 13, a person having ordinary skill in the art will see that there are two keywords, 'matching', and 'fetch', that are not part of the syntax of normal SQL. These two keywords are examples of the extensions to the SQL languages used within this disclosure. These extensions of the SQL language are described herein. Some of them are disclosed in the background art, and they are used as examples to show the extra possibilities available to the object data model and the display possibilities of the present invention.

Starting with a simple conventional SQL query, the format is as follows:

Select <columns> from <tables> where <column> <condition> <column_or_value>;

Note that, as far as the syntax is concerned, tables are equivalent to types and columns are equivalent to attributes.

An example of a valid standard SQL query is:

Select Family.Dad, Family.kids from Family where Family.Dad = 'Nick' and Family.kids = 'Fabio';

Using the example in which the Family.kids attribute is multi-valued, a user can add a 'matching' keyword to the multi-valued attribute as follows:

Select Family.Dad, matching Family.kids from Family where Family.Dad = 'Nick' and Family.kids = 'Fabio';

With this query, only those Kids called 'Fabio' are returned. The object is not returned as a whole. Note that the selection of the object is via the condition. Once an object has been selected, the selection of attributes within the multi-valued attribute is by a modification of the 'columns' section of the query. The absence of a 'matching' keyword is equivalent to an 'all' keyword meaning return all elements in a multi-valued attribute. 'all' is thus the implicit default. A multi-valued column within the selection criterion 'column condition column_or_value' can be modified by one of three keywords, 'any', 'all', and 'no' as follows:

Select Family.Dad, matching Family.kids from Family where Family.Dad = 'Nick' and all Family.kids = 'Fabio';

With this query, all of the values of the multi-valued attribute Family.kids within a given object have to equal 'Fabio' for the object to be selected. The default behavior is 'any', which selects an object if any of the values within the multi-valued attribute fulfill the condition. A further keyword that may be used in this position is 'no', which is fulfilled if none of the values of the multi-value attribute fulfill the condition.

The keyword 'or' is used to divide two tables. In the following standard SQL query, all combinations of the records in tables 'a' and 'b' would be combined horizontally in a product. If 'a' had 4 rows and 'b' had 5 rows this would result in 20 rows:

Select * from a, b;

An extension to the language uses the 'or' keyword to create a union. It would list table 'a' followed by table 'b', returning 9 rows:

Select * from a or b;

The keyword 'or' can also be used to divide columns in a sorting expression:

Select * from a or b order by a.column1 or b.column2;

The above expression causes the data from tables 'a' and 'b' to be interspersed using 'column1' from table 'a' as the column to sort on if the record is from 'a' and 'column2' from table 'b' as the column to sort on if the record is from 'b'. 'a.column1' and 'b.column2' must be comparable types. The asterisk wildcard, '*' can be used in the 'tables' part of the query to select from all types or tables. The tables queried will be reduced to those that have matching column names in the column list. Thus, the asterisk, when referred to tables, is equivalent to a list of all tables separated by the 'or' keyword.

In another extension, a further keyword 'attr_type' followed by an attribute type replaces a column name in a query. This is so that selection can be made on the basis of attribute type rather than on attribute name or column name. The following query selects any record containing a field that is an integer, or derived from one that was over 99:

Select * from * where attr_type integer > 99;

The 'attr_type' keyword may be qualified with 'no'. The following query finds all records that have at least one datefield that contains today's date, and also delivers all records that do not have an attribute of type date:

Select * from * where attr_type date = today or no attr_type date;

Finally, an extension to the query language allows the use of the 'fetch' keyword before a reference column:

Select Dad, kids, fetch cars from Family;

This fetches the Family objects and the objects pointed at by the 'cars' reference attribute, in the expanded format used in FIG. 10. An alternative to this approach is the use of a dot notation after the column: 'Family.cars.*' would have the same meaning as 'fetch family.cars'.

The description of preferred extensions to SQL presented herein has not been exhaustive or definitive. Some of the language extensions disclosed herein can be used to return heterogeneous data from relational databases and others can be used to fetch data from object databases. In either case, the returned data is in a format suitable for display in a grid control of a preferred embodiment of the present invention.

To return to the query in query window 1902 of FIG. 13, the 'matching' keyword is used where a selection uses a multi-valued attribute as a selection criterion. The part of the where-clause 'kids='Fabio'', selects a row in a relational database. In the object data model, the query selects objects that have at least one 'Kids' data element that matches the selection criterion. The default behavior is then to return all of the 'Kids' elements within the selected objects. The 'matching' keyword overrides that behavior and returns only those data elements of a multi-valued attribute that match the selection criterion. This does not affect multi-valued attributes like 'Homes' that do not form part of a selection criterion. All of these are returned within the selected object. This is apparent from inspection of returned record 1921, wherein the 'Kids' attribute has only one data element, data element 1922, which matches the selection criterion. This is due to the use of the 'matching' keyword. Normally, this object would return three 'Kids' elements, as seen at cells 1317-1319 in FIG. 9.

The other non-standard keyword in the query in query window 1902 is 'fetch'. The 'Cars' data element has been fetched. Instead of displaying a handle in the 'Get' state, the data have already been fetched, and the handle for 'Cars' attribute 1923 is now in the 'Close' state. Data elements 1924 and 1925 have been expanded inline as in FIG. 10.

The present invention provides ways of inter-relating data schema tree 1907, representing the data schema with the grid control of the present invention, such as data grid 1908, and the query window 1902. One way to accomplish this is to use data schema tree 1907 to automatically generate all or part of a data query. The present invention is particularly helpful to users interested in queries resulting from the selection of a single element of the tree. In the case where 'family' type 1814 is selected the default query is:

Select * from family;

This is intuitively the meaning of the selection of the 'family' element.

In the case where the hierarchy below 'family' is expanded and the reference attribute 'cars' is expanded using its node, 1926, selecting the 'family' type 1814 generates the query:

Select dad, kids, fetch cars, homes from family.

If subsequently 'kids' element 1910 is selected, the generated query becomes:

Select dad, kids, fetch cars, homes from family where kids =

In this case the user needs to supply a value for the 'kids' attribute, by typing it into query window 1902. In the case of the query shown in query window 1902, the 'matching' keyword must also be user-supplied. However, query generation based on currently selected element offers reasonable power. Note that if 'car' type 1927 itself contained references, queries involving further nested fetching of references could be automatically generated. Note also that in semi-structured data, particularly in XML data, reference's attributes can often refer to objects from a small subset of object types. In the case of 'cars', they would be shown below 'car' type 1927. Selection of one of these object types could be used to signify limiting selection to objects which refer to objects of that type.

To summarize, selection of an object type in data tree 1907 can signify fetching all objects of that type. Expansion of a reference attribute can signify fetching the referenced data and inserting it inline in the external object record. Selecting a non-reference attribute can signify that the query will filter the selection based on the value of that attribute.

Figure 14:
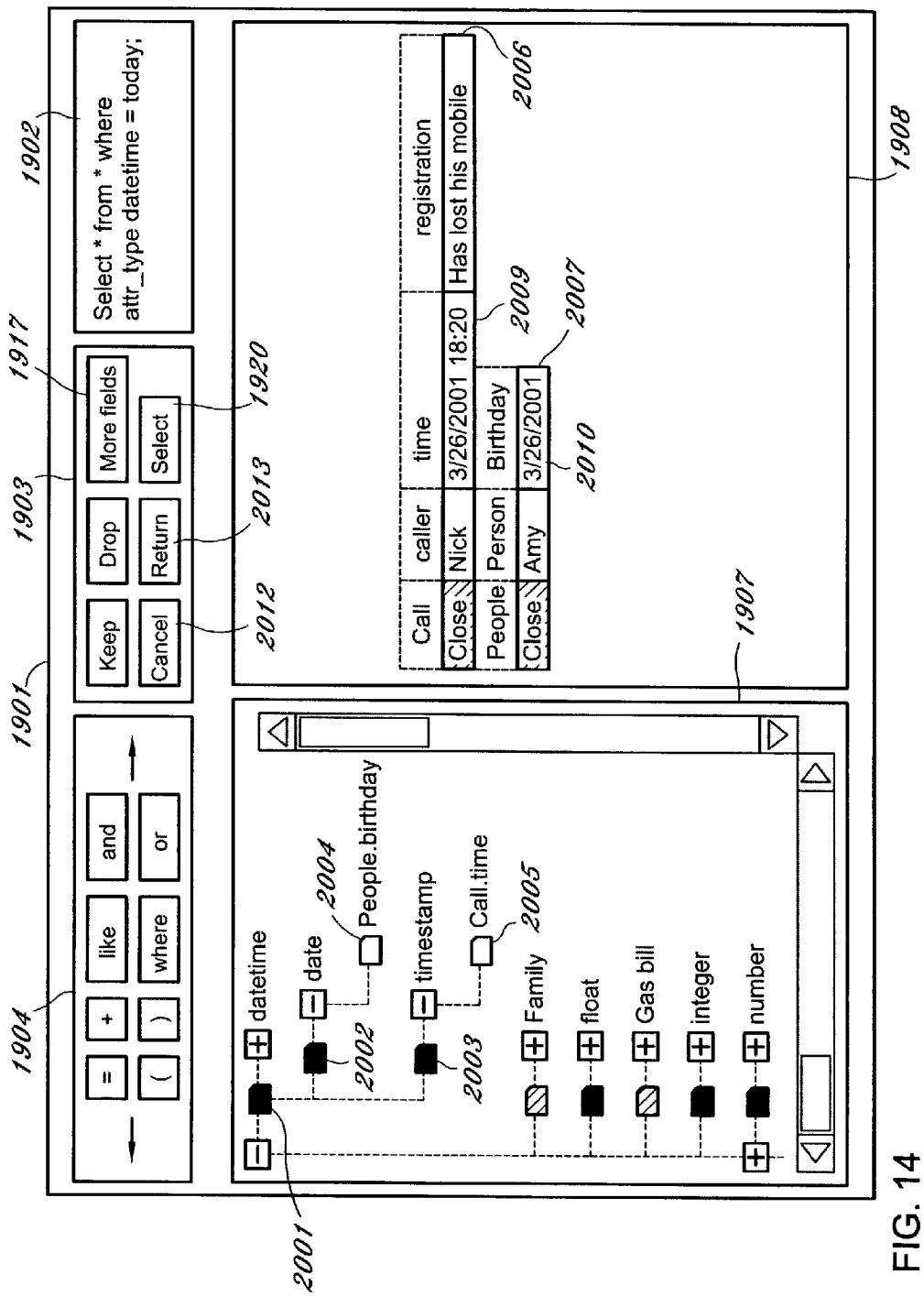
FIG. 14 shows the Data Retrieval window from FIG. 13, showing selection based on attribute type.

In a preferred embodiment of the present invention, all objects having a field of a certain attribute type can be selected. Referring to FIG. 14, Data Retrieval window 1901 from FIG. 13, showing selection based on attribute type, is illustrated. The figure is labeled using the equivalent labels from FIG. 13 where appropriate. It can be seen that the hierarchy of derived attribute types of 'datetime' attribute type 2001 has been expanded. These are 'date' attribute type 2002 and 'timestamp' attribute type 2003. In this example, 'date' attribute type 2002 has a date part but no time component, so it does not distinguish between different times on the same day. In contrast, 'timestamp' attribute type has both date and time information. In the example, the timestamp is a time that is set at the time of record creation, and cannot be modified. Reflection reveals that the query in query window 1902 up to the '=' is the default query for a user selecting 'datetime' attribute type 2001, and could be generated automatically by selecting 'datetime' attribute type 2001. This part of the query selects every data element from every type that has an attribute that is of attribute type 'datetime' or of an attribute derived from 'datetime'. It can be seen that the attributes that conform to the attribute type specified in the query are the 'Birthday' attribute 2004 in 'People' type and the 'Time' attribute 2005 in Call type.

On selecting 'Select' button 1920, two records are returned. First record 2006 is of type 'Call'. Second record 2007 is of type 'People'. It can be seen that the values of the 'Datetime' attributes: 'Time' 2009 and 'Birthday' 2010 match the day on which the query was run (26 Mar. 2001). The ability of the grid control of the present invention to accept heterogeneous data encourages the use of queries based on similar attribute types within different types. The query is effectively asking for every piece of data that refers to a given day.

In alternative embodiments to the preferred embodiment, hierarchical data schema tree 1907 allows for the possibility of displaying actual data values, such as key-fields. This is the case where keys of the objects are displayed as nodes in the hierarchical display. It also provides further opportunities for navigation if classes contain Boolean fields or enumerated fields that can only take a few values. In this case, these possibilities can be represented by sub-branches in the hierarchy. A different color can be used to represent these choices.

The above describes navigation within a data schema. If the interface has cached everything that is known about the data types, navigation of the schema can be done without accessing the data itself, which may exist on a remote server.

The final phase of selection provides the user with the possibility of fetching more fields within the objects selected. In this case, the user returns to the class browser and redefines the required fields. Then 'More Fields' button 2011 is selected and these fields are fetched. Alternatively, by selecting the record handle and right-clicking, a 'Fetch all fields' option is available.

In a preferred embodiment, Data Retrieval window 1901 is not modal. Thus, it is possible to keep it open while working in main Data Processing window 802. For example, the user could keep the data retrieval window open and copy and paste records into different handles in the main data processing window. Menu options available from selected record handles preferably allow normal copy and pasting of data fields as is commonly implemented in windowing systems. Similarly, records can be dragged and dropped from Data Retrieval window 1901 to Data Processing window 802, as is commonly implemented in windowing systems. Copying from Data Retrieval window 1901 to Data Processing window 802 results in copying the visual representation of a record from one window to the other. Copying within Data Processing Window 802 results in making a new record with the same contents (but different OID) as the record being copied. However, copying a record into a reference data element in another record has the result of copying a reference to that record into the reference element. If the data in data grid 1908 is copied using cut and paste into Data Processing Window 802, the user can use 'Cancel' button 2012 to remove Data Retrieval window 1901 from the screen. Alternatively, using 'Return' button 2013, the user returns to Data Processing Window 802 adding the data from data grid 1908 to grid control 803 of Data Processing window 802, shown in FIGS. 6, 7 and 9.

Data Retrieval window 1901 can be used to select data based on data types or on attribute types. It can also be used to retrieve heterogeneous data. It can be further used to refine the selection of data by adding and dropping records or fields. The user can copy retrieved data using the cut-and-paste or drag-and-drop methods common to background art GUI's. Alternatively, the user can return from the window, bringing back those records selected in the grid control of Data Retrieval window 1901 onto Data Processing window 802.

Figure 22:
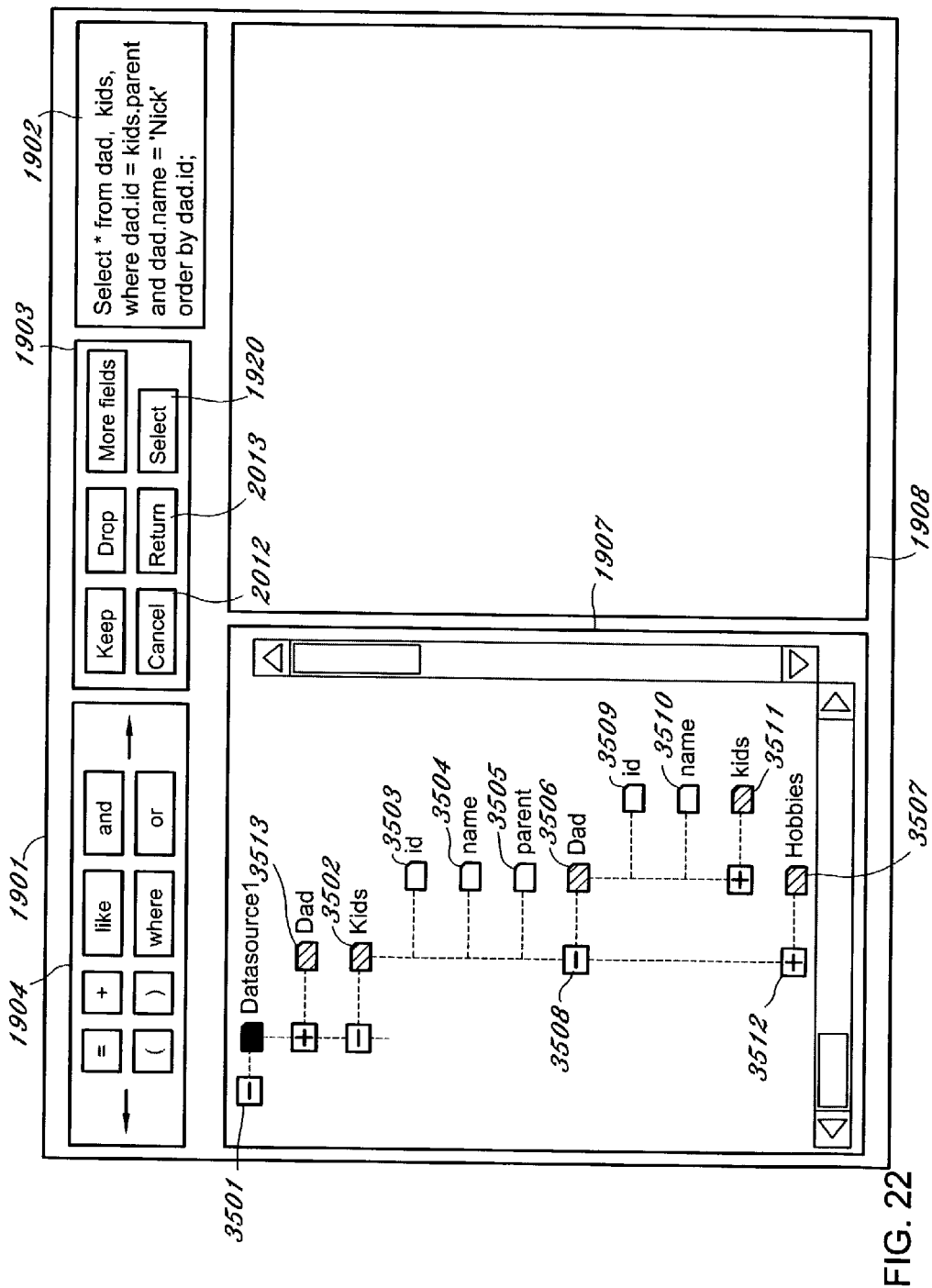
FIG. 22 shows the Data Retrieval window from FIG. 13 showing generation of relational queries using the data schema tree.

To this point in this disclosure, the principles of using the data tree and query window to automatically, or semi-automatically, generate queries have been described in the object world. Referring to FIG. 22, the advantages of a preferred embodiment of the present invention for querying relational databases are illustrated. Because the visual representation of data records is the same for relational as for object data, the same Data Retrieval window 1901 can be used.

Referring to FIG. 22, in data schema tree 1907, relational data sources (e.g., ODBC database sources) are shown as the top level of the hierarchy. It is normal in background art graphical user interfaces to navigate the data schemas of multiple data sources using a hierarchical tree. In the example illustrated in FIG. 22, selection of node 3501 for 'datasource' is operative to start the opening of the data source. This source might typically be an ODBC data source accessed via its DSN (data source name). In this case, the DSN is 'datasource'. In a preferred implementation, for some data sources an optional dialog window is displayed requesting a user-name and password. Upon supplying these, the data source is connected to or otherwise opened and the hierarchy is expanded to display the tables in the data source. The use of the expansion of the data source level to signify connecting and opening the database is common in the background art, as is subsequent displaying of the tables within the data source.

In existing art GUI's, opening of a table displays the columns within the table. However, to find the foreign keys the user has to navigate to a different part of the display. Referring to FIG. 22, it can be seen that 'Kids' table 3502 has been expanded. In the example shown, the data schema has changed slightly compared to that for the data in FIG. 1. An extra column, 'Id' column 3503, has been added to 'Kids' table 3502. It can be seen that the columns within the Kids table, 'Id' column 3503, 'name' column 3504, and 'parent' column 3505, are displayed as elements in data schema tree 1907. Below the columns are displayed two extra elements, 'Dad' element 3506, and 'hobbies' element 3507. These elements are expansible via their nodes, 'Dad' element node 3508 and 'hobbies' element node 3512. These extra elements represent foreign keys of 'Kids' table 3502. The present invention optionally represents foreign keys as extra expansible columns in a hierarchical data schema tree. It is possible with the current invention to use the name of the foreign key as the name of the element in the tree, but these are often very long. In a preferred implementation of the present invention, the foreign key elements are labeled with the name of the foreign table to which they refer. It will be seen that there are two foreign keys for 'Kids' table 3502. The first, 'Dad' element 3506, relates 'parent' column 3505 in 'Kids' table 3502 to the 'id' column in 'Dad' table 3513. The second, 'hobbies' element 3507, relates to a new unspecified table in which 'Id' column 3503 in 'Kids' table 3502 is related to a table specifying their hobbies. A child ('Kid') may have multiple hobbies. Returning to the 'parent' foreign key 3506, it will be noted that its node, 'Dad' element node 3508, has been expanded revealing the data schema for the table related to 'Kids' via this foreign key. In this case the table in question is 'Dad', and it is apparent that the columns of 'Dad' element 3506 (second representation of 'Dad' table 3513) are 'id' column 3509 and 'name' column 3510. 'Dad' element 3506 also has a foreign key, 'kids' column 3511, which points back at 'Kids' table 3502. Note that second representation of 'Dad' table 3506 is also represented at 'Dad' table 3513. Referring back to FIG. 13, it can be seen that in the object world expandable attribute nodes are reference attributes, whereas in the relational world they are foreign keys. Because relational foreign keys can only refer to one table, expansion of the foreign key node immediately displays the columns of the related table, missing out a stage present in the object case. Summarizing, in a hierarchical tree structure, the data schema of a relational database can be traversed using expansible foreign keys represented as extra columns.

Considering automatic query generation for the relational case, selecting a table at the top of the table hierarchy, such as 'Dad' table 3513 generates:

Select * from Dad;

Selecting a column within a table such as first 'name' column 3504 in 'Kids' table 3502 generates a query that prompts the user for a value of that column to filter on:

Select * from kids were name =

Selecting the foreign key such as 'Dad' element 3506 creates a join between the two tables:

Select * from dad, kids where dad.id = kids.parent;

This method can be used to join any number of tables via selected foreign keys. Visual programming is improved because the path of navigating through the hierarchy is used to specify which joins are made by the query. The navigation path is the same as the join path.

Selecting a column within a table that is reached by a foreign key from another table within the hierarchy, such as Dad.name column 3510 generates a query with a join and a filter on that column, prompting the user for a value:

Select * from dad, kids where dad.id = kids.parent and dad.name =;

To summarize, in preferred embodiments of the invention, selection of a table in data tree 1907, can signify fetching all records from that table. Expansion of a foreign key shows the referenced table, and selecting that foreign key represents a join between those tables using that particular foreign key. Selecting a column within a table generates a query that filters on that column, prompting the user for the value required in that column. There is great continuity between the visual representations of equivalent operations in the relational, object and semi-structured data worlds. In preferred embodiments, these operations are made possible by the innovation of displaying foreign keys as extra columns or meta-columns in the data schema tree of the present invention.

In FIG. 22, panel 1904 contains the keywords used to build up queries in steps. The present disclosure has concentrated on a query generated by a single selection. It will be noted that for a query containing any number of joins and a filtering based on the value of on column or attribute, the expressive power of the proposed interface is capable of generating this kind of query, leaving the user only to key in the value of the filtered column. This is powerful because this class of query represents a large proportion of all queries in SQL. Preferred embodiments of the present invention could clearly be modified to use multiple selections in alternative embodiments.

Figure 23:
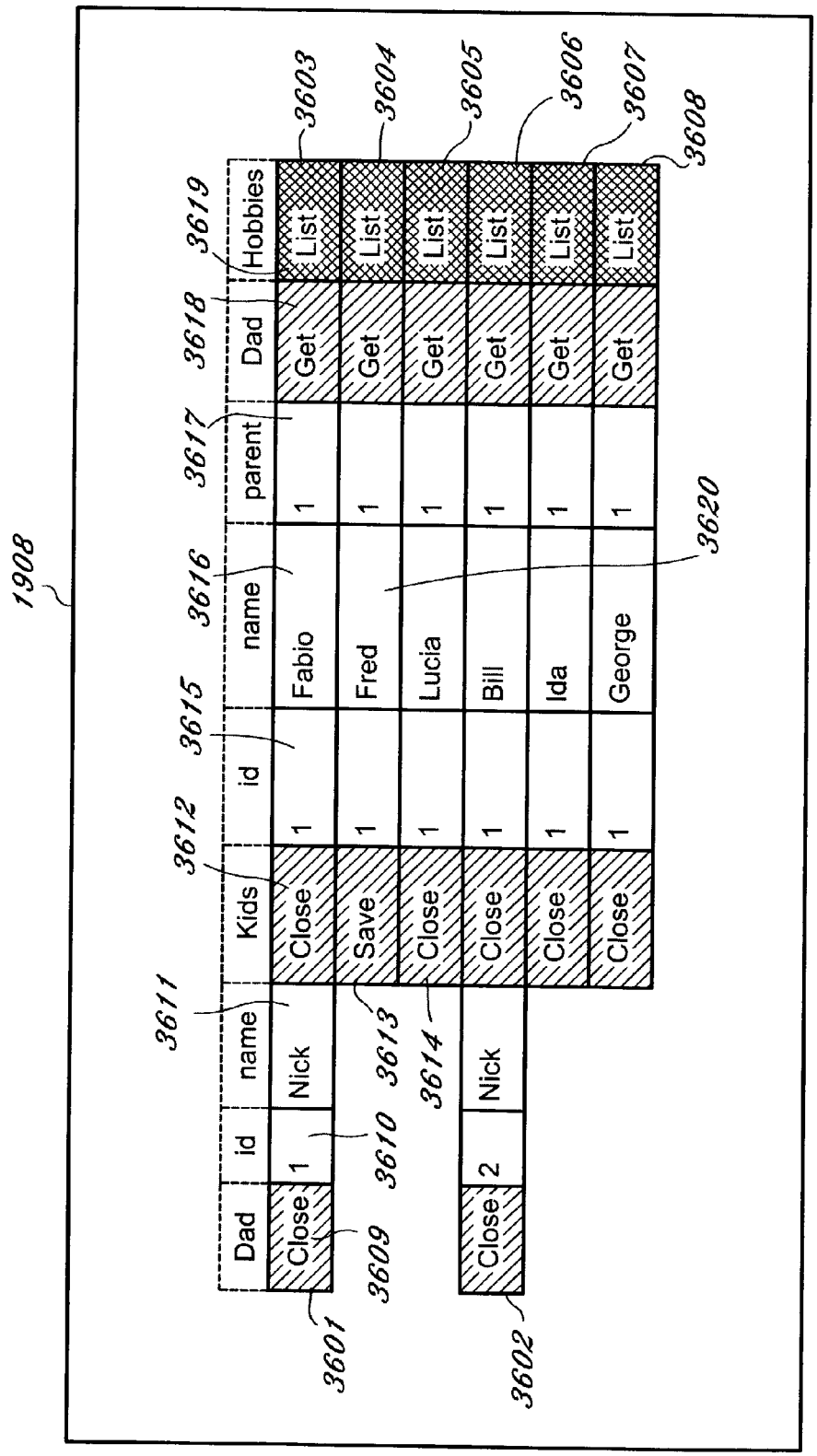
FIG. 23 shows the grid control from FIG. 22 with relational data in object display mode.

FIG. 23 shows the data returned from running the contents of query window 1902 in FIG. 22. To arrive at the query, the user selected second 'name' column 3510 as discussed earlier. The user then supplied the name to filter on, in this case, 'Nick'. On selecting 'Select' button 1920, the system automatically adds the clause 'order by . . . ' to the query. This is a standard SQL query that is sent to an RDBMS to return the dataset.

Grid control 1908 in FIG. 23 with the results of the query from FIG. 22 displayed in a mode described in this disclosure as the object display mode. In the object display mode, first master record 3601 and second master record 3602, are clearly associated with the detail records with which they are associated: first detail records 3603-3605 for first master record 3601 and second detail records 3606-3608 for second master record 3602. Comparing FIG. 22 with FIG. 1, in a background art database grid such as background art grid control 201 in FIG. 1, first master record 3601 would be repeated three times, filling up the rows until second master record 3602 was displayed. The object display mode of preferred embodiments of the present invention shows the relationships between master and detail records much more clearly than relational output in conventional background art grids. Moreover, background art grids do not have the interactive capabilities of the present invention, due to not having record handles.

Referring to FIG. 23, master record 3601 consists of first record handle 3609, two relational data fields, 'id' data field 3610 and 'name' data field 3611, containing data returned by the query, followed by a reference list of record handles, second record handle 3612, third record handle 3613 and fourth record handle 3614. These record handles represent the foreign key that relates the 'Dad' table to the 'Kids' table, and constitute an extra column or meta-column, that is not present as a column in the relational data schema. Referring back to data schema tree 1907 in FIG. 22, it can be seen that the extra column is equivalent to an extra expandable element, such as 'Dad' element 3506, representing the foreign key. Thus, foreign keys are shown as extra columns both in the data schema tree and in data records. Looking at one of the record handles, second record handle 3612, it can be seen that this forms the record handle of the detail 'Kid's record, which then continues with the following data fields: 'id' data field 3615, 'name' data field 3616, and 'parent' data field 3617. These three data fields contain the relational data returned from the database. Following them are the following two foreign key fields: 'Dad' foreign key field 3618, and 'Kids' foreign key field 3619. Because the Kids/Dad relationship is many-to-one, this foreign key is represented by a record handle, fifth record handle 3618, whose default action is 'Get' because the data have not yet been fetched. Because the Kids/Hobbies relationship is one-to-many (one child can have more than one hobby), this is represented by a list handle, first list handle 3619, which upon expansion will fetch all of the records from the 'hobbies' table related to this child.

Thus, in the object display mode, foreign keys in detail tables (wherein the relationship is one to many) are displayed as multi-valued reference fields in the master table, and foreign keys in detail tables are displayed as single-valued reference fields in the detail table. If the foreign keys have not been used in joins, the multi-valued reference fields contain list handles, and the single-valued reference fields contain record handles in the 'Get' state.

It will be noted that the order of tables in the generated query in query window 1902 of FIG. 22 is different from that in which they were selected in the hierarchy. This is because, in object display mode, the master table is on the left, and the detail table to the right. The 'order by' clause added to the query is to group detail records by their master record for the object display mode.

The data shown in grid 1908 in FIG. 23 comprise the result of running a single SQL query on a relational database and formatting the output in the new way of the present invention. However, the record handles and list handles have the same meaning as for object data. Thus, the user can close records that are not of interest. Second detail record handle 3613 is now in the 'Save' state because the user has changed the contents of second 'name' field 3620 to 'Fred', illustrating that the records behave like those from object databases.

The record handles for foreign keys of the detail records, fifth record handle 3618 and first list handle 3619, can be used to navigate further within the data, fetching more data and expanding it inline. The grid control of preferred embodiments of the present invention navigates by fetching data and expanding it inline. This has advantages over opening a new window as background art Internet browsers do. The philosophy of the present invention is to get all data in which the user is interested close together in the same grid.

It is important to consider the relationship between queries in the query window 1902 of FIG. 22 and selections in the data schema tree 1907 that may have generated them. If a user uses a selection in the data schema tree to partially generate a query, the application program already knows what foreign keys are being used for joins, and which table is the master table. Thus, when the 'sort by' clause is added, which is a requirement of the object display mode, this can be supplied by the data schema tree. If, however, the query is typed free-form into query window 1902, the query must be parsed by a module that has knowledge of the data schema, to supply this 'sort by' clause. Also, the automatic re-ordering of the tables to put the master on the left must be performed on the user-supplied query by the parser module if the user supplies the query by hand. If the user-supplied query does not contain the primary keys for any of the tables, the parser modifies the query to include these columns. This means that although the primary key columns might not be displayed, they are still stored so that they can be used to save or delete modified data.

Preferably, the object display mode is optional. That is, if the user wants data returned as uniform rows, this is also possible. Without the object display mode, the display of a preferred embodiment of the present invention is similar to that in FIG. 1, but with the cells like cell 210 replaced with record handles. However, the actions available to these record handles are likely to be limited to actions such as 'Close' that do not modify data, as the record contains data from two tables. It is possible to conceive an interface between the grid and the database capable of implementing 'Save' actions, but the data repetition between different records makes this much more difficult.

Whereas removal of data duplication was a goal of the relational method of storing data, output from relational queries increases data duplication on display. The present invention reduces data duplication on display, and distinguishes between data that are different but have the same value.

The object display mode for relational data displays joins between tables using foreign keys, often called natural joins, using the record handle that represents the foreign key to represent the join. The present invention is also capable of joining on any data field using any condition.

One having ordinary skill in the art will know that a join consists of linking two sets of data with one or more conditions. This disclosure only deals with the case of a single condition, but one having ordinary skill in the art would understand how to extend these concepts to more conditions. The two sets of data are known as the left-hand and right-hand sides of the join. The condition relates a single field in a record from the left-hand side to a single field in the record of the right-hand side. Thus, to specify the join one must supply the two datasets, the two fields and the condition linking them.

There are two cases in which preferred embodiments of the present invention are capable of displaying non-natural joins. The first is as the result of parsing a query that contains a join. If the parser determines that the join is not a natural one (i.e., it is not using an embedded record handle), the system inserts a join icon as discussed later. The second case is an interactive join with existing on-screen data.

Figure 15:
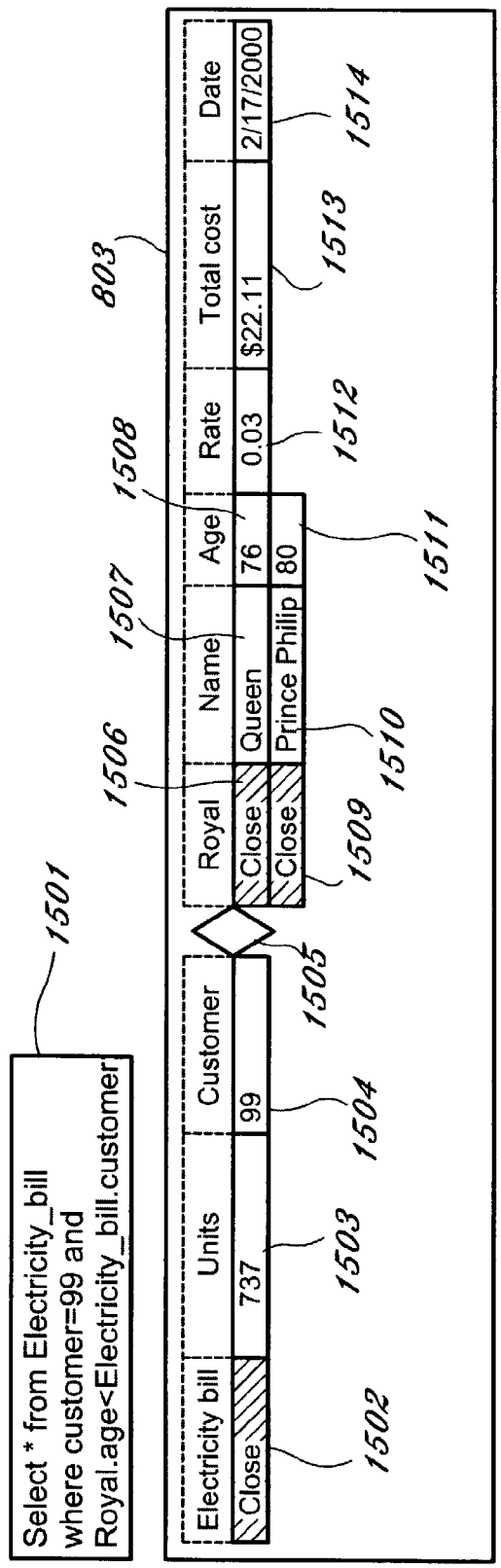
FIG. 15 shows the representation on the screen in a preferred embodiment of the present invention of a join between two relational tables or between two object types.

Referring to FIG. 15, a representation on the screen of a preferred embodiment of the present invention of a join between two relational tables or between two object types is presented. In this case, the join was present in the original query. The data from 'Electricity Bill' record 1007, shown in FIG. 8, is joined to records in a table called 'Royal', which contains names and ages of some of the British Royal Family. The data are displayed in grid control 803 of the Data Processing window from FIG. 9. The query, which is syntactically identical to standard SQL, is shown in query window 1501. It matches all royals whose age is less than the customer ID. It is not a likely query, but illustrates several points. First record handle 1502 and fields 1503 and 1504 of the 'Electricity Bill' record are broken at the joined 'Customer' field 1504 by join icon 1505. These items are followed by the items of the matching records from the second record type. There are two matching records, second record handle 1506, with data fields 1507 and 1508, and third record handle 1509 with data fields 1510 and 1511. The rest of the fields from the 'Electricity Bill' record fields 1512-1514 are shown after the 'Royal' records. The decision concerning whether to put the new joined record at the end of the existing record, or to insert it after the field on which one is joining is an option that can be decided by the user or the programmer.

Join icon 1505 is preferably a red diamond, shown as white in monochrome, but can be of any shape and design. One join icon is preferably related to each joined data cell on the left-hand side of the join. The join icon preferably represents a join between a data record described as on the left of a join and one or more records on the right. A Join display item is the object passed to the grid to be displayed as a join icon. It has a pointer to the item that was joined on one side, usually described as the left of the join, and a list of records on the other side. The 'Close' action of the join icon removes the data records logically on the right-hand side of the join from the grid control.

The display of joined data is preferably identical in the case of an interactive non-natural join. In this case, initially, one or more cells of data existing in the grid of the present invention are selected by the user as the fields of the left-hand side. The set of selected data elements need not be the same attribute or from the same type. In the interactive case, the 'Join' action of the data cells is used to allow the user to specify the other two components: condition and right-hand side. Second, the condition governing the join is supplied by the user. Usually this is a join on equality, and this is supplied automatically. Third, the set of data with which to join the selected data must be defined by the user. The user selects the set of data and the field to be tested for the condition. In the simple case, the user selects a given field within a table as the set of data to which the join condition is applied.

To arrive at the display in FIG. 15 interactively, a right-click on data cell 1504 causes that cell's pop-up menu to be displayed. In grid controls of the present invention, data fields have actions. Selecting the 'Join' action takes the user to Data Retrieval window 1901 of the present invention as shown at FIG. 22. The 'Royal' table (not shown) is found in data schema tree 1907 and opened. Selecting the 'age' column within the 'Royal' table then automatically generates the following SQL query Select * from Royal where age = 99;

The user then have modifies the condition from the default '=' to '<' (less than).

In a preferred embodiment, selecting 'Select' button 1920 in FIG. 22 selects the two records whose handles are 1506 and 1510, and displays them in grid 1908, preceded by join icon 1505. Selecting 'Return' button 2013 returns display items 1505-1511 from the Data Retrieval Window to display joined to the left-hand side in grid 803, where the join action was initiated as shown in FIG. 15.

The preferred embodiments described in this disclosure select data in the Data Retrieval window 1901 and transfer it to the Data Processing Window's grid 803. Other preferred embodiments could perform all operations in a window similar to Data Retrieval window 1901, without a need for a second window. Similarly, new types could be generated using the same data schema tree 1907 as is used for data selection. However, there are advantages to having two grids, and creating joins is one operation that is greatly simplified by using two windows.

In the general case, the left-hand side contains multiple fields. Returning multiple sets of records, the interface must divide them up between the selected fields on the left-hand side.

Specifying the right-hand side consists of selecting both a set of data to consider, and the field within that data. The same visual metaphor using the data schema tree is used as described for FIGS. 13 and 14 for selection of initial datasets, with the complication that an attribute must be selected as well as a table or object-type. Depending on the underlying data model, the data schema tree may be a simple hierarchy of tables and columns as in FIG. 22 or types, attributes and attribute types as in FIG. 14. In the Data Retrieval window, if the user selects a data attribute within a data type in data schema tree 1907, and returns, the action is to join each selected data element to records of that data type whose value for that attribute matches the selected data element in the left-hand side of the join. Alternatively, if the user selects a data attribute type and returns, the action is to join each selected data element to one or more records from any data type containing an attribute of that attribute type where the attribute matches the selected data element in the existing left-hand side of the join. In a less likely scenario, if the user selects a data type in data tree 1907, the join matches any field or attribute within that type. Note that these joins are based on equality between the fields on either side of the join.

A join is effectively a select using selected fields as the right-hand side of the comparison. Related extensions to the SQL language are discussed later. However, if a query has to be created to complete a complicated join, it can be seen to be the equivalent of a select query involving a join, where one half of the join has already been selected. Consider the query discussed earlier, that produces the output in FIG. 1:

Select * from Dad, kids where Dad.name = 'Nick' and Dad.id = Kids.parent;

If two new keywords are postulated, 'join' and 'selected_fields', a similar result is achieved by performing a standard SQL query, then selecting the Dad.id fields and then performing a modified query:

Select * from Dad where Dad.name = 'Nick';

The user then manually selects the Dad.id fields. Then, the join query is run:

Join * from kids where Kids.parent = selected_fields;

This produces exactly the same results, although in the general case using a join query produces an outer join rather than a standard join.

Previous sections of this disclosure have described what preferred embodiments of the record, grid control and software application do. The next section deals with how preferred embodiments accomplish these things.

Figure 16:
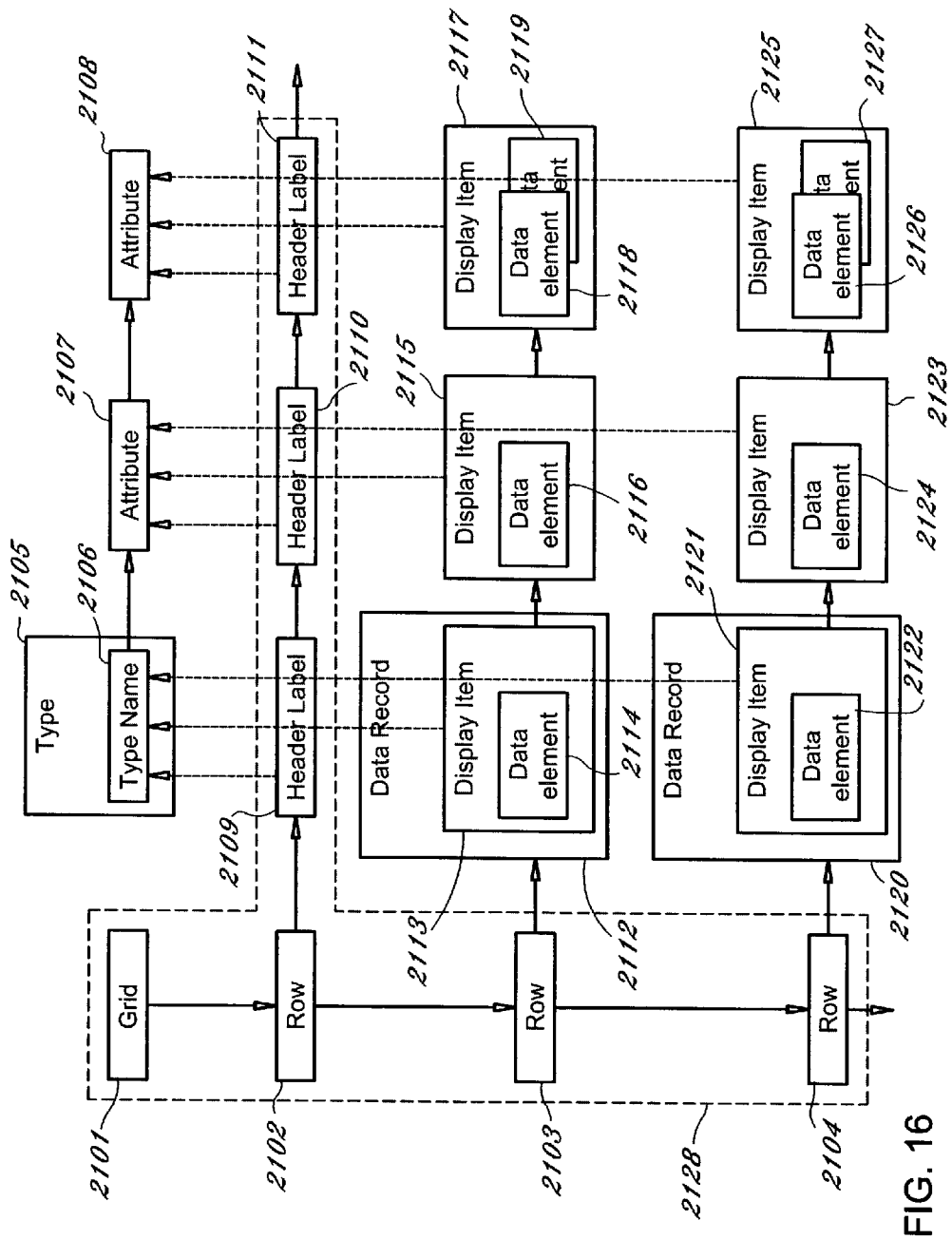
FIG. 16 shows relationships within a preferred embodiment of the grid control of the present invention.

Referring to FIG. 16, object relationships within the grid control of a preferred embodiment of the invention are illustrated. The objects here are not database objects, but objects in the software design of a preferred embodiment of the invention. To avoid confusion, the discussion refers to the grid rather than the grid object, the type instead of the type object, and so on. In FIG. 16, grid 2101 has a list of rows 2102-2104 of data and headers that it is displaying. The rows consist either of lists of header labels 2109-2111 or of lists of display items 2113, 2115, 2117, 2121, 2123, and 2125. Display items include references (represented on screen by record handles), joins and display items relating to data fields. In FIG. 16, no joins are shown. Display items 2113, 2115, and 2117 belong to first data record 2112 and display items 2121, 2123, and 2125 belong to second data record 2120. The data records in turn are of a certain type, type 2105. The display items and labels are related to type names 2106 in the case of the display items for the record handles 2113 and 2121 and to type attributes 2107 and 2108 within the type, as shown by the dotted arrows. In a preferred embodiment, types contain type names and data records contain display items, but other approaches may be taken. Alternatively, data records can point to display items. Note that in FIG. 16 these types and attributes are display types and attributes. They do not necessarily relate to object database types and attributes. They can equally refer to relational database tables and columns. The objects shown in FIG. 16 are in a format that the grid control is capable of displaying, and as such are transformations of the data in the underlying data model, be it relational or object data.

Display item 2113 for first data record 2112 is the single-valued reference related to the record handle for the record. It contains information about how to save the record. Joins are not shown here, but they are display items, and have their own header labels. Dashed line 2128 shows the boundary between, on one side, software objects generated by the grid control—the grid, rows and header labels, and, on the other side, objects created by the calling program and passed into the grid—the types, attributes, data records and display items. FIG. 16 also shows that a display item that represents data contains the data to be displayed in it. Attribute 2108 is a multi-valued attribute. This means that display items 2117 and 2125 have more than one data element—data elements 2118 and 2119 for display item 2115 and data elements 2126 and 2127 for display item 2125. One having ordinary skill in the art will realize that use of the data elements is required for the initial display, but for subsequent updating of the database, a choice to access the version of the data maintained by the windowing system may be made.

The following discussion is concerned with several, preferred basic display item types or kinds, which are named here. The record handle for a given object has a display item type of SVARef, meaning that this is a single-valued reference item. An embedded reference within a record is also of type SVARef, but a multi-valued attribute containing references is of type MVARef. Joins are of display item type Join. Ordinary single-valued text fields are of kind SVAText, and ordinary multi-valued text fields are of kind MVAText. Note that text fields are capable of containing numbers, so with these display item types, a lot of functionality is available. Note also that there is one display item for each multi-valued field, but these may be linked to several graphical elements.

Figure 17:
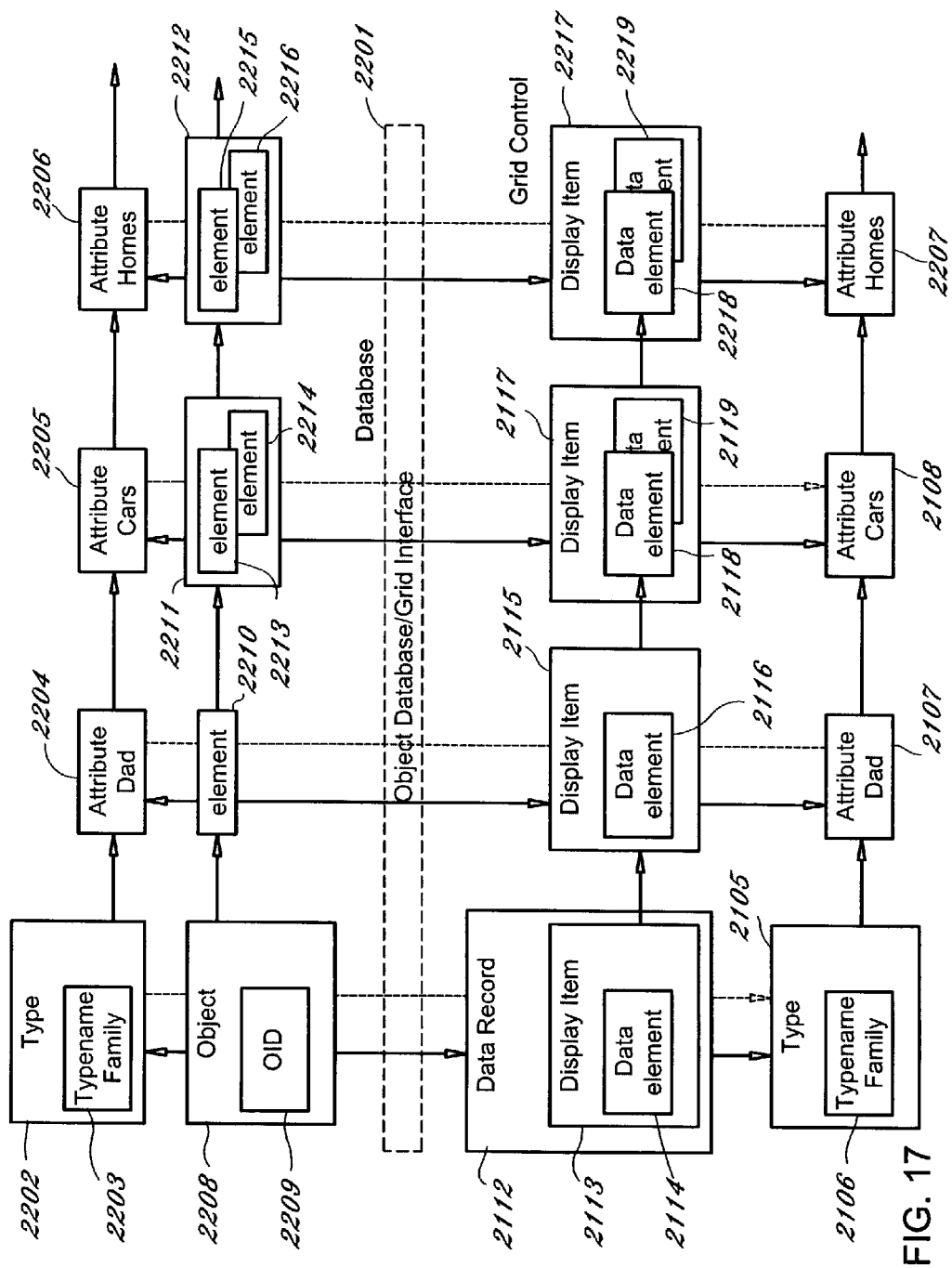
FIG. 17 shows relationships between a preferred embodiment of the grid control of a preferred embodiment of the present invention and an object database.

Referring to FIG. 17, relationships between a preferred embodiment of the grid control of the present invention and an object database are disclosed. FIG. 17 shows the relationship between data supplied by the object database and the equivalent data passed to the grid control of the preferred invention. The object data model is as follows:
 a) each record is identified by a unique database identifier called an object ID (OID)
 b) each record is of a type or of no type. All that is necessary is to be able to get the data out of the database and know how to display it. There is no requirement for the old object requirements of methods, encapsulation, and inheritance. This is why the term 'type' is used herein rather than 'class'. The invention can however support inheritance, and methods, as is shown later.
 c) A field in a record can store multi-valued attributes. That is, a single field in a record or object can consist of a list or array of values.
 d) A field in a record can store references to other objects as fields within an object. This reference is either the OID or the OID plus the class of the referenced object. Reference attributes may also be multi-valued.

Referring again to FIG. 17, object database/grid interface 2201 is a preferred embodiment of an object database/grid control interface of the present invention. It is an interface between such an object database and the grid control of the present invention. Items above interface 2201 in FIG. 17 are data presented by an application-programming interface (API) of the object database. Items below interface 2201 are the data that are passed by interface 2201 to grid control 2101 of FIG. 16. Thus, data record 2112 is the data record of the same number shown in FIG. 16. Type 2105 is as shown in FIG. 16, although arranged differently on the page. Similarly items 2113-2119 and 2106-2108 are labeled using the same numbers as in FIG. 16. It is apparent that the list of display items starting at display item 2113 is that required for record 1313 in FIG. 9, providing that the 'Kids' attribute is omitted (for reasons of space). Note also that Cars has an extra data element in FIG. 17.

At the top of FIG. 17, type 2202 is the database equivalent of grid control type 2105. Type 2202 is in the format supplied by the API of the object database, and grid control type 2105 is in the format required by a preferred embodiment of the grid control of the present invention. Similarly, type name 2203, which contains the name 'Family', is the equivalent of grid control type name 2106, and the attributes 2204, 2205, and 2206 match type attributes 2107, 2108, and 2207, respectively. Object 2208 represents the data returned by the database. It is identified uniquely to the database by object identifier (OID) 2209. In some systems, to uniquely identify an object, the combination of type and OID is used. Because preferred embodiments of the present invention allow very weak type-control of data, it is assumed here that the database illustrated in FIG. 17 just uses the OID. Apart from the OID, the data object contains a series of elements 2210 or groups of elements 2211 and 2212, one for each attribute 2204-2206 in the object's type 2202. If a type's attribute is multi-valued, the data consist of a list or set of elements. Thus, data field 2211 has two elements, element 2213 and element 2214, as does data field 2212 (element 2215 and element 2216).

Using the data model from the top half of FIG. 17, an object database is likely to have an API containing functions like those shown below. The parameters to the function are shown in parenthesis. The function list presented below is not exhaustive:

Oid_get_object(oid): Use the supplied OID to get an object similar to object 2208 containing an oid and a list of elements from the database.

Oid_get_elements(oid, attribute_list): Use the supplied OID to get part of an object. Return only those attributes named in the list.

Type_get_attr_list(type): Given a type name or identifier, return a type and list of attributes like type 2202 and its attributes.

Save_object(object): Given an object 2208, containing an OID and elements, save the object to the database.

Allocate_object(type): Allocate a new object structure like object 2208, based on the supplied type like type 2202.

Define_type(type_name, attribute_list): Define a new type in the database with the supplied type name and an attribute list like that of starting attribute 2204.

When updating the data in the database, a call is made to the save_object( ) function, passing object 2208 with an updated list of elements 2210-2212. The database uses OID 2209 to reference the object to be updated in the database. Similarly, when fetching an object referenced by a reference field, calling the oid_get_object( ) function passing the OID stored in the reference field as a parameter returns an object like object 2208.

In a preferred embodiment, the role of object database/grid interface 2201 is to convert a type, like type 2202, and its attributes 2204, 2205 and 2206, into the equivalents, type 2105 and attributes 2107, 2108, and 2207. Similarly, database/grid interface 2201 converts an object, like object 2208 and elements 2210-2212, into data record 2112 and other display items 2115, 2117, and 2217. Examining the symmetry of FIG. 17, it is clear that a newly-designed database can be customized to return type structures identical to those used by the grid control. Similarly, such a database can supply objects in the format of data records and display items, although the additional data structures relating to the specific windowing system being used render the database interface structures larger and more platform-specific. In any case, it is clear that for this preferred object database model, database/grid interface 2201 is uncomplicated. For other data models such as CORBA, XML, etc., the interface needs to accomplish more work. In most cases, some form of transformation of the data from the database's data model to that required by the grid of the current invention is required. In the object world, this transformation is required if multi-valued attributes are not atomic. By atomic is meant a data type which has no internal structure such as a number or a character-string. If data elements in a multi-valued attribute have structure, the transformation is to represent them as lists of references. The record handles in the reference list control the contents of the structure of the individual elements. Thus, although all of the data in the complex data element is internal to the object, it appears on the screen related to a record handle which normally signifies a reference to data external to an object. The present invention is capable of representing many different types of data by generalizing the representation. This means that the division into records on the screen does not always conform to the granularity of the data model in the database.

Figure 18:
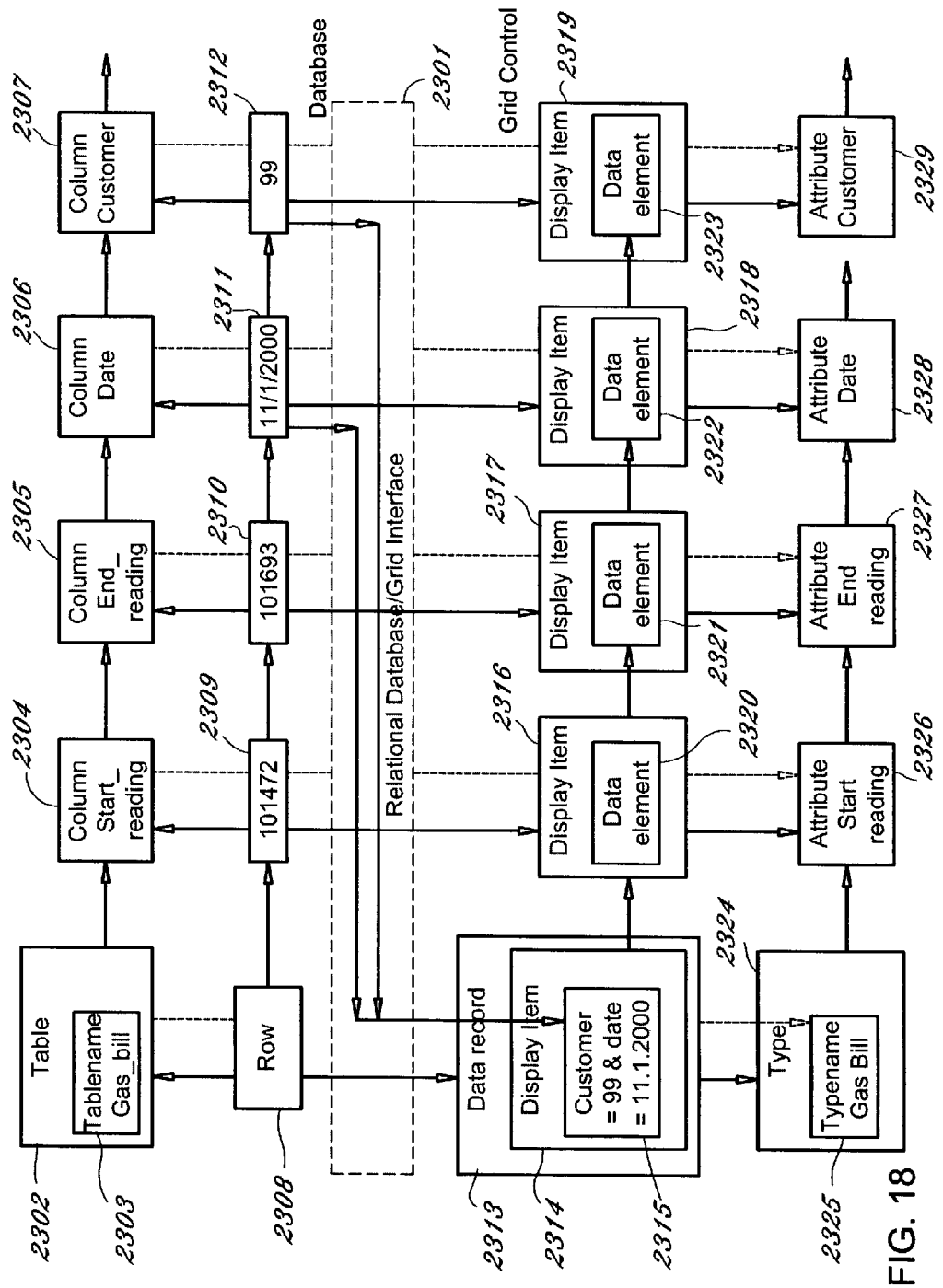
FIG. 18 shows relationships between a preferred embodiment of the grid control of a preferred embodiment of the present invention and an existing art relational database management system (RDBMS).

Referring to FIG. 18, relationships between a preferred embodiment of the grid control of the present invention and an existing art relational database management system (RDBMS) are illustrated. This figure is equivalent to FIG. 17 for the relational database case. As in FIG. 17, there is a database/grid interface, in this case a preferred embodiment of relational database/grid interface 2301 of the present invention. Items above interface 2301 are representations of data and metadata in the relational database, and items below it are data that are passed to the grid control of the preferred embodiment of the present invention. FIG. 18 shows record 1312 from FIG. 9, without the 'rate', and 'total cost' columns. All of the columns come from the same table 2302, with table name 2303 of 'gas_bill'. The database returns a series of rows such as row 2308, with data fields 2309-2312 relating to table columns 2304-2307. Only one row is shown here.

The role of interface 2301 is more complicated here than in the case of an object database/grid interface. The unit of granularity, that is, the unit in which data are saved to the database, is a row or partial row within a single table. Therefore, if the query joins two tables, the interface usually splits the query results into two sets of data records—one for each table. In the case of the query shown, there is only one table, so there is one data record, data record 2313. This data record contains the familiar display items: item 2314, for the record handle's reference item, items 2316-2319 for the record fields, and their data elements 2320-2323. The data elements are simply the contents of data fields 2309-2312.

FIG. 18 shows the applicability of the relational model to the present invention. Type 2324 is simply a mapping of table 2302, with type name 2325 being merely the table name. Attributes 2326-2329 are simply mappings of table columns 2304-2307. It is possible to set the grid control and grid interface 2301 to operate in normal relational mode. In this case, the record handle has limited capabilities, and one is not usually able to write modified data to the database. It acts similarly to a grid containing query results in TOAD from Quest. However, if the grid control is operating normally as disclosed herein, an object representation of relational data is allowed. It is noted that display item 2314 does not contain data returned by the relational database. It is a record handle's reference item. Interface 2301 passes primary key information that uniquely defines the record to display item 2314.

If the original query does not contain the primary key information, interface 2301 adds those columns to the query. In the case of FIG. 18, the primary key information is considered to be the Customer and the Date (the customer can only receive one bill per day). This information is passed from item 2311 and item 2312 not only to data elements 2322 and 2323 in the display items representing those columns, but also to data element 2315 of handle 2314. The data are shown as being stored as a where-string. A where-string is the string that is the clause in an SQL query that determines whether a row is included in a selection. When one uses equality to the primary key in a where-string, this identifies a row uniquely. Thus, to save the data when modified, the query becomes as follows:

Update gas_bill (start_reading, end_reading, date, customer) values (<new values>) where customer = 99 and date = '11.1.2000';

<new values> is the new values contained in the data elements of the record. After the update command, the change may need to be committed to the database.

The part of the query up to 'values' is obtained by traversing the type and attributes 2324-2329. The new values are obtained from data elements 2320-2323, and the clause after 'where' is that stored in the handle's data element 2315. In fact, only the modified fields need to go into the update query. Thus, interface 2301 is capable of saving modified records in a simple and uniform way. The procedure for saving the data is independent of any knowledge of the specific tables in the relational database, which need not be known when the interface is built. Where the relational query consists of a join between single rows in a master table and multiple rows in a detail table, the object way of displaying these data means that the master table row is only displayed once.

Figure 19:
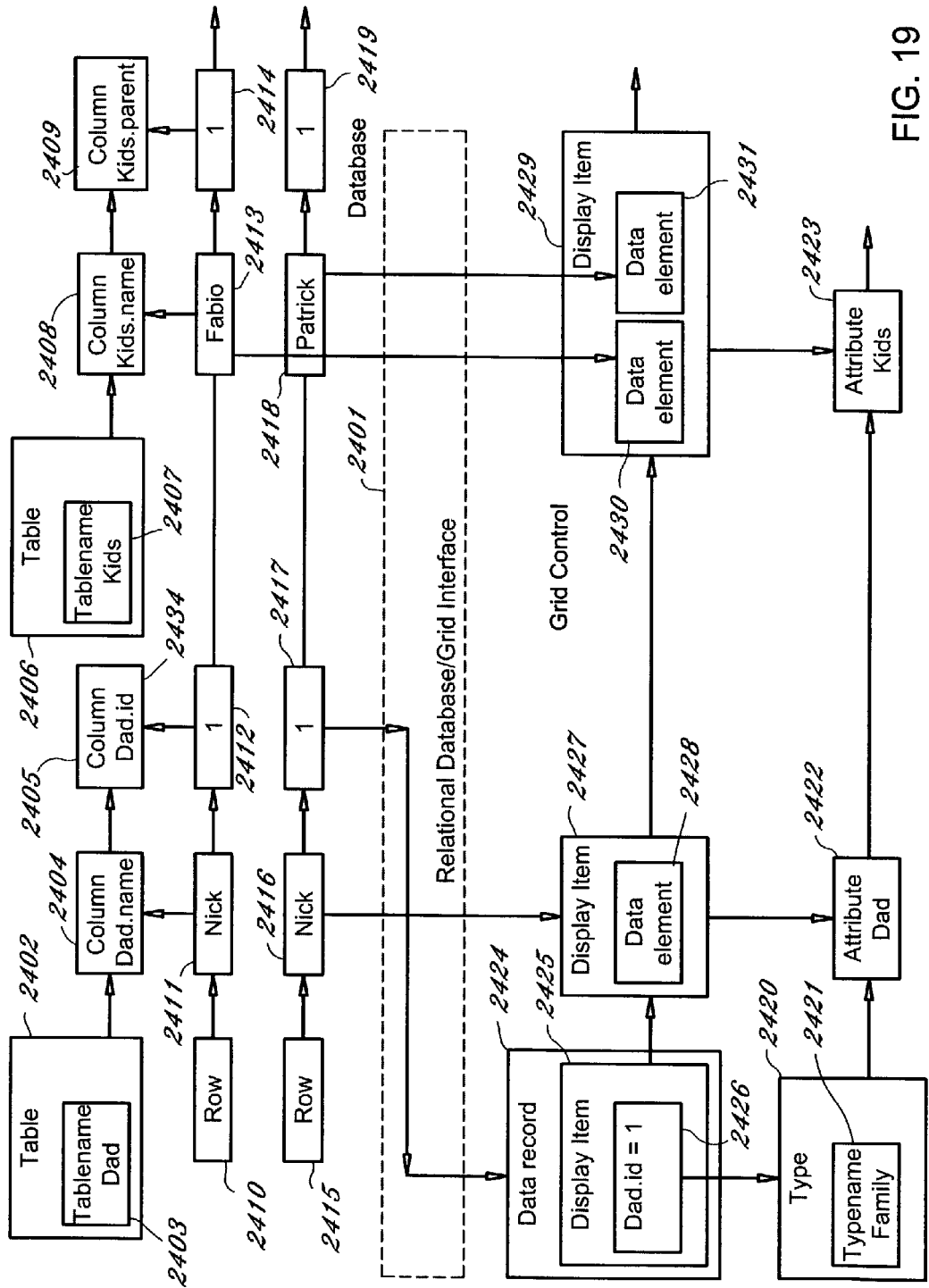
FIG. 19 shows relationships between the grid control of a preferred embodiment of the present invention and an RDBMS, showing how to combine tables into a non-relational type.

Referring to FIG. 19, relationships between a preferred embodiment of the grid control of the present invention and an RDBMS are illustrated, showing how to combine tables and represent them on-screen as a non-relational type. This figure is equivalent to FIG. 17 for the relational database case. As in FIGS. 17 and 18, database/grid interface 2401 is provided. In this case, database/grid interface 2401 is a more complicated embodiment of a relational database/grid interface of the present invention than is interface 2301 in FIG. 18. Items above interface 2401 are representations of data and metadata in the database, and items below it are data that are passed to the grid control of the preferred embodiment of the present invention.

Interface 2401 is capable of storing metadata about how to connect groups of relational tables into larger entities. This practice is known in the art, in particular in the sense that the relational tables are often designed as these larger entities and then broken down or 'normalized' to satisfy the relational model. In the example illustrated in FIG. 19, the tables 'Dad' and 'Kids', from FIG. 1 have been combined into an entity 'Family'.

The data shown is the first two data rows shown in FIG. 2. First table 2402 has a first table name 2403 of 'Dad'. Columns 2404 and 2405 are 'Dad.name' and 'Dad.id', respectively. Second table 2406 has table name 2407 of 'Kids'. The 'Kids' table has two columns: 'Kids.name' column 2408 and 'Kids.Parent' column 2409. The following standard SQL query sent to the RDBMS returns several rows, of which only two are shown here:

select * from Dad, kids where Dad.name = 'Nick' and Dad.id = kids.Parent;

First row 2410 contains four fields 2411-2414. Second row 2415 also contains four fields 2416-2419. Prior to the query, a decision was made and stored within database/grid interface 2401 that the two relational database tables 'Dad', and 'Kids', are to be combined as a single type 2420 with type name 2421 of 'Family'. The two tables are to be joined by the columns 'Dad.id' column 2405 and 'Kids.Parent' column 2409 and the displayable fields are to be 'Dad.name' column 2404, which is renamed as 'Dad' attribute 2422 and 'Kids.name' column 2408, which is renamed as 'Kids' attribute 2423. 'Kids' attribute 2423 is a multi-valued attribute. This avoids data duplication. Database/grid interface 2401 combines two rows of relational data 2410 and 2415 into single data record 2424. First display item 2425 is the reference (displayed as a record handle) for data record 2424. The second display item is the field for 'Dad.name' column ('Dad' attribute). Note that adopting an object-based display mode means that duplicate data fields 2411 and 2416 are reduced to a single field. The primary key information for the first table, 'Dad.id' 2405, is stored in data element 2426 of the record handle's reference item. This is sufficient for saving modified data back into the 'Dad' table, but it is not sufficient for writing back the data to the 'Kids' table. In this example, the primary key for the 'Kids' table consists of both columns 2408 and 2409. It is assumed that no two Kids have the same name and the same Dad (for the purposes of the example). This means that, for the combination of more than one relational table into a single display type, interface 2401 has more work to do, related to tracking of primary key information of detail tables. This does not mean that interface 2401 cannot perform this task. It simply means this is not shown on FIG. 19.

The join between the 'Dad.id' column and the 'Kids.parent' column is used to bind two relational tables into a larger object. However, other foreign keys defined on the 'Dad' table and 'Kids' table, or defined on other tables to link them to the 'Dad' and 'Kids' tables, can be represented as references or reference lists in this interface and displayed as record handles or list handles in the grid control. Thus, in the relational world, the present invention is capable of combining simple table rows into complex on-screen objects, whereas, as discussed for FIG. 16 above complex objects in the object world may have to be broken down to conform to the visual model used by the present invention.

To maintain the extensibility of the graphical elements displayable by the grid, a preferred embodiment maintains a split between display items, as discussed in FIG. 17, and the graphical elements that represent them on the screen. In the simplest example, a single-valued text display item is represented by a white editable text cell on the screen. There is a one to one relationship between the logical display item and graphical element that represents it. However, a list of references can either be represented by a list handle or by a series of record handles. This is the first reason for splitting the graphical representation from the logical display items. If a grid control is designed as a component, with an interface that allows it to be passed software objects of classes derived from a base class 'DisplayItem', this means that new display items can be designed after the grid control. These new classes may in turn be represented by newly defined graphical element classes.

In a preferred embodiment developed using C++ Builder, the display items are derived from a base class, DisplayItem. The display items are SVAText (single-valued text item), MVAText (multi-valued text item), SVARef (single-valued reference), MVARef (reference list), and Join (join). The graphical elements are instances of windows classes derived from C++ Builder classes that can be displayed on the screen. The record handle is a TRecordHandle class derived from a C++ Builder customizable edit box, TCustomEdit. The cell of a single-valued non-reference attribute, TSVACell, the cell of a multi-valued non-reference attribute, TMVACell and the list handle, TlistHandle, are also derived from TcustomEdit. The header label is implemented as TMyLabel, which is derived from TCustomEdit, but is set to read-only. The join icon is implemented as TJoinIcon, which is derived from TBitBtn, a button class whose icon can be customized The preferred process creates graphical element structures that the windowing operating system can display such as, TMyLabel, TSVACell, TMVACell, TRecordHandle, and TjoinIcon, and associates them with their display items, SVAText, MVAText, SVARef, MVARef, and Join. Derived classes are required because the behavior of the graphical elements is modified. However, most of the normal behavior of an edit box is inherited. For example, when the user types input on the keyboard it appears as it normally does in the cell. Pressing the backspace key removes the preceding character. In the Microsoft Windows environment, the new derived windows classes are registered with the operating system. Registration means that the behavior of the classes, when certain events happen, can be modified with respect to that of the base class.

The terms 'grid' and 'grid control' are used interchangeably in this description. In C++ Builder, it is possible to build controls as components. These components have well-defined behavior and can be used by other programmers in their programs. However, the 'grid' of a preferred embodiment of the present invention is implemented using an unmodified TScrollBox. The extra functionality and data can be defined externally. In this sense, it is not a new control in the C++ Builder sense, and is not a new Windows class as far as the operating system is concerned. Alternatively, the grid control can be implemented as a component.

In the case where the program wants to display a data record on a new row, a linked list of display items is passed to the grid control for display. The grid control calls a routine to display the first display item. Using object-oriented programming, the routine is customized for the class of display item being displayed, derived from the base DisplayItem class. The routine is passed details of the position of the display item in terms of previous and next display items. Some parts of the routine are standard, so for example the position of the new display item is always immediately to the right of the total extent of previous display item. At the end of the routine, the width and depth of the DisplayItem must be calculated to work out where the next DisplayItem should go. The calculation of the width of a DisplayItem is easy for a SVAText item (it is the width of the cell). For an MVARef, the calculation is more difficult, and takes place using the overloaded subfunction defined for this class. In the prototype, a record handle, whose logical object is an SVARef or MVARef object was assumed to contain the display items representing fields in the record, including embedded record or list handles.

Referring to FIG. 12 again, the record handle list is considered as a single display item with depth stretching from 1321 to 3401. Its width is that of the widest record within the lists, stretching as far as 3404 and 3405. This assumption enables the correct alignment of the homes label, 1406 and list handle 1323.

Preferably, the grid is capable of calculating whether the new item requires a new header. This means the application does not need to do this. Display or removal of headers may require repositioning of subsequent rows.

One having ordinary skill in the art will know that display of differing display items in a list can be implemented in an object-oriented programming language by creating a base class, DisplayItem, and deriving the different types of display item from it. Using this approach, the display of a given item is defined as the implementation of a virtual function for its derived class.

In a preferred embodiment using Borland C++ Builder, a data row is displayed by calling a routine called DisplayItem::Display( ) to display the first display item. The base function of Display( ) is used for all display item classes, but this function calls virtual functions—functions which are defined differently for the various derived classes of the base class. Record handles are considered to own their data records, so the routine displays the record handle and then items belonging to it, called dependent items. For simple text display items, there are no dependent items, so the virtual function of this class to display dependent items does nothing. Display( ) then displays the next reference, which is only active in the case of reference lists. Finally, it displays the next item. The display continues rightwards and downwards until there are no more display items that have not been displayed or are in the wrong place.

The simplified code shown below illustrates how separating the display item from the graphical element allows extensibility. The part of the code where the Display( ) routine creates the graphical element if it is not present and then displays it at a certain position and size is shown. At A: a pointer to a generic graphical element Tcontrol is created. Virtual function GetControl( ) which is shown below for class SVAText returns the graphical element for this object of this class. If the value is null there is not graphical element, and the CreateGraphicalElement( ) function for the class is called. In the case of SVAText, it creates a TSVACell object. GetControl( ) is called again to get a pointer to it. The generic function InsertControl( ) which works for all Tcontrol objects is called to insert the graphical element into the grid. At F: for new or existing graphical elements, SetBounds( ) is called to locate and size the graphical element in the grid. Thus, to define a new display item and graphical element, new versions of CreateGraphicalElement( ) and GetControl( ) must be defined.

```
void DisplayItem:Display(TscrollBox * grid, int x_location, int
y_location, Int width, int height, bool expanded)
{
Tcontrol * control;                         // A: The graphical element is
derived from a windows control
Graphics = this->GetControl( );             // B: Get any existing
graphical element
If (!Graphics)                              // C: If there isn't already a
graphical element create it.
{
    this->CreateGraphicalElement( );        // D: use the virtual func-
tion for this display item to create its graphical
    Graphics = this->GetControl( );         // element.
    this->InsertControl(Graphics);          // E: insert the control in-
to the grid.
}
Graphics->SetBounds(x_location, y_location,  // F: Set the size and
        width, height);                      location of the
control
}
void SVAText::CreateGraphicalElement(void )
```

-continued

```
{
cell = new TSVACell(grid, data, this);
}
TControl * SVAText::GetControl(void)
{
    return cell;
}
```

Once the record has been displayed, the system waits for user interaction such as selection of handles or typing in values into data fields. As discussed above, the response to user interaction is governed by routines supplied by the interfaces to the grid control of the present invention.

Figure 20:
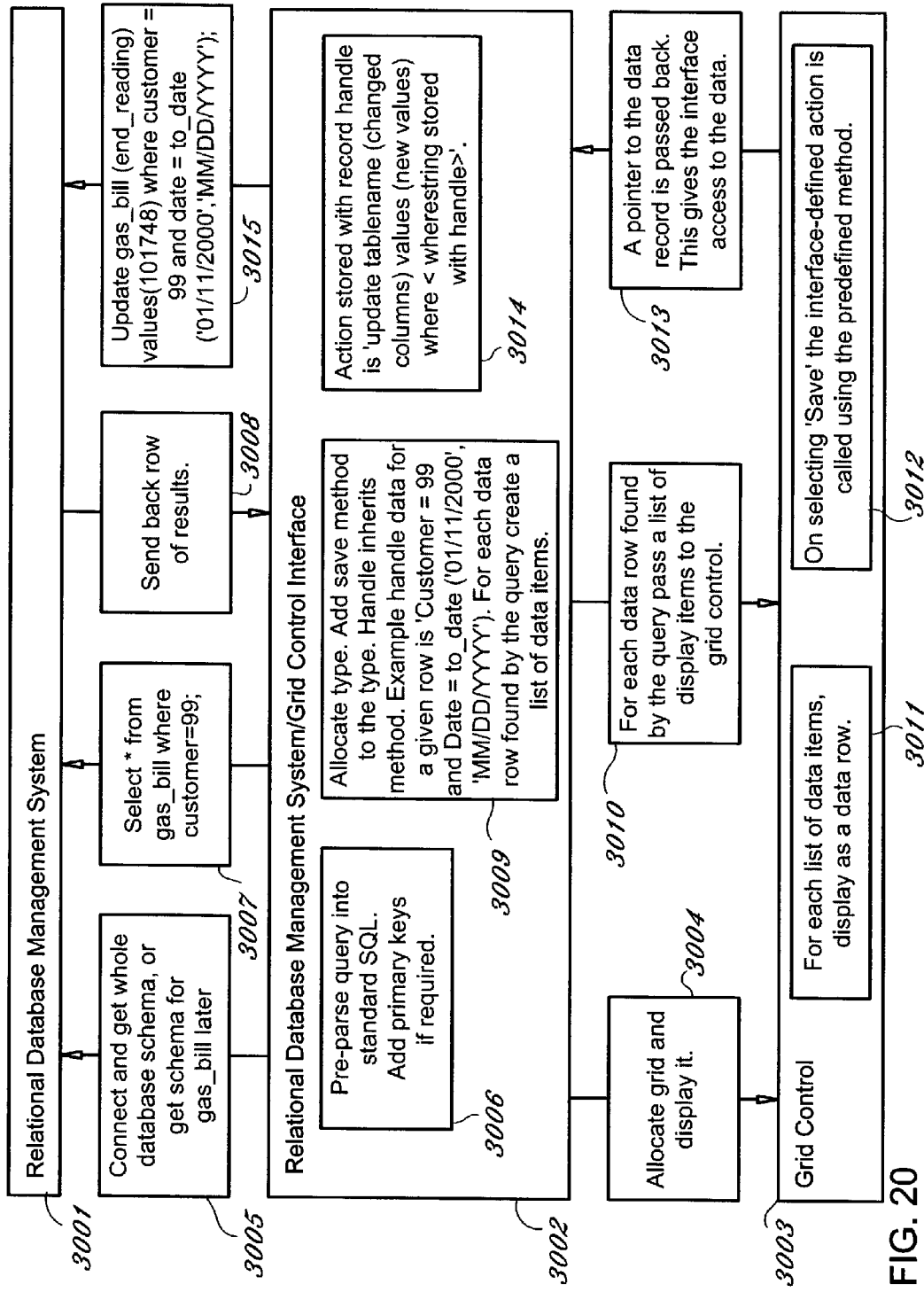
FIG. 20 is a software architecture diagram showing a preferred embodiment of the interface between the grid control of the present invention and an existing art relational database management system (RDBMS).

Referring to FIG. 20, a software architecture diagram showing a preferred embodiment of the interface between the grid control of the present invention and background art RDBMS 3001 is illustrated. It shows the interactions between the three components for a simple query. It also shows the architecture and interfaces between RDBMS 3001, RDBMS/grid control interface component of a preferred embodiment of software application 3002 of the present invention and grid control 3003 of the present invention. RDBMS 3001 may be a client-server RDBMS from Oracle Corporation, Redwood Shores, Calif.; Sybase Inc of Emeryville, Calif.; Informix Software of Menlo Park, Calif.; or a PC-based database or database file such as Paradox from Borland; or Access from Microsoft or any other conventional database. Accessing relational database 3001 may equally be via a standard interface such as ODBC. The diagram deals with the case of a standard SQL query, but is sufficient to describe non-standard queries. At initialization of the software program, interface 3002, or another component of the software application allocates grid control 3003 and displays it at allocation procedure 3004. It also connects to the database at connection procedure 3005, and either gets the complete database schema at this stage, or subsequently gets the parts of the schema it is interested in for individual queries.

When the user submits a query, the interface pre-parses a query that is supplied to it into one or more standard SQL queries at pre-parsing procedure 3006. In this example, procedure 3006 has no effect on the query, because it is a standard SQL query that contains primary key information. At query transmission procedure 3007, the interface sends the resultant standard SQL query or queries unchanged to the RDBMS. One having ordinary skill in the art will see that the query in the example is consistent with fetching several records. One of the records returned could be that whose display is shown in FIG. 5. At data transmission procedure 3008, the database sends rows of data to the interface. At type and record allocation procedure 3009, the interface allocates a type structure conformant with the interface of grid control 3003, as described in FIG. 18. The attributes of the type are allocated to be equivalent to the columns of the query. The reference display item for a record handle is supplied with an action for saving the relevant row, if it is changed. Each record handle is given the same 'Save' action. For standard SQL, this is directly derivable from the types. Each handle is supplied with data uniquely identifying the record, e.g., "Customer=9 and date='01/11/2001'," called a where-string. Alternatively, interface 2301 in FIG. 18 stores information about the primary key of table 2302. These relevant data from fields 2309-2312 for the record can then be accessed in the case of a 'Save' action to create the where-string at the time of the action. The record handle is also provided with a list of actions for its pop-up list, a default action for click, and a default action for double-click, as discussed above. In a simple embodiment, where a single interface 3002 and the grid control are combined, these actions may be identical for each record handle. In the more general case, these actions may differ, and are passed to the grid at run-time. However, in a preferred embodiment, the 'Save' action can be the same for all relational records. (To be more precise, the part of the 'Save' action that generates an SQL query can be the same and the means of sending that query to different relational databases may differ).

At type and record allocation procedure 3009, interface 3002 prepares rows of display items in the format required by the grid control interface as shown in FIG. 16. At row passing procedure 3010, these rows are passed to the grid control. At display procedure 3011, the grid control creates and displays each data row of display items, adding a header row if required. The grid control then waits for user input. At handle update procedure 3012, the data in the grid control have been changed, and the default action of the handle for a given row has been changed to 'Save'. An example is record 1005 in FIG. 8. The change of record handle state is internal to the grid and is not shown in FIG. 20. On selecting the handle with state 'Save', the save action defined by the interface at type and record allocation procedure 3009 is called. At pointer passing procedure 3013, a pointer to the data record is passed back to the 'Save' action, which is logically part of interface 3002.

At update query creation procedure 3014, the 'Save' action obtains the where-string from the handle, or generates it from information about primary keys. It also obtains the updated data from the record, and creates a standard SQL update query. This update query is passed to the RDBMS as a query at database update procedure 3015, thus updating the data in the database. The 'Save' can build up an SQL query to update the database simply by traversing the record and noting what fields have changed. The query is as follows:

Update <table_name> (<column names of changed fields separated by commas>) values (<new values of fields separated by commas>) where <where-string>;

It is apparent that all of the data in the angle brackets is known to the grid control, and does not rely on previous knowledge of the schema of the database. Thus, this action is completely general for relational databases.

In a preferred embodiment, interface 3002 has the following characteristics. Firstly, the commands it sends to the RDBMS 3001 are standard SQL queries. It requires only an existing connection to a relational database, and information about the data schema. Secondly, the action of the 'Save' action described above is entirely generic, and the query it creates is determined by the relational schema of the database, the initial data and the actions that have been performed to change the state of the data displayed on the screen. Thus, a minimal relational database interface embodiment connects to the proposed grid control and record controls in such a way that no customizing of actions is required. The interface does not need to know anything about the schema in advance. The interface can then be customized to interface to drivers for any standard RDBMS, or to ODBC data sources. A prototype was developed by the applicant that was capable of attaching to ODBC drivers for RDBMS's from several manufacturers and fetching the data and modifying it in a completely general manner. FIG. 20 used the example of a standard SQL query, but pre-parsing procedure 3006 is capable of converting non-standard SQL queries into a series of standard SQL queries.

Figure 21:
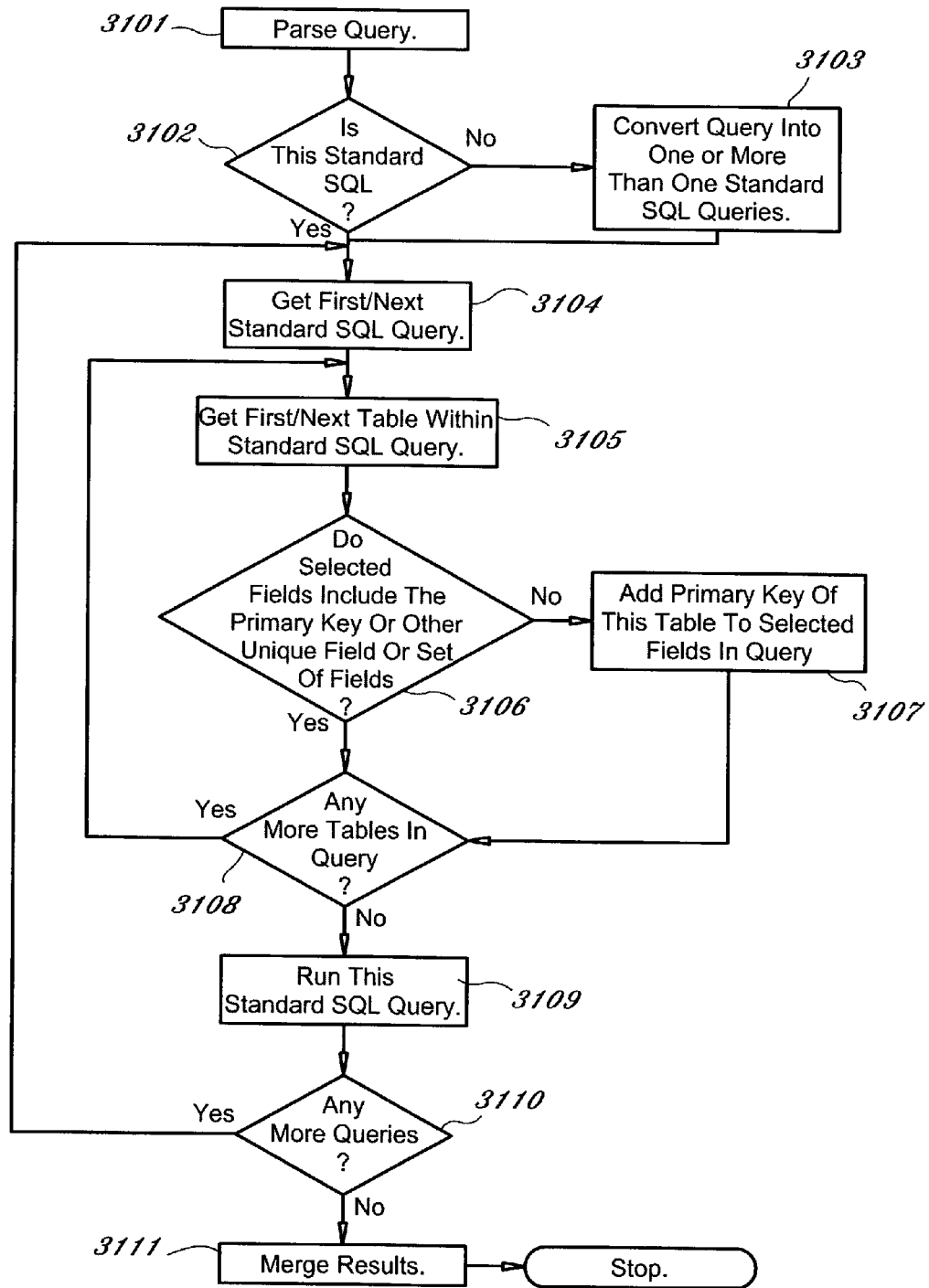
FIG. 21 shows a logic flow diagram of a preferred routine for converting a query that need not be standard SQL into standard SQL queries containing key information.

Referring to FIG. 21, a logic flow diagram of a preferred routine for converting a query that need not be standard SQL into standard SQL queries containing key information is illustrated. It is equivalent to pre-parsing procedure 3006 in FIG. 20. It would also have been effective for creating the heterogeneous data from an RDBMS in FIG. 8. On input, the query preferably is in the non-standard version of SQL used through this disclosure. At query parsing step 3101, the syntax of the query is parsed. If the syntax is not normal (i.e., standard SQL), the decision at decision step 3102 sends the query to be split into one or more standard queries at query splitting step 3103. At obtain standard query step 3104, the first/next standard SQL query is taken. At obtain table step 3105, the first or next table within the current standard SQL query is taken. At unique field determination step 3106, if selected fields selected by the query do not include the primary key or other data uniquely identifying the records making up the query, the current query is passed to primary key addition step 3107, where extra fields are added to it so that the primary keys are present. At other table determination step 3108, the routine loops back if there are more tables in the query. At execute query step 3109, the standard SQL query with possibly extra key fields is executed. At process other queries step 3110, the routine loops to process further SQL queries if there are any present. Once all the queries have been run, merge results step 3111 is run. This imposes order in cases where the query requires the results to be sorted in terms of a field or field-type that occurs in more than one of the tables queried, such as date fields 1008-1011 in FIG. 8.

In the query discussed in FIG. 20, the individual rows returned consist of records within single tables, rather than with joins. This means that provided primary key information was stored for each record (i.e., either the query already contained this information, or the pre-parser added it), the grid control has enough information to save the record if its contents are changed. Thus, the record handle can advertise its 'Save' action and the user can save data. If the rows returned consist of joins between two or more relational tables, for the user to be able to save changed data, one handle must be displayed for each table represented in the row. This can be done provided the pre-parser is set up to get primary key information about the records that are being fetched.

WORKING EXAMPLE

An operational prototype of a preferred embodiment of the interface of the present invention was implemented. The prototype allowed the user to select one of the following new types: 'Family', 'Car' or 'Home'. Selection of the 'Family' type caused a header row to appear in the main window. Selection of 'New Object' caused a new record to appear. (In an alternative implementation, the first record appeared automatically with the type.)

Inputting data into the single-valued text (white) and multi-valued text (yellow) cells caused the action on the associated handle (the blue cell on the left) to change from 'Close' to 'Save'. Extra data was input to the multi-valued text cell by pressing the down-arrow key and keying in the text. Double-clicking on the list collapsed the list and subsequent rows moved up to fill the vacated space. Double-clicking again expanded the list showing that the data were not lost. Subsequent rows moved down to accommodate this action.

Selection of 'New' on a multi-valued reference record handle (blue) in the Cars column allowed the user to select the type of the referenced object. Thus, the type was not imposed on the user by the software—the user could have inserted a 'Home' into a 'Cars' column. On return, the Second multi-value attribute handle for 'Homes' was pushed to the right and an extra record handle appeared below the one the user had just added a record to. When the user input the details of a 'Car', the record handle changed to 'Save'. When inner records were saved and closed, subsequent rows were shifted inwards.

The prototype implemented the data schema tree of FIG. 22 as a means of navigating and querying ODBC datasources. Queries involving joins and filters were automatically generated by selecting the data tree schema. The data were presented in the grid in the object display mode for relational databases with foreign keys represented as record handles or list handles. Modifying data in records made the default action of the record handle 'Save'. Selecting 'Save' successfully wrote data back to the ODBC databases. The same interface was capable of accessing Oracle and Microsoft SQL Server databases.

Many variations of the invention will occur to those skilled in the art. Some variations include means and methods for representation of data from relational databases. Other variations call for means and methods for representation of data from object databases. Other variations call for means and methods for representation of data, often transient data, not stored in databases, such as XML data. All such variations are intended to be within the scope and spirit of the invention.

I claim:

1. A computerized method for representing data on a display, the method comprising:
   querying a data source to obtain data comprising a first data record;
   presenting the first data record on the display as a data field; and
   presenting on the display a record handle for manipulation of the first data record;
   wherein the data field has any data field type in the group consisting of
   a single data element,
   a list of data elements, and
   a reference to a second data record;
   wherein the record handle is a visual element that represents the first data record and that is operative to control and continuously track the state of the first data record on the display and in the data source; and
   wherein the record handle is operative to visually indicate to a user a current default action that will be activated when the user clicks on the record handle.

2. The computerized method of claim 1 wherein the data obtained during the querying step further comprises metadata concerning the first data record and the method further comprises:
   presenting on the display the metadata as a label in a header above the data field.

3. The computerized method of claim 1 wherein the list of data elements is presented in a format selected from the group consisting of:
   a single data element in the list,
   a list handle that is operative to present all the data elements in the list,
   all of the data elements in the list, and
   a new field that is operative to allow the user to add a data element to the list.

4. The computerized method of claim 1 wherein the reference to the second data record is presented in a format selected from the group consisting of:
   a get handle that is operative to display a second data element in the second data record on the same line upon which the get handle is displayed wherein the displayed record handle is not operative to save data to the second record, and a second record handle and the data element in the second data record.

5. The computerized method of claim 2 wherein the metadata that is obtained comprises a first data record type and a first data element name.

6. In a computer system having a memory and a graphical user interface including a display and an input device for use by a user, a method of displaying and manipulating data in a first data record stored in a database residing in said memory, the method comprising:
retrieving said first data record from said database, said first data record having at least one data element;
displaying a record handle having a state on the display wherein said state may be is any one data record status selected from the group consisting of
a save state that is displayed after the at least one data element has been entered or changed by the user and in which state said record handle is operative to save to the database all the data elements in the displayed first data record,
a close state that is displayed after the at least one data element has been saved by the user and in which state said record handle is operative to remove all the data elements in the first data record from the display, and
a get state that is displayed after the data element is removed from the display and in which state said record handle is operative to refresh all the data elements in the first data record on the display; and
displaying the first data record on the display as one or more data fields;
wherein said record handle is a visual element that represents the first data record and that is operative to control and continuously track said state; and
wherein said record handle is operative to visually change and indicate to a user a current default action that will be activated when the user clicks on the record handle.

7. The method of claim 6 further comprising:
displaying on the display a header comprising one or more names wherein said one or more names is selected from the group consisting of
a type name for the type of the first data record, and
a data element name for the at least one data element.

8. The method of claim 6 wherein the first data record comprises more than one data element and displaying the first data record on the display comprises displaying a display item selected from the group consisting of
a single-valued data field,
a multi-valued data field, and
a reference to another data record.

9. The method of claim 6 wherein the at least one data element comprises character data or binary data.

10. The method of claim 6 further comprising:
displaying on the display a retractable multi-valued data field as a list handle that is operative to display on the display each individual data element comprising the multi-valued data item in a drop down list.

11. The method of claim 6 further comprising:
displaying on the display a reference data field of the first data record that refers to a second data record as a second record handle having a get state that is operative to display on the display the second data elements of the second data record on the same line upon which the record handle having a get state is displayed wherein the record handle of the first data record is not operative to save to the database the second data elements of the second data record; and
displaying a third record handle on the display having a new state that is operative to create or link another referenced data record to the first data record.

12. The method of claim 6 further comprising:
entering a query statement into a user interface element before the retrieving step is executed.

13. The method of claim 12 wherein the query statement is a join statement that is operative to cause a second data record to be displayed on the same line as the first data record, said first displayed data record and said second displayed data record being separated by a symbol and being related in the manner specified in the join statement.

14. A computer-readable medium having computer-executable instructions for performing a method, the method comprising:
retrieving a data record from a database, said record having a plurality of data fields;
displaying a record handle on a display wherein said record handle changes visually to become a save handle that is displayed after one of the data fields has been input or edited by a user and that is operative when selected by a user to save all the data fields in the data record to the database, a close handle that is displayed after the data fields have been saved by the user and that is operative when selected by the user to remove all the data fields from the display, and a get handle that is displayed after the data fields are removed from the display and that is operative when selected by the user to refresh all the data fields on the display; and
displaying the data fields on the display wherein each one of said data fields is selected from the group consisting of
a null data element,
a character or numerical data element,
a list or array of data elements, and
a reference to another data record;
wherein said record handle is a visual element that represents said data record and that is operative to track and control the state of said data record.

15. A computer-readable medium of claim 14 wherein the method further comprises:
at the option of the user, displaying on the display a header line comprising one or more names wherein said one or more names is a type name for the type of the data record, or a field name for the data field.

16. In a computer system having a memory and a graphical user interface including a display and an input device for use by a user, an apparatus for displaying and manipulating data in a first data record stored in a database residing in said memory, the apparatus comprising:
means for retrieving said first data record from said database, said first data record having at least one data element;
means for displaying a record handle having a state on the display wherein said state is any one data record status selected from the group consisting of
a save state that is displayed after the at least one data element has been entered or changed by the user and in which state said record handle is operative to save to the database all the data elements in the displayed first data record,
a close state that is displayed after the at least one data element has been saved by the user and in which state said record handle is operative to remove all the data elements in the first data record from the display, and
a get state that is displayed after the data element is removed from the display and in which state said record handle is operative to refresh all the data elements in the first data record on the display; and means for displaying the first data record on the display as one or more data fields;

wherein said record handle is a visual element that represents the first data record and that is operative to perform tracking of said state and allow the user to control said state; and wherein, based on the results of said tracking, said record handle is operative to visually indicate to the user a current default action that will be activated when the user clicks on the record handle.

17. The apparatus of claim 16 further comprising:

means for displaying on the display a header comprising one or more names wherein said one or more names is selected from the group consisting of a type name for the type of the first data record, and a data element name for the at least one data element.

18. The apparatus of claim 16 wherein the first data record comprises more than one data element and the means for displaying the first data record on the display comprises means for displaying a display item selected from the group consisting of a single-valued data field, a multi-valued data field, and a reference to another data record.

19. The apparatus of claim 16 wherein the at least one data element comprises character data or binary data.

20. The apparatus of claim 16 further comprising:

means for displaying on the display a retractable multi-valued data field as a list handle that is operative to display on the display each individual data element comprising the multi-valued data item in a drop down list.

21. The apparatus of claim 16 further comprising:

means for displaying on the display a reference data field of the first data record that refers to a second data record as a record handle having a get state that is operative to display on the display the second data elements of the second data record on the same line upon which the record handle having a get state is displayed wherein the record handle of the first data record is not operative to save to the database the second data elements of the second data record.

22. The apparatus of claim 16 further comprising:

means for entering a query statement into a user interface element before the retrieving step is executed.

23. The apparatus of claim 16 wherein the query statement is a join statement that is operative to cause a second data record to be displayed on the same line as the first data record, said first displayed data record and said second displayed data record being separated by a symbol and being related in the manner specified in the join statement.

24. A computerized method for displaying and manipulating data that has been retrieved by querying by a user of a non-relational database, said database comprising a data record that comprises a multi-valued attribute and a single-valued attribute, said method comprising:

said user submitting a select command to the database, said select command instructing the database to retrieve information concerning said multi-valued attribute and said single-valued attribute; and said database returning a name for said multi-valued attribute, each value of said multi-valued attribute, a name for said single-valued attribute and the single value of said single-valued attribute;

wherein said returned data is displayed in accordance with the method of claim 6.

25. A computerized method for displaying and manipulating data that has been retrieved by querying by a user of a non-relational database, said database comprising a plurality of data records, at least some of which data records comprising a multi-valued attribute, said method comprising:

said user submitting a select command to a database, said select command instructing the database to conditionally retrieve information concerning said plurality of data records, wherein the condition is selected from the group consisting of an any condition that is operative to select any data record wherein at least one of the values of the multi-valued attribute of the selected record is equal to, less than or greater than a given value, and an all condition that is operative to select any data record wherein all of the values of the multi-valued attribute of the selected data record are equal to, less than or greater than a given value; and said database returning information concerning each data record that meets the selected condition;

wherein said returned information is displayed in accordance with the method of claim 16.

26. The computerized method of claim 25 further comprising:

in the case of the any condition, displaying either the values of all multi-valued attributes in the selected data records or, if the keyword selected is present in the query, only the values of the multi-valued attributes that comply with the condition.

27. A computer-readable medium having computer-executable instructions for performing a method, the method comprising:

displaying at least one data field at a first location on a screen, said at least one data field containing a first data element of a first data record in a first data source; and displaying a record handle at a second location on the screen, said second location being horizontally in-line with said first location and said record handle being operative by a user to save the first data element to a memory after it has been changed by the user;

wherein the record handle is a visual element that represents the first data record and that is operative to control and continuously track the state of the first data record on the screen and in the first data source; and wherein the record handle is operative to indicate to a user a current default action that will be activated when the user clicks on the record handle.

28. The computer-readable medium of claim 27 having further computer-executable instructions for performing the method, the method further comprising:

displaying the default action of the record handle on the record handle.

29. The computer-readable medium of claim 27 having further computer-executable instructions for performing the method, the method further comprising:

upon activation of a menu associated with the record handle by a user, revealing record handle actions available to the user.

30. The computer-readable medium of claim 27 having further computer-executable instructions for performing the method, the method further comprising:

displaying a multi-valued data field on the screen, said multi-valued data field comprising attributes, said attributes being displayable as a vertical list with each member of the list being displayed in an editable cell and said attributes being contractable into a single graphical element.

31. The computer-readable medium of claim 27 having further computer-executable instructions for performing the method, the method further comprising:
displaying a header on the screen above the at least one data field, said header comprising a label that describes the at least one data field on the screen below it.

32. The computer-readable medium of claim 27 having further computer-executable instructions for performing the method, the method further comprising:
displaying a scrollable area; and
automatically controlling the display of a plurality of the data fields and a plurality of headers within the scrollable area.

33. The computer-readable medium of claim 27 having further computer-executable instructions for performing the method, the method further comprising:
moving a first plurality of the data fields located lower on the screen than a second plurality of the data fields upward on the screen to take up an intervening space when a third plurality of the data fields located higher on the screen than said first plurality of the data fields is closed and moving a fourth plurality of the data fields located lower on the screen than a fifth plurality of the data fields downward on the screen when a list in said fifth plurality of the data fields located higher on the screen than the fourth plurality of the data fields is expanded.

34. The computer-readable medium of claim 27 having further computer-executable instructions for performing the method, the method of further comprising:
displaying a plurality of multi-valued reference attributes as a plurality of lists.

35. An apparatus for representing data on a display, the apparatus comprising, in combination:
a processing unit and a memory;
means for querying a data source to obtain data comprising a first data record;
means for presenting the first data record on the display as a data field; and
means for presenting on the display a record handle for manipulation by a user of the first data record, said record handle being operative to track the state of said first data record and to change visually to reflect the state of said first data record, and being capable of performing actions on said first data record;
wherein the data field is selected from the group consisting of
a single data element,
a list of data elements, and
a reference to a second data record;
wherein the record handle is a visual element that represents the first data record and that is operative to control and continuously track the state of the first data record on the display and in the data source; and
wherein the record handle is operative to indicate to a user a current default action that will be activated when the user clicks on the record handle.

36. The apparatus of claim 35 further comprising:
means for displaying all of the elements in a hierarchical view of a data schema of the data source at the top level of a tree view, even if some of the elements also occur somewhere else in the hierarchy.

37. The apparatus of claim 35 further comprising:
means for displaying the representations of attributes below the representations of attribute types as well as below the representations of record types on a tree view, by providing that the branches of a tree view extend outward from their sources at different angles to represent different dimensions in the hierarchy.

38. The apparatus of claim 35 further comprising:
means for displaying a foreign key from a relational database having a data schema as an expansible tree element, thereby allowing for navigation of the data schema via the foreign key.

39. The apparatus of claim 38 further comprising:
means for navigating through the data schema to represent a join via links across the foreign key which are capable of automatic query generation, or automatic generation of a part of an SQL or other query that uses the foreign keys in its joins.

40. The apparatus of claim 35 further comprising:
means for presenting the first data record on the display as a first plurality of data fields;
wherein at least one of the first plurality of data fields is selected from the group consisting of
a single data element,
a list of data elements, and
a reference to a second data record.

41. The apparatus of claim 40 wherein the at least one data field is a reference to a second data record that has been expanded horizontally inline within the first record, displacing at least some of the data fields of the first record to the right on the display.

42. The apparatus of 40 further comprising:
means for displaying a plurality of representations of foreign keys relating a first table to a second table in a relational database in a plurality of second data fields in a column in a grid displaying data from the first table, each of the plurality of second data fields comprising a display item selected from the group consisting of a record handle and a list handle, and each of said display items being operative to fetch data from the second table when the display item is selected by the user.

* * * * *